United States Patent
Cheng et al.

(10) Patent No.: US 12,522,850 B2
(45) Date of Patent: Jan. 13, 2026

(54) FLUOROACETATE DEHALOGENASE MUTANT AND APPLICATION THEREOF

(71) Applicant: ABIOCHEM BIOTECHNOLOGY (GROUP) CO., LTD., Shanghai (CN)

(72) Inventors: Zhanbing Cheng, Shanghai (CN); Shaonan Ding, Shanghai (CN); Yanbing Xu, Shanghai (CN); Yao Huang, Shanghai (CN)

(73) Assignee: ABIOCHEM BIOTECHNOLOGY (GROUP) CO., LTD., Shanghai (CN)

( * ) Notice: Subject to any disclaimer, the term of this patent is extended or adjusted under 35 U.S.C. 154(b) by 783 days.

(21) Appl. No.: 17/787,568

(22) PCT Filed: Dec. 19, 2019

(86) PCT No.: PCT/CN2019/126785
§ 371 (c)(1),
(2) Date: Jun. 20, 2022

(87) PCT Pub. No.: WO2021/120134
PCT Pub. Date: Jun. 24, 2021

(65) Prior Publication Data
US 2024/0182933 A1    Jun. 6, 2024

(51) Int. Cl.
C12P 7/52      (2006.01)
C12N 9/14      (2006.01)
C12N 9/18      (2006.01)
C12P 41/00     (2006.01)

(52) U.S. Cl.
CPC .......... *C12P 7/52* (2013.01); *C12N 9/14* (2013.01); *C12N 9/18* (2013.01); *C12P 41/00* (2013.01); *C12Y 301/01005* (2013.01); *C12Y 308/01003* (2013.01)

(58) Field of Classification Search
None
See application file for complete search history.

(56) References Cited

U.S. PATENT DOCUMENTS

2010/0286210 A1    11/2010    Murata et al.

FOREIGN PATENT DOCUMENTS

| CN | 101048402 A | 10/2007 |
| CN | 109468347 A | 3/2019 |
| EP | 1806339 A1 | 7/2007 |

OTHER PUBLICATIONS

Chica et al. Curr Opin Biotechnol. Aug. 2005;16(4):378-84. (Year: 2005).*
Singh et al. Curr Protein Pept Sci. 2017, 18, 1-11 (Year: 2017).*
Bornscheuer et al. Curr Protoc Protein Sci. Nov. 2011;Chapter 26:Unit26.7. (Year: 2011).*
International Search Report dated Sep. 14, 2020 issued in International Application No. PCT/CN2019/126785, with English translation, 7 pages.
Written Opinion of the International Searching Authority dated Sep. 14, 2020 issued in International Application No. PCT/CN2019/126785, with English translation, 7 pages.
Chan, Peter W.Y., et al., "Mapping the Reaction Coordinates of Enzymatic Defluorination," Journal of the American Chemical Society, 2011, 133, pp. 7461-7468.
Levene, P.A., et al., "On Walden Inversion. X. On the Oxidation of 2-thiolcarboxylic Acids to the Corresponding Sulfonic Acids and on the Walden Inversion in the Series of 2-hydroxycarboxylic Acids," Journal of Biological Chemistry, 1927(75); pp. 337-365.
Boschi, Francesca, et al.,"A synthesis of levetiracetam based on (S)-N-phenylpantolactam as a chiral auxiliary", Tetrahedron: Asymmetry, 16(2005), pp. 3739-3745.
Wang, Jian-bo, et al.,"Investigating Substrate Scope and Enantioselectivity of a Defluorinase by a Stereochemical Probe," J.Am.Chem.Soc., 2017, 139(32), 9 pages.
Yao, Peiyuan et al.,"Efficient Biosynthesis of (R)- or (S)-2-Hydroxybutyrate from L-Threonine through a Synthetic Biology Approach," Advanced Synthesis and Catalysis, 2016, vol. 358(18), 7 pages.

* cited by examiner

*Primary Examiner* — Christian L Fronda
(74) *Attorney, Agent, or Firm* — FOLEY & LARDNER LLP

(57) ABSTRACT

Disclosed in the present invention is a fluoroacetate dehalogenase mutant, a sequence of the fluoroacetate dehalogenase mutant comprising a mutated sequence having an amino acid residue H at position 155 and/or an amino acid residue W at position 156, as shown in SEQ ID NO: 1; the fluoroacetate dehalogenase mutant has activity catalyzing bromination of a substrate, particularly a 2-bromobutyric acid substrate. Also provided in the present invention is an application of said fluoroacetate dehalogenase mutant in the preparation of (R)-2-bromobutyric acid and/or (R)-2-hydroxybutyric acid. When using the fluoroacetate dehalogenase mutant of the present invention to prepare (R)-2-bromobutyric acid, production costs are low and stereoselectivity is high, facilitating industrialized production.

20 Claims, 6 Drawing Sheets

Specification includes a Sequence Listing.

SEQUENCE LISTING

<160> NUMBER OF SEQ ID NOS: 130

<210> SEQ ID NO 1
<211> LENGTH: 304
<212> TYPE: PRT
<213> ORGANISM: Rhodopseudomonas palustris

<400> SEQUENCE: 1

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr His Trp Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255
```

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 2
<211> LENGTH: 912
<212> TYPE: DNA
<213> ORGANISM: Rhodopseudomonas palustris

<400> SEQUENCE: 2

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga cagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct accactggtc tttcctggct   480
cagccggctc cgctgccgga aacctgctg ggtggtgacc cggacttcta cgttaaagct   540
aaactggctt cttggacccg tgctggtgac ctgtctgctt cgacccgcg tgctgttgaa   600
cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg gcttctgac gttcagggtg ctccgatcga atctggtcac   840
ttcctgccgg aagaagctcc ggaccagacc gctgaagctc tggttcgttt cttctctgct   900
gctccgggtt ct                                                       912
```

<210> SEQ ID NO 3
<211> LENGTH: 37
<212> TYPE: DNA
<213> ORGANISM: Artificial Sequence
<220> FEATURE:
<223> OTHER INFORMATION: H155W156-Forward primer
<220> FEATURE:
<221> NAME/KEY: misc_feature
<222> LOCATION: (16)..(17)
<223> OTHER INFORMATION: n is a, c, g, or t
<220> FEATURE:
<221> NAME/KEY: misc_feature
<222> LOCATION: (18)..(18)
<223> OTHER INFORMATION: k is g or t
<220> FEATURE:
<221> NAME/KEY: misc_feature
<222> LOCATION: (19)..(20)
<223> OTHER INFORMATION: n is a, c, g, or t
<220> FEATURE:
<221> NAME/KEY: misc_feature
<222> LOCATION: (21)..(21)
<223> OTHER INFORMATION: k is g or t

<400> SEQUENCE: 3
gcactgaaaa tctatnnknn kagctttctg gcacagc                             37

<210> SEQ ID NO 4

```
<211> LENGTH: 37
<212> TYPE: DNA
<213> ORGANISM: Artificial Sequence
<220> FEATURE:
<223> OTHER INFORMATION: H155W156-Reverse primer
<220> FEATURE:
<221> NAME/KEY: misc_feature
<222> LOCATION: (17)..(17)
<223> OTHER INFORMATION: m is a or c
<220> FEATURE:
<221> NAME/KEY: misc_feature
<222> LOCATION: (18)..(19)
<223> OTHER INFORMATION: n is a, c, g, or t
<220> FEATURE:
<221> NAME/KEY: misc_feature
<222> LOCATION: (20)..(20)
<223> OTHER INFORMATION: m is a or c
<220> FEATURE:
<221> NAME/KEY: misc_feature
<222> LOCATION: (21)..(22)
<223> OTHER INFORMATION: n is a, c, g, or t

<400> SEQUENCE: 4
gctgtgccag aaagctmnnm nnatagattt tcagtgc                          37

<210> SEQ ID NO 5
<211> LENGTH: 34
<212> TYPE: DNA
<213> ORGANISM: Artificial Sequence
<220> FEATURE:
<223> OTHER INFORMATION: Y219-Forward primer
<220> FEATURE:
<221> NAME/KEY: misc_feature
<222> LOCATION: (16)..(17)
<223> OTHER INFORMATION: n is a, c, g, or t
<220> FEATURE:
<221> NAME/KEY: misc_feature
<222> LOCATION: (18)..(18)
<223> OTHER INFORMATION: k is g or t

<400> SEQUENCE: 5
gtgatgtgtg aagatnnkcg tgcgggtgcg tatg                             34

<210> SEQ ID NO 6
<211> LENGTH: 34
<212> TYPE: DNA
<213> ORGANISM: Artificial Sequence
<220> FEATURE:
<223> OTHER INFORMATION: Y219-Reverse primer
<220> FEATURE:
<221> NAME/KEY: misc_feature
<222> LOCATION: (17)..(17)
<223> OTHER INFORMATION: m is a or c
<220> FEATURE:
<221> NAME/KEY: misc_feature
<222> LOCATION: (18)..(19)
<223> OTHER INFORMATION: n is a, c, g, or t

<400> SEQUENCE: 6
catacgcacc cgcacgmnna tcttcacaca tcac                             34

<210> SEQ ID NO 7
<211> LENGTH: 304
<212> TYPE: PRT
<213> ORGANISM: Artificial Sequence
<220> FEATURE:
<223> OTHER INFORMATION: fluoroacetate dehalogenase mutant1(H155I,W156S,
      Y219F)

<400> SEQUENCE: 7

Met Pro Asp Leu Ala Asp Leu Phe Pro Gly Phe Gly Ser Glu Trp Ile
1               5                   10                  15
```

```
Asn Thr Ser Ser Gly Arg Ile Phe Ala Arg Val Gly Gly Asp Gly Pro
             20                  25                  30

Pro Leu Leu Leu Leu His Gly Phe Pro Gln Thr His Val Met Trp His
             35                  40                  45

Arg Val Ala Pro Lys Leu Ala Glu Arg Phe Lys Val Ile Val Ala Asp
     50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
            115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Ile Ser Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
            195                 200                 205

Pro Met Arg Arg His Val Met Cys Glu Asp Phe Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
            275                 280                 285

Gln Thr Ala Glu Ala Leu Val Arg Phe Phe Ser Ala Ala Pro Gly Ser
290                 295                 300

<210> SEQ ID NO 8
<211> LENGTH: 912
<212> TYPE: DNA
<213> ORGANISM: Artificial Sequence
<220> FEATURE:
<223> OTHER INFORMATION: fluoroacetate dehalogenase mutant1(H155I,W156S,
      Y219F)

<400> SEQUENCE: 8
atgccggacc tggctgacct gttcccgggt tcggttctg  aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact tcgctctggc tggtcacgac cgtggtgctc gtgtttctta ccgtctggct     360
ctggactctc cgggtcgtct gtctaaactg gctgttctgg acatcctgcc gacctacgaa     420
```

-continued

```
tactggcagc gtatgaaccg tgcttacgct ctgaaaatct acatctcttc tttcctggct    480
cagccggctc cgctgccgga aaacctgctg ggtggtgacc cggacttcta cgttaaagct    540
aaactggctt cttggacccg tgctggtgac ctgtctgctt tcgacccgcg tgctgttgaa    600
cactaccgta tcgctttcgc tgacccgatg cgtcgtcacg ttatgtgcga agacttccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg gcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 9
<211> LENGTH: 304
<212> TYPE: PRT
<213> ORGANISM: Artificial Sequence
<220> FEATURE:
<223> OTHER INFORMATION: fluoroacetate dehalogenase mutant2(H155V,W156M, Y219L)

<400> SEQUENCE: 9

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Val Met Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Leu Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
```

```
            260                 265                 270
Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
        290                 295                 300
```

<210> SEQ ID NO 10
<211> LENGTH: 912
<212> TYPE: DNA
<213> ORGANISM: Artificial Sequence
<220> FEATURE:
<223> OTHER INFORMATION: fluoroacetate dehalogenase mutant2(H155V,W156M,
      Y219L)

<400> SEQUENCE: 10

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga cagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acgttatgtc tttcctggct   480
cagccggctc cgctgccgga aaacctgctg gtggtgacc cggacttcta cgttaaagct   540
aaactggctt cttggacccg tgctggtgac ctgtctgctt cgacccgcg tgctgttgaa   600
cactaccgta tcgctttcgc tgacccgatg cgtcgtcacg ttatgtgcga agacctgcgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg gcttctgac gttcagggtg ctccgatcga atctggtcac   840
ttcctgccgg aagaagctcc ggaccagacc gctgaagctc tggttcgttt cttctctgct   900
gctccgggtt ct                                                       912
```

<210> SEQ ID NO 11
<211> LENGTH: 304
<212> TYPE: PRT
<213> ORGANISM: Artificial Sequence
<220> FEATURE:
<223> OTHER INFORMATION: fluoroacetate dehalogenase mutant3(H155V,W156R,
      Y219M)

<400> SEQUENCE: 11

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95
```

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
            115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Val Arg Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
            195                 200                 205

Pro Met Arg Arg His Val Met Cys Glu Asp Met Arg Ala Gly Ala Tyr
            210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
            275                 280                 285

Gln Thr Ala Glu Ala Leu Val Arg Phe Phe Ser Ala Ala Pro Gly Ser
            290                 295                 300

<210> SEQ ID NO 12
<211> LENGTH: 912
<212> TYPE: DNA
<213> ORGANISM: Artificial Sequence
<220> FEATURE:
<223> OTHER INFORMATION: fluoroacetate dehalogenase mutant3(H155V,W156R,
      Y219M)

<400> SEQUENCE: 12
atgccggacc tggctgacct gttcccgggt ttcggttctg aatggatcaa cacctcttct      60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga cagctgggt     300 cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acgttcgttc tttcctggct    480
cagccggctc cgctgccgga aaacctgctg ggtggtgacc cggacttcta cgttaaagct    540
aaactggctt cttggacccg tgctggtgac ctgtctgctt tcgacccgcg tgctgttgaa    600
cactaccgta tcgctttcgc tgacccgatg cgtcgtcacg ttatgtgcga agacatgcgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg gcttctgac gttcagggtg ctccgatcga atctggtcac    840
ttcctgccgg aagaagctcc ggaccagacc gctgaagctc tggttcgttt cttctctgct    900
gctccgggtt ct    912

<210> SEQ ID NO 13
<211> LENGTH: 304
<212> TYPE: PRT
<213> ORGANISM: Artificial Sequence
<220> FEATURE:
<223> OTHER INFORMATION: fluoroacetate dehalogenase mutant4(H155I,W156S)

<400> SEQUENCE: 13

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Ile Ser Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 14
<211> LENGTH: 912
<212> TYPE: DNA
<213> ORGANISM: Artificial Sequence
<220> FEATURE:
<223> OTHER INFORMATION: fluoroacetate dehalogenase mutant4(H155I,W156S)

<400> SEQUENCE: 14

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
acccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acatctcttc tttcctggct     480
cagccggctc cgctgccgga aaacctgctg gtggtgacc cggacttcta cgttaaagct     540
aaactggctt cttggacccg tgctggtgac ctgtctgctt cgacccgcg tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg ggcttctgac gttcagggtg ctccgatcga atctggtcac     840
ttcctgccgg aagaagctcc ggaccagacc gctgaagctc tggttcgttt cttctctgct     900
gctccgggtt ct                                                        912
```

<210> SEQ ID NO 15
<211> LENGTH: 304
<212> TYPE: PRT
<213> ORGANISM: Artificial Sequence
<220> FEATURE:
<223> OTHER INFORMATION: fluoroacetate dehalogenase mutant5(H155N,W156F)

<400> SEQUENCE: 15

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Asn Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190
```

```
Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
        260                 265                 270

Gly Ala Pro Ile Glu Ser Gly His Phe Leu Pro Glu Ala Pro Asp
    275                 280                 285

Gln Thr Ala Glu Ala Leu Val Arg Phe Phe Ser Ala Ala Pro Gly Ser
    290                 295                 300
```

<210> SEQ ID NO 16
<211> LENGTH: 912
<212> TYPE: DNA
<213> ORGANISM: Artificial Sequence
<220> FEATURE:
<223> OTHER INFORMATION: fluoroacetate dehalogenase mutant5(H155N,W156F)

<400> SEQUENCE: 16

```
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acaacttctc tttcctggct     480
cagccggctc gctgccgga aaacctgctg gtggtgacc cggacttcta cgttaaagct     540
aaactggctt cttggacccg tgctggtgac ctgtctgctt cgacccgcg tgctgttgaa     600
cactaccgta tcgcttttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 17
<211> LENGTH: 304
<212> TYPE: PRT
<213> ORGANISM: Artificial Sequence
<220> FEATURE:
<223> OTHER INFORMATION: fluoroacetate dehalogenase mutant6(H155V,W156T)

<400> SEQUENCE: 17

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30
```

```
Pro Leu Leu Leu Leu His Gly Phe Pro Gln Thr His Val Met Trp His
         35                  40                  45

Arg Val Ala Pro Lys Leu Ala Glu Arg Phe Lys Val Ile Val Ala Asp
 50                  55                  60

Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Val Thr Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300
```

<210> SEQ ID NO 18
<211> LENGTH: 912
<212> TYPE: DNA
<213> ORGANISM: Artificial Sequence
<220> FEATURE:
<223> OTHER INFORMATION: fluoroacetate dehalogenase mutant6(H155V,W156T)

<400> SEQUENCE: 18

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact ctgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acgttacctc tttcctggct     480
cagccggctc cgctgccgga aaacctgctg ggtggtgacc cggacttcta cgttaaagct     540
```

```
aaactggctt cttggacccg tgctggtgac ctgtctgctt tcgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 19
<211> LENGTH: 304
<212> TYPE: PRT
<213> ORGANISM: Artificial Sequence
<220> FEATURE:
<223> OTHER INFORMATION: fluoroacetate dehalogenase mutant7(W156M)

<400> SEQUENCE: 19

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr His Met Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285
```

Gln Thr Ala Glu Ala Leu Val Arg Phe Phe Ser Ala Ala Pro Gly Ser
    290                 295                 300

<210> SEQ ID NO 20
<211> LENGTH: 912
<212> TYPE: DNA
<213> ORGANISM: Artificial Sequence
<220> FEATURE:
<223> OTHER INFORMATION: fluoroacetate dehalogenase mutant7(W156M)

<400> SEQUENCE: 20

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga acagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct accacatgtc tttcctggct   480
cagccggctc cgctgccgga aaacctgctg gtggtgaccc ggacttcta cgttaaagct   540
aaactggctt cttggacccg tgctggtgac ctgtctgctt cgacccgcg tgctgttgaa   600
cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg ggcttctgac gttcagggtg ctccgatcga atctggtcac   840
ttcctgccgg aagaagctcc ggaccagacc gctgaagctc tggttcgttt cttctctgct   900
gctccgggtt ct                                                      912
```

<210> SEQ ID NO 21
<211> LENGTH: 304
<212> TYPE: PRT
<213> ORGANISM: Artificial Sequence
<220> FEATURE:
<223> OTHER INFORMATION: fluoroacetate dehalogenase mutant8(H155V,W156M)

<400> SEQUENCE: 21

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Val Met Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
                180                 185                 190

Ala Phe Asp Pro Arg Ala Val Glu His Tyr Arg Ile Ala Phe Ala Asp
                195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
                260                 265                 270

Gly Ala Pro Ile Glu Ser Gly His Phe Leu Pro Glu Glu Ala Pro Asp
                275                 280                 285

Gln Thr Ala Glu Ala Leu Val Arg Phe Phe Ser Ala Ala Pro Gly Ser
290                 295                 300

<210> SEQ ID NO 22
<211> LENGTH: 912
<212> TYPE: DNA
<213> ORGANISM: Artificial Sequence
<220> FEATURE:
<223> OTHER INFORMATION: fluoroacetate dehalogenase mutant8(H155V,W156M)

<400> SEQUENCE: 22
atgccggacc tggctgacct gttcccgggt ttcggttctg aatggatcaa cacctcttct     60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc ggaatctga cgaacagcac    240 accccgtaca ccaaacgtgc tatggctaaa cagctgatcg aagctatgga cagctgggt    300 cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acgttatgtc tttcctggct    480
cagccggctc cgctgccgga aaacctgctg gtggtgacc ggacttcta cgttaaagct    540 aaactggctt cttggacccg tgctggtgac ctgtctgctt cgacccgcg tgctgttgaa    600 cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912

<210> SEQ ID NO 23
<211> LENGTH: 304
<212> TYPE: PRT

<213> ORGANISM: Artificial Sequence
<220> FEATURE:
<223> OTHER INFORMATION: fluoroacetate dehalogenase mutant9(H155V,W156R)

<400> SEQUENCE: 23

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Val Arg Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
        210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300
```

<210> SEQ ID NO 24
<211> LENGTH: 912
<212> TYPE: DNA
<213> ORGANISM: Artificial Sequence
<220> FEATURE:
<223> OTHER INFORMATION: fluoroacetate dehalogenase mutant9(H155V,W156R)

<400> SEQUENCE: 24

```
atgccggacc tggctgacct gttcccgggt ttcggttctg aatggatcaa cacctcttct    60
ggtcgtatct cgctcgtgt tggtggtgac ggtccgccgc tgctgctgct gcacggtttc   120
ccgcagaccc acgttatgtg gcaccgtgtt gctccgaaac tggctgaacg tttcaaagtt   180
```

```
atcgttgctg acctgccggg ttacggttgg tctgacatgc cggaatctga cgaacagcac    240 acccgtaca ccaaacgtgc tatggctaaa cagctgatcg aagctatgga acagctgggt     300
cacgttcact cgctctggc tggtcacgac cgtggtgctc gtgtttctta ccgtctggct      360
ctggactctc cgggtcgtct gtctaaactg gctgttctgg acatcctgcc gacctacgaa    420
tactggcagc gtatgaaccg tgcttacgct ctgaaaatct acgttcgttc tttcctggct    480
cagccggctc cgctgccgga aaacctgctg gtggtgacc cggacttcta cgttaaagct    540
aaactggctt cttggacccg tgctggtgac ctgtctgctt cgacccgcg tgctgttgaa    600 cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg gcttctgac gttcagggtg ctccgatcga atctggtcac    840
ttcctgccgg aagaagctcc ggaccagacc gctgaagctc tggttcgttt cttctctgct   900
gctccgggtt ct                                                        912
```

<210> SEQ ID NO 25
<211> LENGTH: 304
<212> TYPE: PRT
<213> ORGANISM: Artificial Sequence
<220> FEATURE:
<223> OTHER INFORMATION: fluoroacetate dehalogenase mutant10(H155Q, W156F)

<400> SEQUENCE: 25

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Gln Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220
```

```
Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 26
<211> LENGTH: 912
<212> TYPE: DNA
<213> ORGANISM: Artificial Sequence
<220> FEATURE:
<223> OTHER INFORMATION: fluoroacetate dehalogenase mutant10(H155Q, W156F)

<400> SEQUENCE: 26

```
atgccggacc tggctgacct gttcccgggt ttcggttctg aatggatcaa cacctcttct      60
ggtcgtatct cgctcgtgt  tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga cagctgggt     300
cacgttcact cgctctggc  tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct accagttctc tttcctggct     480
cagccggctc gctgccgga  aaacctgctg ggtggtgacc cggacttcta cgttaaagct     540
aaactggctt cttggacccg tgctggtgac ctgtctgctt cgacccgcg  tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac  gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 27
<211> LENGTH: 304
<212> TYPE: PRT
<213> ORGANISM: Artificial Sequence
<220> FEATURE:
<223> OTHER INFORMATION: fluoroacetate dehalogenase mutant11(H155L, W156S)

<400> SEQUENCE: 27

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
```

```
                50                  55                  60
Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Leu Ser Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 28
<211> LENGTH: 912
<212> TYPE: DNA
<213> ORGANISM: Artificial Sequence
<220> FEATURE:
<223> OTHER INFORMATION: fluoroacetate dehalogenase mutant11(H155L,
      W156S)

<400> SEQUENCE: 28
atgccggacc tggctgacct gttcccgggt ttcggttctg aatggatcaa cacctcttct    60
ggtcgtatct cgctcgtgt tggtggtgac ggtccgccgc tgctgctgct gcacggtttc   120
ccgcagaccc acgttatgtg caccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga acagctgggt   300
cacgttcact tcgctctggc tggtcacgac cgtggtgctc gtgtttctta ccgtctggct   360
ctggactctc cggtcgtct gtctaaactg gctgttctgg acatcctgcc gacctacgaa   420
tactggcagc gtatgaaccg tgcttacgct ctgaaaatct acctgtcttc tttcctggct   480
cagccggctc cgctgccgga aaacctgctg ggtggtgacc cggacttcta cgttaaagct   540
aaactggctt cttggacccg tgctggtgac ctgtctgctt cgacccgcg tgctgttgaa   600 cactaccgta tcgctttcgc tgacccgatg cgtcgtcacg ttatgtgcga agactaccgt   660
```

-continued

```
gctggtgctt acgctgactt cgaacacgac aaaatcgacg ttgaagctgg taacaaaatc      720
ccggttccga tgctggctct gtggggtgct tctggtatcg ctcagtctgc tgctaccccg      780
ctggacgttt ggcgtaaatg ggcttctgac gttcagggtg ctccgatcga atctggtcac      840
ttcctgccgg aagaagctcc ggaccagacc gctgaagctc tggttcgttt cttctctgct      900
gctccgggtt ct                                                         912
```

<210> SEQ ID NO 29
<211> LENGTH: 304
<212> TYPE: PRT
<213> ORGANISM: Artificial Sequence
<220> FEATURE:
<223> OTHER INFORMATION: fluoroacetate dehalogenase mutant12(H155F, W156G)

<400> SEQUENCE: 29

```
Met Pro Asp Leu Ala Asp Leu Phe Pro Gly Phe Gly Ser Glu Trp Ile
 1               5                  10                  15

Asn Thr Ser Ser Gly Arg Ile Phe Ala Arg Val Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Phe Gly Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 30
<211> LENGTH: 912
<212> TYPE: DNA
<213> ORGANISM: Artificial Sequence
<220> FEATURE:
<223> OTHER INFORMATION: fluoroacetate dehalogenase mutant12(H155F, W156G)

<400> SEQUENCE: 30

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga acagctgggt   300
cacgttcact tcgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acttcggttc tttcctggct   480
cagccggctc gctgccgga aaacctgctg gtggtgacc cggacttcta cgttaaagct   540
aaactggctt cttggacccg tgctggtgac ctgtctgctt cgacccgcg tgctgttgaa   600
cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg gcttctgac gttcagggtg ctccgatcga atctggtcac   840
ttcctgccgg aagaagctcc ggaccagacc gctgaagctc tggttcgttt cttctctgct   900
gctccgggtt ct                                                        912
```

<210> SEQ ID NO 31
<211> LENGTH: 304
<212> TYPE: PRT
<213> ORGANISM: Artificial Sequence
<220> FEATURE:
<223> OTHER INFORMATION: fluoroacetate dehalogenase mutant13(H155F, W156L)

<400> SEQUENCE: 31

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
```

```
              130                 135                 140
Met Asn Arg Ala Tyr Ala Leu Lys Ile Tyr Phe Leu Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 32
<211> LENGTH: 912
<212> TYPE: DNA
<213> ORGANISM: Artificial Sequence
<220> FEATURE:
<223> OTHER INFORMATION: fluoroacetate dehalogenase mutant13(H155F, W156L)

<400> SEQUENCE: 32

```
atgccggacc tggctgacct gttcccgggt tcggttctg  aatggatcaa cacctcttct      60
ggtcgtatct tcgctcgtgt tggtggtgac ggtccgccgc tgctgctgct gcacggtttc    120
ccgcagaccc acgttatgtg caccgtgtt gctccgaaac tggctgaacg tttcaaagtt     180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact cgctctggc tggtcacgac cgtggtgctc gtgtttctta ccgtctggct     360
ctggactctc cgggtcgtct gtctaaactg gctgttctgg acatcctgcc gacctacgaa    420
tactggcagc gtatgaaccg tgcttacgct ctgaaaatct acttcctgtc tttcctggct   480
cagccggctc cgctgccgga aaacctgctg gtggtgacc cggacttcta cgttaaagct     540
aaactggctt cttggacccg tgctggtgac ctgtctgctt cgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg   780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct   900
gctccgggtt ct                                                        912
```

<210> SEQ ID NO 33
<211> LENGTH: 304
<212> TYPE: PRT

<213> ORGANISM: Artificial Sequence
<220> FEATURE:
<223> OTHER INFORMATION: fluoroacetate dehalogenase mutant14(H155Q, W156L)

<400> SEQUENCE: 33

| Met | Pro | Asp | Leu | Ala | Asp | Leu | Phe | Pro | Gly | Phe | Gly | Ser | Glu | Trp | Ile |
|---|---|---|---|---|---|---|---|---|---|---|---|---|---|---|---|
| 1 | | | | 5 | | | | | 10 | | | | | 15 | |

| Asn | Thr | Ser | Ser | Gly | Arg | Ile | Phe | Ala | Arg | Val | Gly | Gly | Asp | Gly | Pro |
| | | | 20 | | | | | 25 | | | | | 30 | | |

| Pro | Leu | Leu | Leu | His | Gly | Phe | Pro | Gln | Thr | His | Val | Met | Trp | His |
| | | 35 | | | | | 40 | | | | | 45 | | |

| Arg | Val | Ala | Pro | Lys | Leu | Ala | Glu | Arg | Phe | Lys | Val | Ile | Val | Ala | Asp |
| | 50 | | | | | 55 | | | | | 60 | | | | |

| Leu | Pro | Gly | Tyr | Gly | Trp | Ser | Asp | Met | Pro | Glu | Ser | Asp | Gln | His |
| 65 | | | | 70 | | | | | 75 | | | | | 80 |

| Thr | Pro | Tyr | Thr | Lys | Arg | Ala | Met | Ala | Lys | Gln | Leu | Ile | Glu | Ala | Met |
| | | | 85 | | | | | 90 | | | | | 95 | | |

| Glu | Gln | Leu | Gly | His | Val | His | Phe | Ala | Leu | Ala | Gly | His | Asp | Arg | Gly |
| | | | 100 | | | | | 105 | | | | | 110 | | |

| Ala | Arg | Val | Ser | Tyr | Arg | Leu | Ala | Leu | Asp | Ser | Pro | Gly | Arg | Leu | Ser |
| | | | 115 | | | | | 120 | | | | | 125 | | |

| Lys | Leu | Ala | Val | Leu | Asp | Ile | Leu | Pro | Thr | Tyr | Glu | Tyr | Trp | Gln | Arg |
| | 130 | | | | | 135 | | | | | 140 | | | | |

| Met | Asn | Arg | Ala | Tyr | Ala | Leu | Lys | Ile | Tyr | Gln | Leu | Ser | Phe | Leu | Ala |
| 145 | | | | | 150 | | | | | 155 | | | | | 160 |

| Gln | Pro | Ala | Pro | Leu | Pro | Glu | Asn | Leu | Leu | Gly | Gly | Asp | Pro | Asp | Phe |
| | | | | | 165 | | | | | 170 | | | | | 175 |

| Tyr | Val | Lys | Ala | Lys | Leu | Ala | Ser | Trp | Thr | Arg | Ala | Gly | Asp | Leu | Ser |
| | | | 180 | | | | | 185 | | | | | 190 | | |

| Ala | Phe | Asp | Pro | Arg | Ala | Val | Glu | His | Tyr | Arg | Ile | Ala | Phe | Ala | Asp |
| | | 195 | | | | | 200 | | | | | 205 | | | |

| Pro | Met | Arg | Arg | His | Val | Met | Cys | Glu | Asp | Tyr | Arg | Ala | Gly | Ala | Tyr |
| | 210 | | | | | 215 | | | | | 220 | | | | |

| Ala | Asp | Phe | Glu | His | Asp | Lys | Ile | Asp | Val | Glu | Ala | Gly | Asn | Lys | Ile |
| 225 | | | | | 230 | | | | | 235 | | | | | 240 |

| Pro | Val | Pro | Met | Leu | Ala | Leu | Trp | Gly | Ala | Ser | Gly | Ile | Ala | Gln | Ser |
| | | | | 245 | | | | | 250 | | | | | 255 | |

| Ala | Ala | Thr | Pro | Leu | Asp | Val | Trp | Arg | Lys | Trp | Ala | Ser | Asp | Val | Gln |
| | | | 260 | | | | | 265 | | | | | 270 | | |

| Gly | Ala | Pro | Ile | Glu | Ser | Gly | His | Phe | Leu | Pro | Glu | Glu | Ala | Pro | Asp |
| | | | 275 | | | | | 280 | | | | | 285 | | |

| Gln | Thr | Ala | Glu | Ala | Leu | Val | Arg | Phe | Phe | Ser | Ala | Ala | Pro | Gly | Ser |
| | 290 | | | | | 295 | | | | | 300 | | | | |

<210> SEQ ID NO 34
<211> LENGTH: 912
<212> TYPE: DNA
<213> ORGANISM: Artificial Sequence
<220> FEATURE:
<223> OTHER INFORMATION: fluoroacetate dehalogenase mutant14(H155Q, W156L)

<400> SEQUENCE: 34

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
```

```
ccgcagaccc acgttatgtg caccgtgtt gctccgaaac tggctgaacg tttcaaagtt      180
atcgttgctg acctgccggg ttacggttgg tctgacatgc cggaatctga cgaacagcac      240
accccgtaca ccaaacgtgc tatggctaaa cagctgatcg aagctatgga acagctgggt      300
cacgttcact cgctctggc tggtcacgac cgtggtgctc gtgtttctta ccgtctggct      360
ctggactctc cgggtcgtct gtctaaactg gctgttctgg acatcctgcc gacctacgaa      420
tactggcagc gtatgaaccg tgcttacgct ctgaaaatct accagctgtc tttcctggct      480
cagccggctc cgctgccgga aaacctgctg gtggtgacc cggacttcta cgttaaagct      540
aaactggctt cttggacccg tgctggtgac ctgtctgctt cgacccgcg tgctgttgaa      600
cactaccgta tcgctttcgc tgacccgatg cgtcgtcacg ttatgtgcga agactaccgt      660
gctggtgctt acgctgactt cgaacacgac aaaatcgacg ttgaagctgg taacaaaatc      720
ccggttccga tgctggctct gtggggtgct tctggtatcg ctcagtctgc tgctaccccg      780
ctggacgttt ggcgtaaatg ggcttctgac gttcagggtg ctccgatcga atctggtcac      840
ttcctgccgg aagaagctcc ggaccagacc gctgaagctc tggttcgttt cttctctgct      900
gctccgggtt ct                                                          912
```

<210> SEQ ID NO 35
<211> LENGTH: 304
<212> TYPE: PRT
<213> ORGANISM: Artificial Sequence
<220> FEATURE:
<223> OTHER INFORMATION: fluoroacetate dehalogenase mutant15(H155V, W156D)

<400> SEQUENCE: 35

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Val Asp Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
```

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
            275                 280                 285

Gln Thr Ala Glu Ala Leu Val Arg Phe Phe Ser Ala Ala Pro Gly Ser
            290                 295                 300

<210> SEQ ID NO 36
<211> LENGTH: 912
<212> TYPE: DNA
<213> ORGANISM: Artificial Sequence
<220> FEATURE:
<223> OTHER INFORMATION: fluoroacetate dehalogenase mutant15(H155V, W156D)

<400> SEQUENCE: 36

```
atgccggacc tggctgacct gttcccgggt ttcggttctg aatggatcaa cacctcttct    60
ggtcgtatct cgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc ggaatctga cgaacagcac   240
accccgtaca ccaaacgtgc tatggctaaa cagctgatcg aagctatgga cagctgggt   300
cacgttcact cgctctggc tggtcacgac cgtggtgctc gtgtttctta ccgtctggct   360
ctggactctc cggtcgtct gtctaaactg gctgttctgg acatcctgcc gacctacgaa   420
tactggcagc gtatgaaccg tgcttacgct ctgaaaatct acgttgactc tttcctggct   480
cagccggctc gctgccgga aaacctgctg gtggtgacc cggacttcta cgttaaagct   540
aaactggctt cttggacccg tgctggtgac ctgtctgctt cgacccgcg tgctgttgaa   600
cactaccgta tcgctttcgc tgaccccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg gcttctgac gttcagggtg ctccgatcga atctggtcac   840
ttcctgccgg aagaagctcc ggaccagacc gctgaagctc tggttcgttt cttctctgct   900
gctccgggtt ct                                                       912
```

<210> SEQ ID NO 37
<211> LENGTH: 304
<212> TYPE: PRT
<213> ORGANISM: Artificial Sequence
<220> FEATURE:
<223> OTHER INFORMATION: fluoroacetate dehalogenase mutant16(H155M, W156A)

<400> SEQUENCE: 37

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Met Ala Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 38
<211> LENGTH: 912
<212> TYPE: DNA
<213> ORGANISM: Artificial Sequence
<220> FEATURE:
<223> OTHER INFORMATION: fluoroacetate dehalogenase mutant16(H155M,
      W156A)

<400> SEQUENCE: 38
atgccggacc tggctgacct gttcccgggt tcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acatggcttc tttcctggct     480
cagccggctc cgctgccgga aaacctgctg ggtggtgacc cggacttcta cgttaaagct     540
aaactggctt cttggacccg tgctggtgac ctgtctgctt tcgacccgcg tgctgttgaa     600

```
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 39
<211> LENGTH: 304
<212> TYPE: PRT
<213> ORGANISM: Artificial Sequence
<220> FEATURE:
<223> OTHER INFORMATION: fluoroacetate dehalogenase mutant17(H155L, W156I)

<400> SEQUENCE: 39

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Leu Ile Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
```

<210> SEQ ID NO 40
<211> LENGTH: 912
<212> TYPE: DNA
<213> ORGANISM: Artificial Sequence
<220> FEATURE:
<223> OTHER INFORMATION: fluoroacetate dehalogenase mutant17(H155L, W156I)

<400> SEQUENCE: 40

```
atgccggacc tggctgacct gttcccgggt tcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acctgatctc tttcctggct     480
cagccggctc cgctgccgga aaacctgctg gtggtgacc cggacttcta cgttaaagct     540
aaactggctt cttggacccg tgctggtgac ctgtctgctt cgacccgcg tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg ggcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 41
<211> LENGTH: 304
<212> TYPE: PRT
<213> ORGANISM: Artificial Sequence
<220> FEATURE:
<223> OTHER INFORMATION: fluoroacetate dehalogenase mutant18(H155F, W156M)

<400> SEQUENCE: 41

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
                20                  25                  30

Pro Leu Leu Leu Leu His Gly Phe Pro Gln Thr His Val Met Trp His
            35                  40                  45

Arg Val Ala Pro Lys Leu Ala Glu Arg Phe Lys Val Ile Val Ala Asp
        50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

```
Lys Leu Ala Val Leu Asp Ile Leu Pro Thr Tyr Glu Tyr Trp Gln Arg
            130                 135                 140

Met Asn Arg Ala Tyr Ala Leu Lys Ile Tyr Phe Met Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 42
<211> LENGTH: 912
<212> TYPE: DNA
<213> ORGANISM: Artificial Sequence
<220> FEATURE:
<223> OTHER INFORMATION: fluoroacetate dehalogenase mutant18(H155F, W156M)

<400> SEQUENCE: 42

```
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc ggaatctga cgaacagcac     240 accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acttcatgtc tttcctggct     480
cagccggctc cgctgccgga aaacctgctg ggtggtgacc cggacttcta cgttaaagct     540
aaactggctt cttggacccg tgctggtgac ctgtctgctt cgacccgcg tgctgttgaa     600 cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 43

<211> LENGTH: 304
<212> TYPE: PRT
<213> ORGANISM: Artificial Sequence
<220> FEATURE:
<223> OTHER INFORMATION: fluoroacetate dehalogenase mutant19(H155F, W156R)

<400> SEQUENCE: 43

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Phe Arg Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 44
<211> LENGTH: 912
<212> TYPE: DNA
<213> ORGANISM: Artificial Sequence
<220> FEATURE:
<223> OTHER INFORMATION: fluoroacetate dehalogenase mutant19(H155F, W156R)

<400> SEQUENCE: 44

```
atgccggacc tggctgacct gttcccgggt ttcggttctg aatggatcaa cacctcttct    60
```

```
ggtcgtatct tcgctcgtgt tggtggtgac ggtccgccgc tgctgctgct gcacggtttc      120
ccgcagaccc acgttatgtg gcaccgtgtt gctccgaaac tggctgaacg tttcaaagtt      180
atcgttgctg acctgccggg ttacggttgg tctgacatgc cggaatctga cgaacagcac      240
accccgtaca ccaaacgtgc tatggctaaa cagctgatcg aagctatgga acagctgggt      300
cacgttcact cgctctggc tggtcacgac cgtggtgctc gtgtttctta ccgtctggct      360
ctggactctc cgggtcgtct gtctaaactg gctgttctgg acatcctgcc gacctacgaa      420
tactggcagc gtatgaaccg tgcttacgct ctgaaaatct acttccgttc tttcctggct      480
cagccggctc cgctgccgga aaacctgctg ggtggtgacc cggacttcta cgttaaagct      540
aaactggctt cttggacccg tgctggtgac ctgtctgctt cgacccgcg tgctgttgaa      600 cactaccgta tcgctttcgc tgacccgatg cgtcgtcacg ttatgtgcga agactaccgt      660
gctggtgctt acgctgactt cgaacacgac aaaatcgacg ttgaagctgg taacaaaatc      720
ccggttccga tgctggctct gtggggtgct tctggtatcg ctcagtctgc tgctaccccg      780
ctggacgttt ggcgtaaatg ggcttctgac gttcagggtg ctccgatcga atctggtcac      840
ttcctgccgg aagaagctcc ggaccagacc gctgaagctc tggttcgttt cttctctgct      900
gctccgggtt ct                                                          912
```

<210> SEQ ID NO 45
<211> LENGTH: 304
<212> TYPE: PRT
<213> ORGANISM: Artificial Sequence
<220> FEATURE:
<223> OTHER INFORMATION: fluoroacetate dehalogenase mutant20(H155A, W156F)

<400> SEQUENCE: 45

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Ala Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205
```

Pro Met Arg Arg His Val Met Cys Glu Asp Tyr Arg Ala Gly Ala Tyr
        210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
                260                 265                 270

Gly Ala Pro Ile Glu Ser Gly His Phe Leu Pro Glu Glu Ala Pro Asp
            275                 280                 285

Gln Thr Ala Glu Ala Leu Val Arg Phe Phe Ser Ala Ala Pro Gly Ser
        290                 295                 300

<210> SEQ ID NO 46
<211> LENGTH: 912
<212> TYPE: DNA
<213> ORGANISM: Artificial Sequence
<220> FEATURE:
<223> OTHER INFORMATION: fluoroacetate dehalogenase mutant20(H155A, W156F)

<400> SEQUENCE: 46
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga cagctgggt      300 cacgttcact cgctctggc tggtcacgac cgtggtgctc gtgtttctta ccgtctggct      360
ctggactctc gggtcgtct gtctaaactg gctgttctgg acatcctgcc gacctacgaa      420
tactggcagc gtatgaaccg tgcttacgct ctgaaaatct acgctttctc tttcctggct     480
cagccggctc cgctgccgga aacctgctg gtggtgacc cggacttcta cgttaaagct      540
aaactggctt cttggacccg tgctggtgac ctgtctgctt cgacccgcg tgctgttgaa      600 cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac      840
ttcctgccgg aagaagctcc ggaccagacc gctgaagctc tggttcgttt cttctctgct     900
gctccgggtt ct                                                         912

<210> SEQ ID NO 47
<211> LENGTH: 304
<212> TYPE: PRT
<213> ORGANISM: Artificial Sequence
<220> FEATURE:
<223> OTHER INFORMATION: fluoroacetate dehalogenase mutant21(H155P, W156Y)

<400> SEQUENCE: 47

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
       35                  40                  45

Arg Val Ala Pro Lys Leu Ala Glu Arg Phe Lys Val Ile Val Ala Asp
 50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Pro Tyr Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300

<210> SEQ ID NO 48
<211> LENGTH: 912
<212> TYPE: DNA
<213> ORGANISM: Artificial Sequence
<220> FEATURE:
<223> OTHER INFORMATION: fluoroacetate dehalogenase mutant21(H155P,
      W156Y)

<400> SEQUENCE: 48
atgccggacc tggctgacct gttcccgggt tcggttctg aatggatcaa cacctcttct      60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact tcgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acccgtactc tttcctggct    480
cagccggctc cgctgccgga aaacctgctg ggtggtgacc cggacttcta cgttaaagct    540

```
aaactggctt cttggacccg tgctggtgac ctgtctgctt tcgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 49
<211> LENGTH: 304
<212> TYPE: PRT
<213> ORGANISM: Artificial Sequence
<220> FEATURE:
<223> OTHER INFORMATION: fluoroacetate dehalogenase mutant22(W156T)

<400> SEQUENCE: 49

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr His Thr Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285
```

Gln Thr Ala Glu Ala Leu Val Arg Phe Phe Ser Ala Ala Pro Gly Ser
    290                 295                 300

<210> SEQ ID NO 50
<211> LENGTH: 912
<212> TYPE: DNA
<213> ORGANISM: Artificial Sequence
<220> FEATURE:
<223> OTHER INFORMATION: fluoroacetate dehalogenase mutant22(W156T)

<400> SEQUENCE: 50
atgccggacc tggctgacct gttcccgggt tcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct accacacctc tttcctggct    480
cagccggctc cgctgccgga aaacctgctg gtggtgacc cggacttcta cgttaaagct    540
aaactggctt cttggacccg tgctggtgac ctgtctgctt cgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912

<210> SEQ ID NO 51
<211> LENGTH: 304
<212> TYPE: PRT
<213> ORGANISM: Artificial Sequence
<220> FEATURE:
<223> OTHER INFORMATION: fluoroacetate dehalogenase mutant23(H155V)

<400> SEQUENCE: 51

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Val Trp Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 52
<211> LENGTH: 912
<212> TYPE: DNA
<213> ORGANISM: Artificial Sequence
<220> FEATURE:
<223> OTHER INFORMATION: fluoroacetate dehalogenase mutant23(H155V)

<400> SEQUENCE: 52

| | | | | | |
|---|---|---|---|---|---|
| atgccggacc | tggctgacct | gttcccgggt | ttcggttctg | aatggatcaa | cacctcttct | 60 |
| ggtcgtatct | tcgctcgtgt | tggtggtgac | ggtccgccgc | tgctgctgct | gcacggtttc | 120 |
| ccgcagaccc | acgttatgtg | caccgtgtt | gctccgaaac | tggctgaacg | tttcaaagtt | 180 |
| atcgttgctg | acctgccggg | ttacggttgg | tctgacatgc | cggaatctga | cgaacagcac | 240 |
| accccgtaca | ccaaacgtgc | tatggctaaa | cagctgatcg | aagctatgga | cagctgggt | 300 |
| cacgttcact | cgctctggc | tggtcacgac | cgtggtgctc | gtgtttctta | ccgtctggct | 360 |
| ctggactctc | cgggtcgtct | gtctaaactg | gctgttctgg | acatcctgcc | gacctacgaa | 420 |
| tactggcagc | gtatgaaccg | tgcttacgct | ctgaaaatct | acgtttggtc | tttcctggct | 480 |
| cagccggctc | cgctgccgga | aaacctgctg | ggtggtgacc | cggacttcta | cgttaaagct | 540 |
| aaactggctt | cttggacccg | tgctggtgac | ctgtctgctt | tcgacccgcg | tgctgttgaa | 600 |
| cactaccgta | tcgctttcgc | tgacccgatg | cgtcgtcacg | ttatgtgcga | agactaccgt | 660 |
| gctggtgctt | acgctgactt | cgaacacgac | aaaatcgacg | ttgaagctgg | taacaaaatc | 720 |
| ccggttccga | tgctggctct | gtggggtgct | tctggtatcg | ctcagtctgc | tgctaccccg | 780 |
| ctggacgttt | ggcgtaaatg | ggcttctgac | gttcagggtg | ctccgatcga | atctggtcac | 840 |
| ttcctgccgg | aagaagctcc | ggaccagacc | gctgaagctc | tggttcgttt | cttctctgct | 900 |
| gctccgggtt | ct | | | | | 912 |

<210> SEQ ID NO 53
<211> LENGTH: 304
<212> TYPE: PRT

<213> ORGANISM: Artificial Sequence
<220> FEATURE:
<223> OTHER INFORMATION: fluoroacetate dehalogenase mutant24(W156C)

<400> SEQUENCE: 53

```
Met Pro Asp Leu Ala Asp Leu Phe Pro Gly Phe Gly Ser Glu Trp Ile
1               5                   10                  15
Asn Thr Ser Ser Gly Arg Ile Phe Ala Arg Val Gly Gly Asp Gly Pro
            20                  25                  30
Pro Leu Leu Leu Leu His Gly Phe Pro Gln Thr His Val Met Trp His
        35                  40                  45
Arg Val Ala Pro Lys Leu Ala Glu Arg Phe Lys Val Ile Val Ala Asp
50                  55                  60
Leu Pro Gly Tyr Gly Trp Ser Asp Met Pro Glu Ser Asp Glu Gln His
65                  70                  75                  80
Thr Pro Tyr Thr Lys Arg Ala Met Ala Lys Gln Leu Ile Glu Ala Met
                85                  90                  95
Glu Gln Leu Gly His Val His Phe Ala Leu Ala Gly His Asp Arg Gly
            100                 105                 110
Ala Arg Val Ser Tyr Arg Leu Ala Leu Asp Ser Pro Gly Arg Leu Ser
        115                 120                 125
Lys Leu Ala Val Leu Asp Ile Leu Pro Thr Tyr Glu Tyr Trp Gln Arg
130                 135                 140
Met Asn Arg Ala Tyr Ala Leu Lys Ile Tyr His Cys Ser Phe Leu Ala
145                 150                 155                 160
Gln Pro Ala Pro Leu Pro Glu Asn Leu Leu Gly Gly Asp Pro Asp Phe
                165                 170                 175
Tyr Val Lys Ala Lys Leu Ala Ser Trp Thr Arg Ala Gly Asp Leu Ser
            180                 185                 190
Ala Phe Asp Pro Arg Ala Val Glu His Tyr Arg Ile Ala Phe Ala Asp
        195                 200                 205
Pro Met Arg Arg His Val Met Cys Glu Asp Tyr Arg Ala Gly Ala Tyr
210                 215                 220
Ala Asp Phe Glu His Asp Lys Ile Asp Val Glu Ala Gly Asn Lys Ile
225                 230                 235                 240
Pro Val Pro Met Leu Ala Leu Trp Gly Ala Ser Gly Ile Ala Gln Ser
                245                 250                 255
Ala Ala Thr Pro Leu Asp Val Trp Arg Lys Trp Ala Ser Asp Val Gln
            260                 265                 270
Gly Ala Pro Ile Glu Ser Gly His Phe Leu Pro Glu Glu Ala Pro Asp
        275                 280                 285
Gln Thr Ala Glu Ala Leu Val Arg Phe Phe Ser Ala Ala Pro Gly Ser
290                 295                 300
```

<210> SEQ ID NO 54
<211> LENGTH: 912
<212> TYPE: DNA
<213> ORGANISM: Artificial Sequence
<220> FEATURE:
<223> OTHER INFORMATION: fluoroacetate dehalogenase mutant24(W156C)

<400> SEQUENCE: 54

```
atgccggacc tggctgacct gttcccgggt ttcggttctg aatggatcaa cacctcttct    60
ggtcgtatct cgctcgtgt tggtggtgac ggtccgccgc tgctgctgct gcacggtttc   120
ccgcagaccc acgttatgtg gcaccgtgtt gctccgaaac tggctgaacg tttcaaagtt   180
```

-continued

```
atcgttgctg acctgccggg ttacggttgg tctgacatgc cggaatctga cgaacagcac    240 acccgtaca ccaaacgtgc tatggctaaa cagctgatcg aagctatgga acagctgggt    300
cacgttcact cgctctggc tggtcacgac cgtggtgctc gtgtttctta ccgtctggct    360
ctggactctc cggtcgtct gtctaaactg gctgttctgg acatcctgcc gacctacgaa    420
tactggcagc gtatgaaccg tgcttacgct ctgaaaatct accactgctc tttcctggct    480
cagccggctc cgctgccgga aaacctgctg gtggtgacc cggacttcta cgttaaagct    540
aaactggctt cttggacccg tgctggtgac ctgtctgctt cgacccgcg tgctgttgaa    600 cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 55
<211> LENGTH: 304
<212> TYPE: PRT
<213> ORGANISM: Artificial Sequence
<220> FEATURE:
<223> OTHER INFORMATION: fluoroacetate dehalogenase mutant25(H155T, W156F)

<400> SEQUENCE: 55

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Thr Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220
```

```
Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
        260                 265                 270

Gly Ala Pro Ile Glu Ser Gly His Phe Leu Pro Glu Glu Ala Pro Asp
    275                 280                 285

Gln Thr Ala Glu Ala Leu Val Arg Phe Ser Ala Ala Pro Gly Ser
    290                 295                 300
```

<210> SEQ ID NO 56
<211> LENGTH: 912
<212> TYPE: DNA
<213> ORGANISM: Artificial Sequence
<220> FEATURE:
<223> OTHER INFORMATION: fluoroacetate dehalogenase mutant25(H155T, W156F)

<400> SEQUENCE: 56

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga cagctgggt      300
cacgttcact cgctctggc tggtcacgac cgtggtgctc gtgtttctta ccgtctggct      360
ctggactctc cgggtcgtct gtctaaactg gctgttctgg acatcctgcc gacctacgaa     420
tactggcagc gtatgaaccg tgcttacgct ctgaaaatct acaccttctc tttcctggct     480
cagccggctc gctgccgga aaacctgctg ggtggtgacc cggacttcta cgttaaagct      540
aaactggctt cttggacccg tgctggtgac ctgtctgctt cgacccgcg tgctgttgaa      600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtgggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct    900
gctccgggtt ct                                                         912
```

<210> SEQ ID NO 57
<211> LENGTH: 304
<212> TYPE: PRT
<213> ORGANISM: Artificial Sequence
<220> FEATURE:
<223> OTHER INFORMATION: fluoroacetate dehalogenase mutant26(H155W, W156I)

<400> SEQUENCE: 57

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
```

```
                50                  55                  60
Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
                100                 105                 110

Ala Arg Val Ser Tyr Arg Leu Ala Leu Asp Ser Pro Gly Arg Leu Ser
                115                 120                 125

Lys Leu Ala Val Leu Asp Ile Leu Pro Thr Tyr Glu Tyr Trp Gln Arg
                130                 135                 140

Met Asn Arg Ala Tyr Ala Leu Lys Ile Tyr Trp Ile Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
                180                 185                 190

Ala Phe Asp Pro Arg Ala Val Glu His Tyr Arg Ile Ala Phe Ala Asp
                195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
                260                 265                 270

Gly Ala Pro Ile Glu Ser Gly His Phe Leu Pro Glu Ala Pro Asp
                275                 280                 285

Gln Thr Ala Glu Ala Leu Val Arg Phe Phe Ser Ala Ala Pro Gly Ser
290                 295                 300
```

<210> SEQ ID NO 58
<211> LENGTH: 912
<212> TYPE: DNA
<213> ORGANISM: Artificial Sequence
<220> FEATURE:
<223> OTHER INFORMATION: fluoroacetate dehalogenase mutant26(H155W, W156I)

<400> SEQUENCE: 58

```
atgccggacc tggctgacct gttcccgggt tcggttctg aatggatcaa cacctcttct    60
ggtcgtatct cgctcgtgt tggtggtgac ggtccgccgc tgctgctgct gcacggtttc   120
ccgcagaccc acgttatgtg caccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga acagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct actggatctc tttcctggct   480
cagccggctc cgctgccgga aaacctgctg ggtggtgacc cggacttcta cgttaaagct   540
aaactggctt cttggacccg tgctggtgac ctgtctgctt cgacccgcg tgctgttgaa   600 cactaccgta tcgctttcgc tgacccgatg cgtcgtcacg ttatgtgcga agactaccgt   660
```

-continued

```
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 59
<211> LENGTH: 304
<212> TYPE: PRT
<213> ORGANISM: Artificial Sequence
<220> FEATURE:
<223> OTHER INFORMATION: fluoroacetate dehalogenase mutant27(H155L, W156L)

<400> SEQUENCE: 59

```
Met Pro Asp Leu Ala Asp Leu Phe Pro Gly Phe Gly Ser Glu Trp Ile
  1               5                  10                  15

Asn Thr Ser Ser Gly Arg Ile Phe Ala Arg Val Gly Asp Gly Pro
             20                  25                  30

Pro Leu Leu Leu Leu His Gly Phe Pro Gln Thr His Val Met Trp His
         35                  40                  45

Arg Val Ala Pro Lys Leu Ala Glu Arg Phe Lys Val Ile Val Ala Asp
     50                  55                  60

Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Leu Leu Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 60
<211> LENGTH: 912
<212> TYPE: DNA
<213> ORGANISM: Artificial Sequence
<220> FEATURE:
<223> OTHER INFORMATION: fluoroacetate dehalogenase mutant27(H155L, W156L)

<400> SEQUENCE: 60

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acctgctgtc tttcctggct     480
cagccggctc gctgccgga aaacctgctg gtggtgacc cggacttcta cgttaaagct     540
aaactggctt cttggacccg tgctggtgac ctgtctgctt cgacccgcg tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg ggcttctgac gttcagggtg ctccgatcga atctggtcac     840
ttcctgccgg aagaagctcc ggaccagacc gctgaagctc tggttcgttt cttctctgct     900
gctccgggtt ct                                                          912
```

<210> SEQ ID NO 61
<211> LENGTH: 304
<212> TYPE: PRT
<213> ORGANISM: Artificial Sequence
<220> FEATURE:
<223> OTHER INFORMATION: fluoroacetate dehalogenase mutant28(H155P, W156T)

<400> SEQUENCE: 61

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
```

```
                130              135              140
Met Asn Arg Ala Tyr Ala Leu Lys Ile Tyr Pro Thr Ser Phe Leu Ala
145                 150                  155                 160

Gln Pro Ala Pro Leu Pro Glu Asn Leu Leu Gly Gly Asp Pro Asp Phe
                165                  170                 175

Tyr Val Lys Ala Lys Leu Ala Ser Trp Thr Arg Ala Gly Asp Leu Ser
                180                  185                 190

Ala Phe Asp Pro Arg Ala Val Glu His Tyr Arg Ile Ala Phe Ala Asp
                195                  200                 205

Pro Met Arg Arg His Val Met Cys Glu Asp Tyr Arg Ala Gly Ala Tyr
210                 215                  220

Ala Asp Phe Glu His Asp Lys Ile Asp Val Glu Ala Gly Asn Lys Ile
225                 230                  235                 240

Pro Val Pro Met Leu Ala Leu Trp Gly Ala Ser Gly Ile Ala Gln Ser
                245                  250                 255

Ala Ala Thr Pro Leu Asp Val Trp Arg Lys Trp Ala Ser Asp Val Gln
                260                  265                 270

Gly Ala Pro Ile Glu Ser Gly His Phe Leu Pro Glu Glu Ala Pro Asp
                275                  280                 285

Gln Thr Ala Glu Ala Leu Val Arg Phe Phe Ser Ala Ala Pro Gly Ser
    290                  295                 300
```

<210> SEQ ID NO 62
<211> LENGTH: 912
<212> TYPE: DNA
<213> ORGANISM: Artificial Sequence
<220> FEATURE:
<223> OTHER INFORMATION: fluoroacetate dehalogenase mutant28(H155P, W156T)

<400> SEQUENCE: 62

```
atgccggacc tggctgacct gttcccgggt ttcggttctg aatggatcaa cacctcttct     60
ggtcgtatct tcgctcgtgt tggtggtgac ggtccgccgc tgctgctgct gcacggtttc    120
ccgcagaccc acgttatgtg caccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga cagctgggt    300
cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct cccgacctc tttcctggct    480
cagccggctc cgctgccgga aaacctgctg ggtggtgacc cggacttcta cgttaaagct    540
aaactggctt cttggacccg tgctggtgac ctgtctgctt cgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                         912
```

<210> SEQ ID NO 63
<211> LENGTH: 304
<212> TYPE: PRT

<213> ORGANISM: Artificial Sequence
<220> FEATURE:
<223> OTHER INFORMATION: fluoroacetate dehalogenase mutant29(H155C, W156M)

<400> SEQUENCE: 63

```
Met Pro Asp Leu Ala Asp Leu Phe Pro Gly Phe Gly Ser Glu Trp Ile
1               5                   10                  15
Asn Thr Ser Ser Gly Arg Ile Phe Ala Arg Val Gly Asp Gly Pro
            20                  25                  30
Pro Leu Leu Leu Leu His Gly Phe Pro Gln Thr His Val Met Trp His
        35                  40                  45
Arg Val Ala Pro Lys Leu Ala Glu Arg Phe Lys Val Ile Val Ala Asp
    50                  55                  60
Leu Pro Gly Tyr Gly Trp Ser Asp Met Pro Glu Ser Asp Gln His
65                  70                  75                  80
Thr Pro Tyr Thr Lys Arg Ala Met Ala Lys Gln Leu Ile Glu Ala Met
                85                  90                  95
Glu Gln Leu Gly His Val His Phe Ala Leu Ala Gly His Asp Arg Gly
            100                 105                 110
Ala Arg Val Ser Tyr Arg Leu Ala Leu Asp Ser Pro Gly Arg Leu Ser
        115                 120                 125
Lys Leu Ala Val Leu Asp Ile Leu Pro Thr Tyr Glu Tyr Trp Gln Arg
    130                 135                 140
Met Asn Arg Ala Tyr Ala Leu Lys Ile Tyr Cys Met Ser Phe Leu Ala
145                 150                 155                 160
Gln Pro Ala Pro Leu Pro Glu Asn Leu Leu Gly Gly Asp Pro Asp Phe
                165                 170                 175
Tyr Val Lys Ala Lys Leu Ala Ser Trp Thr Arg Ala Gly Asp Leu Ser
            180                 185                 190
Ala Phe Asp Pro Arg Ala Val Glu His Tyr Arg Ile Ala Phe Ala Asp
        195                 200                 205
Pro Met Arg Arg His Val Met Cys Glu Asp Tyr Arg Ala Gly Ala Tyr
    210                 215                 220
Ala Asp Phe Glu His Asp Lys Ile Asp Val Glu Ala Gly Asn Lys Ile
225                 230                 235                 240
Pro Val Pro Met Leu Ala Leu Trp Gly Ala Ser Gly Ile Ala Gln Ser
                245                 250                 255
Ala Ala Thr Pro Leu Asp Val Trp Arg Lys Trp Ala Ser Asp Val Gln
            260                 265                 270
Gly Ala Pro Ile Glu Ser Gly His Phe Leu Pro Glu Glu Ala Pro Asp
        275                 280                 285
Gln Thr Ala Glu Ala Leu Val Arg Phe Phe Ser Ala Ala Pro Gly Ser
    290                 295                 300
```

<210> SEQ ID NO 64
<211> LENGTH: 912
<212> TYPE: DNA
<213> ORGANISM: Artificial Sequence
<220> FEATURE:
<223> OTHER INFORMATION: fluoroacetate dehalogenase mutant29(H155C, W156M)

<400> SEQUENCE: 64

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
```

```
ccgcagaccc acgttatgtg caccgtgtt gctccgaaac tggctgaacg tttcaaagtt      180
atcgttgctg acctgccggg ttacggttgg tctgacatgc cggaatctga cgaacagcac      240
accccgtaca ccaaacgtgc tatggctaaa cagctgatcg aagctatgga acagctgggt      300
cacgttcact cgctctggc tggtcacgac cgtggtgctc gtgtttctta ccgtctggct      360
ctggactctc cgggtcgtct gtctaaactg gctgttctgg acatcctgcc gacctacgaa      420
tactggcagc gtatgaaccg tgcttacgct ctgaaaatct actgcatgtc tttcctggct      480
cagccggctc cgctgccgga aaacctgctg gtggtgacc cggacttcta cgttaaagct      540
aaactggctt cttggacccg tgctggtgac ctgtctgctt cgacccgcg tgctgttgaa      600
cactaccgta tcgctttcgc tgacccgatg cgtcgtcacg ttatgtgcga agactaccgt      660
gctggtgctt acgctgactt cgaacacgac aaaatcgacg ttgaagctgg taacaaaatc      720
ccggttccga tgctggctct gtggggtgct tctggtatcg ctcagtctgc tgctaccccg      780
ctggacgttt ggcgtaaatg ggcttctgac gttcagggtg ctccgatcga atctggtcac      840
ttcctgccgg aagaagctcc ggaccagacc gctgaagctc tggttcgttt cttctctgct      900
gctccgggtt ct                                                          912
```

<210> SEQ ID NO 65
<211> LENGTH: 304
<212> TYPE: PRT
<213> ORGANISM: Artificial Sequence
<220> FEATURE:
<223> OTHER INFORMATION: fluoroacetate dehalogenase mutant30(H155I, W156A)

<400> SEQUENCE: 65

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
                20                  25                  30

Pro Leu Leu Leu Leu His Gly Phe Pro Gln Thr His Val Met Trp His
            35                  40                  45

Arg Val Ala Pro Lys Leu Ala Glu Arg Phe Lys Val Ile Val Ala Asp
        50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Ile Ala Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
```

```
        210                 215                 220
Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
                260                 265                 270

Gly Ala Pro Ile Glu Ser Gly His Phe Leu Pro Glu Glu Ala Pro Asp
            275                 280                 285

Gln Thr Ala Glu Ala Leu Val Arg Phe Phe Ser Ala Ala Pro Gly Ser
        290                 295                 300
```

<210> SEQ ID NO 66
<211> LENGTH: 912
<212> TYPE: DNA
<213> ORGANISM: Artificial Sequence
<220> FEATURE:
<223> OTHER INFORMATION: fluoroacetate dehalogenase mutant30(H155I, W156A)

<400> SEQUENCE: 66

```
atgccggacc tggctgacct gttcccgggt ttcggttctg aatggatcaa cacctcttct    60
ggtcgtatct cgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
acccccgtaca ccaaacgtgc tatggctaaa cagctgatcg aagctatgga acagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acatcgcttc tttcctggct   480
cagccggctc gctgccgga aaacctgctg gtggtgacc cggacttcta cgttaaagct   540
aaactggctt cttggacccg tgctggtgac ctgtctgctt cgacccgcg tgctgttgaa   600
cactaccgta tcgctttcgc tgaccccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg gcttctgac gttcagggtg ctccgatcga atctggtcac   840
ttcctgccgg aagaagctcc ggaccagacc gctgaagctc tggttcgttt cttctctgct   900
gctccgggtt ct                                                       912
```

<210> SEQ ID NO 67
<211> LENGTH: 304
<212> TYPE: PRT
<213> ORGANISM: Artificial Sequence
<220> FEATURE:
<223> OTHER INFORMATION: fluoroacetate dehalogenase mutant31(H155L, W156A)

<400> SEQUENCE: 67

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45
```

```
Arg Val Ala Pro Lys Leu Ala Glu Arg Phe Lys Val Ile Val Ala Asp
 50                  55                  60
Leu Pro Gly Tyr Gly Trp Ser Asp Met Pro Glu Ser Asp Glu Gln His
 65                  70                  75                  80
Thr Pro Tyr Thr Lys Arg Ala Met Ala Lys Gln Leu Ile Glu Ala Met
                 85                  90                  95
Glu Gln Leu Gly His Val His Phe Ala Leu Ala Gly His Asp Arg Gly
            100                 105                 110
Ala Arg Val Ser Tyr Arg Leu Ala Leu Asp Ser Pro Gly Arg Leu Ser
        115                 120                 125
Lys Leu Ala Val Leu Asp Ile Leu Pro Thr Tyr Glu Tyr Trp Gln Arg
    130                 135                 140
Met Asn Arg Ala Tyr Ala Leu Lys Ile Tyr Leu Ala Ser Phe Leu Ala
145                 150                 155                 160
Gln Pro Ala Pro Leu Pro Glu Asn Leu Leu Gly Gly Asp Pro Asp Phe
                165                 170                 175
Tyr Val Lys Ala Lys Leu Ala Ser Trp Thr Arg Ala Gly Asp Leu Ser
            180                 185                 190
Ala Phe Asp Pro Arg Ala Val Glu His Tyr Arg Ile Ala Phe Ala Asp
        195                 200                 205
Pro Met Arg Arg His Val Met Cys Glu Asp Tyr Arg Ala Gly Ala Tyr
    210                 215                 220
Ala Asp Phe Glu His Asp Lys Ile Asp Val Glu Ala Gly Asn Lys Ile
225                 230                 235                 240
Pro Val Pro Met Leu Ala Leu Trp Gly Ala Ser Gly Ile Ala Gln Ser
                245                 250                 255
Ala Ala Thr Pro Leu Asp Val Trp Arg Lys Trp Ala Ser Asp Val Gln
            260                 265                 270
Gly Ala Pro Ile Glu Ser Gly His Phe Leu Pro Glu Glu Ala Pro Asp
        275                 280                 285
Gln Thr Ala Glu Ala Leu Val Arg Phe Phe Ser Ala Ala Pro Gly Ser
    290                 295                 300
```

<210> SEQ ID NO 68
<211> LENGTH: 912
<212> TYPE: DNA
<213> ORGANISM: Artificial Sequence
<220> FEATURE:
<223> OTHER INFORMATION: fluoroacetate dehalogenase mutant31(H155L, W156A)

<400> SEQUENCE: 68

```
atgccggacc tggctgacct gttcccgggt tcggttctg  aatggatcaa cacctcttct      60
ggtcgtatct tcgctcgtgt tggtggtgac ggtccgccgc tgctgctgct gcacggtttc     120
ccgcagaccc acgttatgtg caccgtgtt  gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact tcgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acctggcttc tttcctggct     480
cagccggctc cgctgccgga aaacctgctg ggtggtgacc cggacttcta cgttaaagct     540
aaactggctt cttggacccg tgctggtgac ctgtctgctt tcgacccgcg tgctgttgaa     600
```

```
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912

<210> SEQ ID NO 69
<211> LENGTH: 304
<212> TYPE: PRT
<213> ORGANISM: Artificial Sequence
<220> FEATURE:
<223> OTHER INFORMATION: fluoroacetate dehalogenase mutant32(W156F)

<400> SEQUENCE: 69

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr His Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 70
<211> LENGTH: 912
<212> TYPE: DNA
<213> ORGANISM: Artificial Sequence
<220> FEATURE:
<223> OTHER INFORMATION: fluoroacetate dehalogenase mutant32(W156F)

<400> SEQUENCE: 70

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
acccogtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct accacttctc tttcctggct     480
cagccggctc cgctgccgga aaacctgctg gtggtgacc cggacttcta cgttaaagct     540
aaactggctt cttggacccg tgctggtgac ctgtctgctt cgacccgcg tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg ggcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 71
<211> LENGTH: 304
<212> TYPE: PRT
<213> ORGANISM: Artificial Sequence
<220> FEATURE:
<223> OTHER INFORMATION: fluoroacetate dehalogenase mutant33(H155T, W156L)

<400> SEQUENCE: 71

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
```

```
                130              135                140
Met Asn Arg Ala Tyr Ala Leu Lys Ile Tyr Thr Leu Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 72
<211> LENGTH: 912
<212> TYPE: DNA
<213> ORGANISM: Artificial Sequence
<220> FEATURE:
<223> OTHER INFORMATION: fluoroacetate dehalogenase mutant33(H155T, W156L)

<400> SEQUENCE: 72

| | | | | | |
|---|---|---|---|---|---|
| atgccggacc | tggctgacct | gttcccgggt | ttcggttctg | aatggatcaa | cacctcttct | 60 |
| ggtcgtatct | tcgctcgtgt | tggtggtgac | ggtccgccgc | tgctgctgct | gcacggtttc | 120 |
| ccgcagaccc | acgttatgtg | caccgtgtt | gctccgaaac | tggctgaacg | tttcaaagtt | 180 |
| atcgttgctg | acctgccggg | ttacggttgg | tctgacatgc | cggaatctga | cgaacagcac | 240 |
| accccgtaca | ccaaacgtgc | tatggctaaa | cagctgatcg | aagctatgga | cagctgggt | 300 |
| cacgttcact | cgctctggc | tggtcacgac | cgtggtgctc | gtgtttctta | ccgtctggct | 360 |
| ctggactctc | cgggtcgtct | gtctaaactg | gctgttctgg | acatcctgcc | gacctacgaa | 420 |
| tactggcagc | gtatgaaccg | tgcttacgct | ctgaaaatct | acaccctgtc | tttcctggct | 480 |
| cagccggctc | cgctgccgga | aaacctgctg | ggtggtgacc | cggacttcta | cgttaaagct | 540 |
| aaactggctt | cttggacccg | tgctggtgac | ctgtctgctt | tcgacccgcg | tgctgttgaa | 600 |
| cactaccgta | tcgctttcgc | tgacccgatg | cgtcgtcacg | ttatgtgcga | agactaccgt | 660 |
| gctggtgctt | acgctgactt | cgaacacgac | aaaatcgacg | ttgaagctgg | taacaaaatc | 720 |
| ccggttccga | tgctggctct | gtggggtgct | tctggtatcg | ctcagtctgc | tgctaccccg | 780 |
| ctggacgttt | ggcgtaaatg | ggcttctgac | gttcagggtg | ctccgatcga | atctggtcac | 840 |
| ttcctgccgg | aagaagctcc | ggaccagacc | gctgaagctc | tggttcgttt | cttctctgct | 900 |
| gctccgggtt | ct | | | | | 912 |

<210> SEQ ID NO 73
<211> LENGTH: 304
<212> TYPE: PRT

<213> ORGANISM: Artificial Sequence
<220> FEATURE:
<223> OTHER INFORMATION: fluoroacetate dehalogenase mutant34(H155V, W156Y)

<400> SEQUENCE: 73

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Val Tyr Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300
```

<210> SEQ ID NO 74
<211> LENGTH: 912
<212> TYPE: DNA
<213> ORGANISM: Artificial Sequence
<220> FEATURE:
<223> OTHER INFORMATION: fluoroacetate dehalogenase mutant34(H155V, W156Y)

<400> SEQUENCE: 74

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
```

-continued

```
ccgcagaccc acgttatgtg gcaccgtgtt gctccgaaac tggctgaacg tttcaaagtt      180
atcgttgctg acctgccggg ttacggttgg tctgacatgc cggaatctga cgaacagcac      240
accccgtaca ccaaacgtgc tatggctaaa cagctgatcg aagctatgga acagctgggt      300
cacgttcact cgctctggc tggtcacgac cgtggtgctc gtgtttctta ccgtctggct       360
ctggactctc cgggtcgtct gtctaaactg gctgttctgg acatcctgcc gacctacgaa      420
tactggcagc gtatgaaccg tgcttacgct ctgaaaatct acgtttactc tttcctggct      480
cagccggctc cgctgccgga aaacctgctg ggtggtgacc cggacttcta cgttaaagct      540
aaactggctt cttggacccg tgctggtgac ctgtctgctt cgacccgcg tgctgttgaa       600 cactaccgta tcgctttcgc tgacccgatg cgtcgtcacg ttatgtgcga agactaccgt      660
gctggtgctt acgctgactt cgaacacgac aaaatcgacg ttgaagctgg taacaaaatc      720
ccggttccga tgctggctct gtggggtgct tctggtatcg ctcagtctgc tgctaccccg      780
ctggacgttt ggcgtaaatg ggcttctgac gttcagggtg ctccgatcga atctggtcac      840
ttcctgccgg aagaagctcc ggaccagacc gctgaagctc tggttcgttt cttctctgct      900
gctccgggtt ct                                                          912
```

<210> SEQ ID NO 75
<211> LENGTH: 304
<212> TYPE: PRT
<213> ORGANISM: Artificial Sequence
<220> FEATURE:
<223> OTHER INFORMATION: fluoroacetate dehalogenase mutant35(H155I, W156P)

<400> SEQUENCE: 75

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
                20                  25                  30

Pro Leu Leu Leu Leu His Gly Phe Pro Gln Thr His Val Met Trp His
            35                  40                  45

Arg Val Ala Pro Lys Leu Ala Glu Arg Phe Lys Val Ile Val Ala Asp
        50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Ile Pro Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
```

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
                260                 265                 270

Gly Ala Pro Ile Glu Ser Gly His Phe Leu Pro Glu Glu Ala Pro Asp
            275                 280                 285

Gln Thr Ala Glu Ala Leu Val Arg Phe Phe Ser Ala Ala Pro Gly Ser
        290                 295                 300

<210> SEQ ID NO 76
<211> LENGTH: 912
<212> TYPE: DNA
<213> ORGANISM: Artificial Sequence
<220> FEATURE:
<223> OTHER INFORMATION: fluoroacetate dehalogenase mutant35(H155I,
      W156P)

<400> SEQUENCE: 76
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct cacatcccgtc tttcctggct     480 cagccggctc cgctgccgga aaacctgctg gtggtgacc cggacttcta cgttaaagct     540
aaactggctt cttggacccg tgctggtgac ctgtctgctt cgacccgcg tgctgttgaa     600 cactaccgta tcgctttcgc tgaccccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                         912

<210> SEQ ID NO 77
<211> LENGTH: 304
<212> TYPE: PRT
<213> ORGANISM: Artificial Sequence
<220> FEATURE:
<223> OTHER INFORMATION: fluoroacetate dehalogenase mutant36(H155L,
      W156F)

<400> SEQUENCE: 77

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
                20                  25                  30

Pro Leu Leu Leu Leu His Gly Phe Pro Gln Thr His Val Met Trp His
            35                  40                  45

Arg Val Ala Pro Lys Leu Ala Glu Arg Phe Lys Val Ile Val Ala Asp
 50                  55                  60

Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Leu Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300

<210> SEQ ID NO 78
<211> LENGTH: 912
<212> TYPE: DNA
<213> ORGANISM: Artificial Sequence
<220> FEATURE:
<223> OTHER INFORMATION: fluoroacetate dehalogenase mutant36(H155L,
      W156F)

<400> SEQUENCE: 78
atgccggacc tggctgacct gttcccgggt ttcggttctg aatggatcaa cacctcttct     60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact tcgctctggc tggtcacgac cgtggtgctc tgtttctta ccgtctggct    360 ctggactctc cgggtcgtct gtctaaactg gctgttctgg acatcctgcc gacctacgaa    420
tactggcagc gtatgaaccg tgcttacgct ctgaaaatct acctgttctc tttcctggct    480
cagccggctc cgctgccgga aaacctgctg ggtggtgacc cggacttcta cgttaaagct    540
aaactggctt cttggacccg tgctggtgac ctgtctgctt tcgacccgcg tgctgttgaa    600

-continued

```
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct    912
```

<210> SEQ ID NO 79
<211> LENGTH: 304
<212> TYPE: PRT
<213> ORGANISM: Artificial Sequence
<220> FEATURE:
<223> OTHER INFORMATION: fluoroacetate dehalogenase mutant37(H155V, W156G)

<400> SEQUENCE: 79

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Val Gly Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
```

<210> SEQ ID NO 80
<211> LENGTH: 912
<212> TYPE: DNA
<213> ORGANISM: Artificial Sequence
<220> FEATURE:
<223> OTHER INFORMATION: fluoroacetate dehalogenase mutant37(H155V, W156G)

<400> SEQUENCE: 80

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga acagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acgttggttc tttcctggct   480
cagccggctc cgctgccgga aaacctgctg gtggtgacc cggacttcta cgttaaagct   540
aaactggctt cttggacccg tgctggtgac ctgtctgctt cgacccgcg tgctgttgaa   600
cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg ggcttctgac gttcagggtg ctccgatcga atctggtcac   840
ttcctgccgg aagaagctcc ggaccagacc gctgaagctc tggttcgttt cttctctgct   900
gctccgggtt ct                                                       912
```

<210> SEQ ID NO 81
<211> LENGTH: 304
<212> TYPE: PRT
<213> ORGANISM: Artificial Sequence
<220> FEATURE:
<223> OTHER INFORMATION: fluoroacetate dehalogenase mutant38(H155F, W156T)

<400> SEQUENCE: 81

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125
```

```
Lys Leu Ala Val Leu Asp Ile Leu Pro Thr Tyr Glu Tyr Trp Gln Arg
        130                 135                 140

Met Asn Arg Ala Tyr Ala Leu Lys Ile Tyr Phe Thr Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 82
<211> LENGTH: 912
<212> TYPE: DNA
<213> ORGANISM: Artificial Sequence
<220> FEATURE:
<223> OTHER INFORMATION: fluoroacetate dehalogenase mutant38(H155F,
      W156T)

<400> SEQUENCE: 82
atgccggacc tggctgacct gttcccgggt ttcggttctg aatggatcaa cacctcttct     60
ggtcgtatct tcgctcgtgt tggtggtgac ggtccgccgc tgctgctgct gcacggtttc    120
ccgcagaccc acgttatgtg caccgtgttg ctccgaaac tggctgaacg tttcaaagtt     180
atcgttgctg acctgccggg ttacggttgg tctgacatgc ggaatctga cgaacagcac     240 accccgtaca ccaaacgtgc tatggctaaa cagctgatcg aagctatgga acagctgggt    300
cacgttcact cgctctggc tggtcacgac cgtggtgctc gtgtttctta ccgtctggct     360
ctggactctc cgggtcgtct gtctaaactg gctgttctgg acatcctgcc gacctacgaa    420
tactggcagc gtatgaaccg tgcttacgct ctgaaaatct acttcacctc tttcctggct    480
cagccggctc cgctgccgga aaacctgctg ggtggtgacc cggacttcta cgttaaagct    540
aaactggctt cttggacccg tgctggtgac ctgtctgctt cgacccgcg tgctgttgaa    600 cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                       912

<210> SEQ ID NO 83
```

<211> LENGTH: 304
<212> TYPE: PRT
<213> ORGANISM: Artificial Sequence
<220> FEATURE:
<223> OTHER INFORMATION: fluoroacetate dehalogenase mutant39(H155A, W156M)

<400> SEQUENCE: 83

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Ala Met Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300
```

<210> SEQ ID NO 84
<211> LENGTH: 912
<212> TYPE: DNA
<213> ORGANISM: Artificial Sequence
<220> FEATURE:
<223> OTHER INFORMATION: fluoroacetate dehalogenase mutant39(H155A, W156M)

<400> SEQUENCE: 84
atgccggacc tggctgacct gttcccgggt ttcggttctg aatggatcaa cacctcttct    60

```
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact cgctctggc tggtcacgac cgtggtgctc gtgtttctta ccgtctggct    360
ctggactctc cggtcgtct gtctaaactg gctgttctgg acatcctgcc gacctacgaa    420
tactggcagc gtatgaaccg tgcttacgct ctgaaaatct acgctatgtc tttcctggct    480
cagccggctc cgctgccgga aaacctgctg gtggtgacc cggacttcta cgttaaagct    540
aaactggctt cttggacccg tgctggtgac ctgtctgctt cgacccgcg tgctgttgaa    600 cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 85
<211> LENGTH: 304
<212> TYPE: PRT
<213> ORGANISM: Artificial Sequence
<220> FEATURE:
<223> OTHER INFORMATION: fluoroacetate dehalogenase mutant40(H155V, W156A)

<400> SEQUENCE: 85

```
Met Pro Asp Leu Ala Asp Leu Phe Pro Gly Phe Gly Ser Glu Trp Ile
 1               5                  10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Val Ala Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205
```

```
Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 86
<211> LENGTH: 900
<212> TYPE: DNA
<213> ORGANISM: Artificial Sequence
<220> FEATURE:
<223> OTHER INFORMATION: fluoroacetate dehalogenase mutant40(H155V,
      W156A)

<400> SEQUENCE: 86
atgccggacc tggctgacct gttcccgggt ttcggttctg aatggatcaa cacctcttct      60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga cagctgggt     300 cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acgttgcttc tttcctggct    480
cagccggctc cgctgccgga aaacctgctg ggtggtgacc cggacttcta cgttaaagct    540
aaactggctt cttggacccg tgctggtgac ctgtctgctt cgacccgcg tgctgttgaa    600 cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg gcttctgac gttcagggtg ctccgatcga atctggtcac    840
ttcctgccgg aagaagctcc ggaccagacc gctgaagctc tggttcgttt cttctctgct    900

<210> SEQ ID NO 87
<211> LENGTH: 304
<212> TYPE: PRT
<213> ORGANISM: Artificial Sequence
<220> FEATURE:
<223> OTHER INFORMATION: fluoroacetate dehalogenase mutant41(H155L,
      W156P)

<400> SEQUENCE: 87

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45
```

Arg Val Ala Pro Lys Leu Ala Glu Arg Phe Lys Val Ile Val Ala Asp
 50                  55                  60

Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Leu Pro Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300

<210> SEQ ID NO 88
<211> LENGTH: 912
<212> TYPE: DNA
<213> ORGANISM: Artificial Sequence
<220> FEATURE:
<223> OTHER INFORMATION: fluoroacetate dehalogenase mutant41(H155L, W156P)

<400> SEQUENCE: 88
atgccggacc tggctgacct gttcccgggt ttcggttctg aatggatcaa cacctcttct     60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact tcgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acctgccgtc tttcctggct    480
cagccggctc cgctgccgga aaacctgctg ggtggtgacc cggacttcta cgttaaagct    540
aaactggctt cttggacccg tgctggtgac ctgtctgctt tcgacccgcg tgctgttgaa    600

```
cactaccgta tcgctttcgc tgacccgatg cgtcgtcacg ttatgtgcga agactaccgt      660
gctggtgctt acgctgactt cgaacacgac aaaatcgacg ttgaagctgg taacaaaatc      720
ccggttccga tgctggctct gtggggtgct tctggtatcg ctcagtctgc tgctaccccg      780
ctggacgttt ggcgtaaatg ggcttctgac gttcagggtg ctccgatcga atctggtcac      840
ttcctgccgg aagaagctcc ggaccagacc gctgaagctc tggttcgttt cttctctgct      900
gctccgggtt ct                                                          912

<210> SEQ ID NO 89
<211> LENGTH: 304
<212> TYPE: PRT
<213> ORGANISM: Artificial Sequence
<220> FEATURE:
<223> OTHER INFORMATION: fluoroacetate dehalogenase mutant42(H155D,
      W156L)

<400> SEQUENCE: 89

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Asp Leu Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
```

<210> SEQ ID NO 90
<211> LENGTH: 912
<212> TYPE: DNA
<213> ORGANISM: Artificial Sequence
<220> FEATURE:
<223> OTHER INFORMATION: fluoroacetate dehalogenase mutant42(H155D, W156L)

<400> SEQUENCE: 90

```
atgccggacc tggctgacct gttcccgggt tcggttctg aatggatcaa cacctcttct      60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acgacctgtc tttcctggct    480
cagccggctc cgctgccgga aaacctgctg gtggtgacc cggacttcta cgttaaagct    540
aaactggctt cttggacccg tgctggtgac ctgtctgctt cgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                         912
```

<210> SEQ ID NO 91
<211> LENGTH: 304
<212> TYPE: PRT
<213> ORGANISM: Artificial Sequence
<220> FEATURE:
<223> OTHER INFORMATION: fluoroacetate dehalogenase mutant43(H155N, W156I)

<400> SEQUENCE: 91

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

```
Lys Leu Ala Val Leu Asp Ile Leu Pro Thr Tyr Glu Tyr Trp Gln Arg
        130                 135                 140

Met Asn Arg Ala Tyr Ala Leu Lys Ile Tyr Asn Ile Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300
```

<210> SEQ ID NO 92
<211> LENGTH: 912
<212> TYPE: DNA
<213> ORGANISM: Artificial Sequence
<220> FEATURE:
<223> OTHER INFORMATION: fluoroacetate dehalogenase mutant43(H155N, W156I)

<400> SEQUENCE: 92

```
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg caccgtgtt gctccgaaac tggctgaacg tttcaaagtt     180
atcgttgctg acctgccggg ttacggttgg tctgacatgc ggaatctga cgaacagcac     240 accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acaacatctc tttcctggct     480
cagccggctc cgctgccgga aaacctgctg ggtggtgacc cggacttcta cgttaaagct     540
aaactggctt cttggacccg tgctggtgac ctgtctgctt cgacccgcg tgctgttgaa     600 cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg ggcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 93

<211> LENGTH: 304
<212> TYPE: PRT
<213> ORGANISM: Artificial Sequence
<220> FEATURE:
<223> OTHER INFORMATION: fluoroacetate dehalogenase mutant44(H155H, W156L)

<400> SEQUENCE: 93

```
Met Pro Asp Leu Ala Asp Leu Phe Pro Gly Phe Gly Ser Glu Trp Ile
1               5                   10                  15
Asn Thr Ser Ser Gly Arg Ile Phe Ala Arg Val Gly Gly Asp Gly Pro
            20                  25                  30
Pro Leu Leu Leu Leu His Gly Phe Pro Gln Thr His Val Met Trp His
        35                  40                  45
Arg Val Ala Pro Lys Leu Ala Glu Arg Phe Lys Val Ile Val Ala Asp
    50                  55                  60
Leu Pro Gly Tyr Gly Trp Ser Asp Met Pro Glu Ser Asp Glu Gln His
65                  70                  75                  80
Thr Pro Tyr Thr Lys Arg Ala Met Ala Lys Gln Leu Ile Glu Ala Met
                85                  90                  95
Glu Gln Leu Gly His Val His Phe Ala Leu Ala Gly His Asp Arg Gly
            100                 105                 110
Ala Arg Val Ser Tyr Arg Leu Ala Leu Asp Ser Pro Gly Arg Leu Ser
        115                 120                 125
Lys Leu Ala Val Leu Asp Ile Leu Pro Thr Tyr Glu Tyr Trp Gln Arg
    130                 135                 140
Met Asn Arg Ala Tyr Ala Leu Lys Ile Tyr His Leu Ser Phe Leu Ala
145                 150                 155                 160
Gln Pro Ala Pro Leu Pro Glu Asn Leu Leu Gly Gly Asp Pro Asp Phe
                165                 170                 175
Tyr Val Lys Ala Lys Leu Ala Ser Trp Thr Arg Ala Gly Asp Leu Ser
            180                 185                 190
Ala Phe Asp Pro Arg Ala Val Glu His Tyr Arg Ile Ala Phe Ala Asp
        195                 200                 205
Pro Met Arg Arg His Val Met Cys Glu Asp Tyr Arg Ala Gly Ala Tyr
    210                 215                 220
Ala Asp Phe Glu His Asp Lys Ile Asp Val Glu Ala Gly Asn Lys Ile
225                 230                 235                 240
Pro Val Pro Met Leu Ala Leu Trp Gly Ala Ser Gly Ile Ala Gln Ser
                245                 250                 255
Ala Ala Thr Pro Leu Asp Val Trp Arg Lys Trp Ala Ser Asp Val Gln
            260                 265                 270
Gly Ala Pro Ile Glu Ser Gly His Phe Leu Pro Glu Glu Ala Pro Asp
        275                 280                 285
Gln Thr Ala Glu Ala Leu Val Arg Phe Phe Ser Ala Ala Pro Gly Ser
    290                 295                 300
```

<210> SEQ ID NO 94
<211> LENGTH: 912
<212> TYPE: DNA
<213> ORGANISM: Artificial Sequence
<220> FEATURE:
<223> OTHER INFORMATION: fluoroacetate dehalogenase mutant44(H155H, W156L)

<400> SEQUENCE: 94

```
atgccggacc tggctgacct gttcccgggt ttcggttctg aatggatcaa cacctcttct    60
```

```
ggtcgtatct tcgctcgtgt tggtggtgac ggtccgccgc tgctgctgct gcacggtttc      120
ccgcagaccc acgttatgtg gcaccgtgtt gctccgaaac tggctgaacg tttcaaagtt      180
atcgttgctg acctgccggg ttacggttgg tctgacatgc cggaatctga cgaacagcac      240
accccgtaca ccaaacgtgc tatggctaaa cagctgatcg aagctatgga acagctgggt      300
cacgttcact cgctctggc tggtcacgac cgtggtgctc gtgtttctta ccgtctggct      360
ctggactctc cgggtcgtct gtctaaactg gctgttctgg acatcctgcc gacctacgaa      420
tactggcagc gtatgaaccg tgcttacgct ctgaaaatct accacctgtc tttcctggct      480
cagccggctc cgctgccgga aaacctgctg gtggtgacc cggacttcta cgttaaagct      540
aaactggctt cttggacccg tgctggtgac ctgtctgctt cgacccgcg tgctgttgaa      600 cactaccgta tcgctttcgc tgacccgatg cgtcgtcacg ttatgtgcga agactaccgt      660
gctggtgctt acgctgactt cgaacacgac aaaatcgacg ttgaagctgg taacaaaatc      720
ccggttccga tgctggctct gtggggtgct tctggtatcg ctcagtctgc tgctaccccg      780
ctggacgttt ggcgtaaatg ggcttctgac gttcagggtg ctccgatcga atctggtcac      840
ttcctgccgg aagaagctcc ggaccagacc gctgaagctc tggttcgttt cttctctgct      900
gctccgggtt ct                                                          912
```

<210> SEQ ID NO 95
<211> LENGTH: 304
<212> TYPE: PRT
<213> ORGANISM: Artificial Sequence
<220> FEATURE:
<223> OTHER INFORMATION: fluoroacetate dehalogenase mutant45(H155V, W156I)

<400> SEQUENCE: 95

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Val Ile Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205
```

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 96
<211> LENGTH: 912
<212> TYPE: DNA
<213> ORGANISM: Artificial Sequence
<220> FEATURE:
<223> OTHER INFORMATION: fluoroacetate dehalogenase mutant45(H155V, W156I)

<400> SEQUENCE: 96

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga cagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acgttatctc tttcctggct   480
cagccggctc gctgccgga aacctgctg gtggtgacc cggacttcta cgttaaagct   540
aaactggctt cttggacccg tgctggtgac ctgtctgctt cgacccgcg tgctgttgaa   600
cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg gcttctgac gttcagggtg ctccgatcga atctggtcac   840
ttcctgccgg aagaagctcc ggaccagacc gctgaagctc tggttcgttt cttctctgct   900
gctccgggtt ct                                                        912
```

<210> SEQ ID NO 97
<211> LENGTH: 304
<212> TYPE: PRT
<213> ORGANISM: Artificial Sequence
<220> FEATURE:
<223> OTHER INFORMATION: fluoroacetate dehalogenase mutant46(H155L, W156T)

<400> SEQUENCE: 97

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

```
Pro Leu Leu Leu Leu His Gly Phe Pro Gln Thr His Val Met Trp His
             35                  40                  45

Arg Val Ala Pro Lys Leu Ala Glu Arg Phe Lys Val Ile Val Ala Asp
 50                  55                  60

Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Leu Thr Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 98
<211> LENGTH: 912
<212> TYPE: DNA
<213> ORGANISM: Artificial Sequence
<220> FEATURE:
<223> OTHER INFORMATION: fluoroacetate dehalogenase mutant46(H155L,
      W156T)

<400> SEQUENCE: 98
atgccggacc tggctgacct gttcccgggt tcggttctg aatggatcaa cacctcttct      60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact tcgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acctgacctc tttcctggct    480
cagccggctc cgctgccgga aaacctgctg ggtggtgacc cggacttcta cgttaaagct    540
```

-continued

```
aaactggctt cttggacccg tgctggtgac ctgtctgctt tcgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                         912
```

<210> SEQ ID NO 99
<211> LENGTH: 304
<212> TYPE: PRT
<213> ORGANISM: Artificial Sequence
<220> FEATURE:
<223> OTHER INFORMATION: fluoroacetate dehalogenase mutant47(H155Q, W156I)

<400> SEQUENCE: 99

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Gln Ile Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285
```

Gln Thr Ala Glu Ala Leu Val Arg Phe Phe Ser Ala Ala Pro Gly Ser
            290                 295                 300

<210> SEQ ID NO 100
<211> LENGTH: 912
<212> TYPE: DNA
<213> ORGANISM: Artificial Sequence
<220> FEATURE:
<223> OTHER INFORMATION: fluoroacetate dehalogenase mutant47(H155Q,
      W156I)

<400> SEQUENCE: 100

```
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cggtcgtct gtctaaactg gctgttctgg acatcctgcc gacctacgaa     420
tactggcagc gtatgaaccg tgcttacgct ctgaaaatct accagatctc tttcctggct     480
cagccggctc cgctgccgga aaacctgctg ggtggtgacc cggacttcta cgttaaagct     540
aaactggctt cttggaccg tgctggtgac ctgtctgctt cgacccgcg tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 101
<211> LENGTH: 304
<212> TYPE: PRT
<213> ORGANISM: Artificial Sequence
<220> FEATURE:
<223> OTHER INFORMATION: fluoroacetate dehalogenase mutant48(H155I,
      W156C)

<400> SEQUENCE: 101

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

```
Ala Arg Val Ser Tyr Arg Leu Ala Leu Asp Ser Pro Gly Arg Leu Ser
            115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Ile Cys Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 102
<211> LENGTH: 912
<212> TYPE: DNA
<213> ORGANISM: Artificial Sequence
<220> FEATURE:
<223> OTHER INFORMATION: fluoroacetate dehalogenase mutant48(H155I,
      W156C)

<400> SEQUENCE: 102
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg caccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga cagctgggt   300 cacgttcact tcgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acatctgctc tttcctggct   480
cagccggctc cgctgccgga aaacctgctg ggtggtgacc cggacttcta cgttaaagct   540
aaactggctt cttggacccg tgctggtgac ctgtctgctt cgacccgcg tgctgttgaa   600 cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg ggcttctgac gttcagggtg ctccgatcga atctggtcac   840
ttcctgccgg aagaagctcc ggaccagacc gctgaagctc tggttcgttt cttctctgct   900
gctccgggtt ct                                                       912
```

<210> SEQ ID NO 103
<211> LENGTH: 304
<212> TYPE: PRT
<213> ORGANISM: Artificial Sequence
<220> FEATURE:
<223> OTHER INFORMATION: fluoroacetate dehalogenase mutant49(H155S, W156M)

<400> SEQUENCE: 103

| Met | Pro | Asp | Leu | Ala | Asp | Leu | Phe | Pro | Gly | Phe | Gly | Ser | Glu | Trp | Ile |
|---|---|---|---|---|---|---|---|---|---|---|---|---|---|---|---|
| 1 | | | | 5 | | | | | 10 | | | | | 15 | |

| Asn | Thr | Ser | Ser | Gly | Arg | Ile | Phe | Ala | Arg | Val | Gly | Gly | Asp | Gly | Pro |
| | | | 20 | | | | | 25 | | | | | 30 | | |

| Pro | Leu | Leu | Leu | Leu | His | Gly | Phe | Pro | Gln | Thr | His | Val | Met | Trp | His |
| | | | 35 | | | | | 40 | | | | | 45 | | |

| Arg | Val | Ala | Pro | Lys | Leu | Ala | Glu | Arg | Phe | Lys | Val | Ile | Val | Ala | Asp |
| | 50 | | | | | 55 | | | | | 60 | | | | |

| Leu | Pro | Gly | Tyr | Gly | Trp | Ser | Asp | Met | Pro | Glu | Ser | Asp | Gln | His |
| 65 | | | | 70 | | | | | 75 | | | | | 80 |

| Thr | Pro | Tyr | Thr | Lys | Arg | Ala | Met | Ala | Lys | Gln | Leu | Ile | Glu | Ala | Met |
| | | | | 85 | | | | | 90 | | | | | 95 | |

| Glu | Gln | Leu | Gly | His | Val | His | Phe | Ala | Leu | Ala | Gly | His | Asp | Arg | Gly |
| | | | 100 | | | | | 105 | | | | | 110 | | |

| Ala | Arg | Val | Ser | Tyr | Arg | Leu | Ala | Leu | Asp | Ser | Pro | Gly | Arg | Leu | Ser |
| | | 115 | | | | | 120 | | | | | 125 | | | |

| Lys | Leu | Ala | Val | Leu | Asp | Ile | Leu | Pro | Thr | Tyr | Glu | Tyr | Trp | Gln | Arg |
| | 130 | | | | | 135 | | | | | 140 | | | | |

| Met | Asn | Arg | Ala | Tyr | Ala | Leu | Lys | Ile | Tyr | Ser | Met | Ser | Phe | Leu | Ala |
| 145 | | | | | 150 | | | | | 155 | | | | | 160 |

| Gln | Pro | Ala | Pro | Leu | Pro | Glu | Asn | Leu | Leu | Gly | Gly | Asp | Pro | Asp | Phe |
| | | | | 165 | | | | | 170 | | | | | 175 | |

| Tyr | Val | Lys | Ala | Lys | Leu | Ala | Ser | Trp | Thr | Arg | Ala | Gly | Asp | Leu | Ser |
| | | | 180 | | | | | 185 | | | | | 190 | | |

| Ala | Phe | Asp | Pro | Arg | Ala | Val | Glu | His | Tyr | Arg | Ile | Ala | Phe | Ala | Asp |
| | | 195 | | | | | 200 | | | | | 205 | | | |

| Pro | Met | Arg | Arg | His | Val | Met | Cys | Glu | Asp | Tyr | Arg | Ala | Gly | Ala | Tyr |
| | 210 | | | | | 215 | | | | | 220 | | | | |

| Ala | Asp | Phe | Glu | His | Asp | Lys | Ile | Asp | Val | Glu | Ala | Gly | Asn | Lys | Ile |
| 225 | | | | | 230 | | | | | 235 | | | | | 240 |

| Pro | Val | Pro | Met | Leu | Ala | Leu | Trp | Gly | Ala | Ser | Gly | Ile | Ala | Gln | Ser |
| | | | | 245 | | | | | 250 | | | | | 255 | |

| Ala | Ala | Thr | Pro | Leu | Asp | Val | Trp | Arg | Lys | Trp | Ala | Ser | Asp | Val | Gln |
| | | | 260 | | | | | 265 | | | | | 270 | | |

| Gly | Ala | Pro | Ile | Glu | Ser | Gly | His | Phe | Leu | Pro | Glu | Gly | Ala | Pro | Asp |
| | | | 275 | | | | | 280 | | | | | 285 | | |

| Gln | Thr | Ala | Glu | Ala | Leu | Val | Arg | Phe | Ser | Ala | Ala | Pro | Gly | Ser |
| | 290 | | | | | 295 | | | | | 300 | | | |

<210> SEQ ID NO 104
<211> LENGTH: 912
<212> TYPE: DNA
<213> ORGANISM: Artificial Sequence
<220> FEATURE:
<223> OTHER INFORMATION: fluoroacetate dehalogenase mutant49(H155S, W156M)

<400> SEQUENCE: 104

```
atgccggacc tggctgacct gttcccgggt ttcggttctg aatggatcaa cacctcttct   60
ggtcgtatct tcgctcgtgt tggtggtgac ggtccgccgc tgctgctgct gcacggtttc  120
ccgcagaccc acgttatgtg gcaccgtgtt gctccgaaac tggctgaacg tttcaaagtt  180
atcgttgctg acctgccggg ttacggttgg tctgacatgc cggaatctga cgaacagcac  240
accccgtaca ccaaacgtgc tatggctaaa cagctgatcg aagctatgga acagctgggt  300
cacgttcact cgctctggc tggtcacgac cgtggtgctc gtgtttctta ccgtctggct  360
ctggactctc cgggtcgtct gtctaaactg gctgttctgg acatcctgcc gacctacgaa  420
tactggcagc gtatgaaccg tgcttacgct ctgaaaatct actctatgtc tttcctggct  480
cagccggctc cgctgccgga aaacctgctg ggtggtgacc cggacttcta cgttaaagct  540
aaactggctt cttggacccg tgctggtgac ctgtctgctt cgacccgcg tgctgttgaa  600
cactaccgta tcgctttcgc tgacccgatg cgtcgtcacg ttatgtgcga agactaccgt  660
gctggtgctt acgctgactt cgaacacgac aaaatcgacg ttgaagctgg taacaaaatc  720
ccggttccga tgctggctct gtggggtgct tctggtatcg ctcagtctgc tgctaccccg  780
ctggacgttt ggcgtaaatg ggcttctgac gttcagggtg ctccgatcga atctggtcac  840
ttcctgccgg aagaagctcc ggaccagacc gctgaagctc tggttcgttt cttctctgct  900
gctccgggtt ct                                                       912
```

<210> SEQ ID NO 105
<211> LENGTH: 304
<212> TYPE: PRT
<213> ORGANISM: Artificial Sequence
<220> FEATURE:
<223> OTHER INFORMATION: fluoroacetate dehalogenase mutant50(W156S)

<400> SEQUENCE: 105

```
Met Pro Asp Leu Ala Asp Leu Phe Pro Gly Phe Gly Ser Glu Trp Ile
1               5                   10                  15
Asn Thr Ser Ser Gly Arg Ile Phe Ala Arg Val Gly Gly Asp Gly Pro
            20                  25                  30
Pro Leu Leu Leu Leu His Gly Phe Pro Gln Thr His Val Met Trp His
        35                  40                  45
Arg Val Ala Pro Lys Leu Ala Glu Arg Phe Lys Val Ile Val Ala Asp
    50                  55                  60
Leu Pro Gly Tyr Gly Trp Ser Asp Met Pro Glu Ser Asp Glu Gln His
65                  70                  75                  80
Thr Pro Tyr Thr Lys Arg Ala Met Ala Lys Gln Leu Ile Glu Ala Met
                85                  90                  95
Glu Gln Leu Gly His Val His Phe Ala Leu Ala Gly His Asp Arg Gly
            100                 105                 110
Ala Arg Val Ser Tyr Arg Leu Ala Leu Asp Ser Pro Gly Arg Leu Ser
        115                 120                 125
Lys Leu Ala Val Leu Asp Ile Leu Pro Thr Tyr Glu Tyr Trp Gln Arg
    130                 135                 140
Met Asn Arg Ala Tyr Ala Leu Lys Ile Tyr His Ser Ser Phe Leu Ala
145                 150                 155                 160
Gln Pro Ala Pro Leu Pro Glu Asn Leu Leu Gly Gly Asp Pro Asp Phe
                165                 170                 175
Tyr Val Lys Ala Lys Leu Ala Ser Trp Thr Arg Ala Gly Asp Leu Ser
            180                 185                 190
Ala Phe Asp Pro Arg Ala Val Glu His Tyr Arg Ile Ala Phe Ala Asp
```

```
                195                 200                 205
Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 106
<211> LENGTH: 912
<212> TYPE: DNA
<213> ORGANISM: Artificial Sequence
<220> FEATURE:
<223> OTHER INFORMATION: fluoroacetate dehalogenase mutant50(W156S)

<400> SEQUENCE: 106
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc ggaatctga cgaacagcac      240
accccgtaca ccaaacgtgc tatggctaaa cagctgatcg aagctatgga cagctgggt      300
cacgttcact cgctctggc tggtcacgac cgtggtgctc gtgtttctta ccgtctggct      360
ctggactctc cgggtcgtct gtctaaactg gctgttctgg acatcctgcc gacctacgaa     420
tactggcagc gtatgaaccg tgcttacgct ctgaaaatct accactcttc tttcctggct     480
cagccggctc cgctgccgga aaacctgctg ggtggtgacc cggacttcta cgttaaagct     540
aaactggctt cttggacccg tgctggtgac ctgtctgctt cgacccgcg tgctgttgaa      600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac      840
ttcctgccgg aagaagctcc ggaccagacc gctgaagctc tggttcgttt cttctctgct     900
gctccgggtt ct                                                         912

<210> SEQ ID NO 107
<211> LENGTH: 304
<212> TYPE: PRT
<213> ORGANISM: Artificial Sequence
<220> FEATURE:
<223> OTHER INFORMATION: fluoroacetate dehalogenase mutant51(W156V)

<400> SEQUENCE: 107

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
```

```
                35                  40                  45
Arg Val Ala Pro Lys Leu Ala Glu Arg Phe Lys Val Ile Val Ala Asp
 50                  55                  60
Leu Pro Gly Tyr Gly Trp Ser Asp Met Pro Glu Ser Asp Glu Gln His
65                  70                  75                  80
Thr Pro Tyr Thr Lys Arg Ala Met Ala Lys Gln Leu Ile Glu Ala Met
                85                  90                  95
Glu Gln Leu Gly His Val His Phe Ala Leu Ala Gly His Asp Arg Gly
            100                 105                 110
Ala Arg Val Ser Tyr Arg Leu Ala Leu Asp Ser Pro Gly Arg Leu Ser
        115                 120                 125
Lys Leu Ala Val Leu Asp Ile Leu Pro Thr Tyr Glu Tyr Trp Gln Arg
    130                 135                 140
Met Asn Arg Ala Tyr Ala Leu Lys Ile Tyr His Val Ser Phe Leu Ala
145                 150                 155                 160
Gln Pro Ala Pro Leu Pro Glu Asn Leu Leu Gly Gly Asp Pro Asp Phe
                165                 170                 175
Tyr Val Lys Ala Lys Leu Ala Ser Trp Thr Arg Ala Gly Asp Leu Ser
            180                 185                 190
Ala Phe Asp Pro Arg Ala Val Glu His Tyr Arg Ile Ala Phe Ala Asp
        195                 200                 205
Pro Met Arg Arg His Val Met Cys Glu Asp Tyr Arg Ala Gly Ala Tyr
    210                 215                 220
Ala Asp Phe Glu His Asp Lys Ile Asp Val Glu Ala Gly Asn Lys Ile
225                 230                 235                 240
Pro Val Pro Met Leu Ala Leu Trp Gly Ala Ser Gly Ile Ala Gln Ser
                245                 250                 255
Ala Ala Thr Pro Leu Asp Val Trp Arg Lys Trp Ala Ser Asp Val Gln
            260                 265                 270
Gly Ala Pro Ile Glu Ser Gly His Phe Leu Pro Glu Glu Ala Pro Asp
        275                 280                 285
Gln Thr Ala Glu Ala Leu Val Arg Phe Phe Ser Ala Ala Pro Gly Ser
    290                 295                 300

<210> SEQ ID NO 108
<211> LENGTH: 912
<212> TYPE: DNA
<213> ORGANISM: Artificial Sequence
<220> FEATURE:
<223> OTHER INFORMATION: fluoroacetate dehalogenase mutant51(W156V)

<400> SEQUENCE: 108
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact tcgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct accacgtttc tttcctggct     480
cagccggctc cgctgccgga aaacctgctg ggtggtgacc cggacttcta cgttaaagct     540
aaactggctt cttggacccg tgctggtgac ctgtctgctt tcgacccgcg tgctgttgaa     600
```

```
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 109
<211> LENGTH: 304
<212> TYPE: PRT
<213> ORGANISM: Artificial Sequence
<220> FEATURE:
<223> OTHER INFORMATION: fluoroacetate dehalogenase mutant52(H155A, W156S)

<400> SEQUENCE: 109

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Ala Ser Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
```

<210> SEQ ID NO 110
<211> LENGTH: 912
<212> TYPE: DNA
<213> ORGANISM: Artificial Sequence
<220> FEATURE:
<223> OTHER INFORMATION: fluoroacetate dehalogenase mutant52(H155A, W156S)

<400> SEQUENCE: 110

```
atgccggacc tggctgacct gttcccgggt ttcggttctg aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
accccgtaca ccaaacgtgc tatggctaaa cagctgatcg aagctatgga acagctgggt   300
cacgttcact cgctctggc tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acgcttcttc tttcctggct   480
cagccggctc cgctgccgga aaacctgctg gtggtgacc cggacttcta cgttaaagct   540
aaactggctt cttggacccg tgctggtgac ctgtctgctt cgacccgcg tgctgttgaa   600
cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg ggcttctgac gttcagggtg ctccgatcga atctggtcac   840
ttcctgccgg aagaagctcc ggaccagacc gctgaagctc tggttcgttt cttctctgct   900
gctccgggtt ct                                                       912
```

<210> SEQ ID NO 111
<211> LENGTH: 304
<212> TYPE: PRT
<213> ORGANISM: Artificial Sequence
<220> FEATURE:
<223> OTHER INFORMATION: fluoroacetate dehalogenase mutant53(H155M, W156F)

<400> SEQUENCE: 111

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125
```

Lys Leu Ala Val Leu Asp Ile Leu Pro Thr Tyr Glu Tyr Trp Gln Arg
            130                 135                 140

Met Asn Arg Ala Tyr Ala Leu Lys Ile Tyr Met Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 112
<211> LENGTH: 912
<212> TYPE: DNA
<213> ORGANISM: Artificial Sequence
<220> FEATURE:
<223> OTHER INFORMATION: fluoroacetate dehalogenase mutant53(H155M,
      W156F)

<400> SEQUENCE: 112
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc ggaatctga cgaacagcac     240 accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acatgttctc tttcctggct     480
cagccggctc cgctgccgga aaacctgctg ggtggtgacc cggacttcta cgttaaagct     540
aaactggctt cttggacccg tgctggtgac ctgtctgctt cgacccgcg tgctgttgaa     600 cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                          912

<210> SEQ ID NO 113

```
<211> LENGTH: 304
<212> TYPE: PRT
<213> ORGANISM: Artificial Sequence
<220> FEATURE:
<223> OTHER INFORMATION: fluoroacetate dehalogenase mutant54(H155E,
      W156T)

<400> SEQUENCE: 113
```

| Met | Pro | Asp | Leu | Ala | Asp | Leu | Phe | Pro | Gly | Phe | Gly | Ser | Glu | Trp | Ile |
|---|---|---|---|---|---|---|---|---|---|---|---|---|---|---|---|
| 1 | | | | 5 | | | | | 10 | | | | | 15 | |

| Asn | Thr | Ser | Ser | Gly | Arg | Ile | Phe | Ala | Arg | Val | Gly | Gly | Asp | Gly | Pro |
|---|---|---|---|---|---|---|---|---|---|---|---|---|---|---|---|
| | | | 20 | | | | | 25 | | | | | 30 | | |

| Pro | Leu | Leu | Leu | Leu | His | Gly | Phe | Pro | Gln | Thr | His | Val | Met | Trp | His |
|---|---|---|---|---|---|---|---|---|---|---|---|---|---|---|---|
| | | | 35 | | | | | 40 | | | | | 45 | | |

| Arg | Val | Ala | Pro | Lys | Leu | Ala | Glu | Arg | Phe | Lys | Val | Ile | Val | Ala | Asp |
|---|---|---|---|---|---|---|---|---|---|---|---|---|---|---|---|
| | 50 | | | | | 55 | | | | | 60 | | | | |

| Leu | Pro | Gly | Tyr | Gly | Trp | Ser | Asp | Met | Pro | Glu | Ser | Asp | Glu | Gln | His |
|---|---|---|---|---|---|---|---|---|---|---|---|---|---|---|---|
| 65 | | | | | 70 | | | | | 75 | | | | | 80 |

| Thr | Pro | Tyr | Thr | Lys | Arg | Ala | Met | Ala | Lys | Gln | Leu | Ile | Glu | Ala | Met |
|---|---|---|---|---|---|---|---|---|---|---|---|---|---|---|---|
| | | | | 85 | | | | | 90 | | | | | 95 | |

| Glu | Gln | Leu | Gly | His | Val | His | Phe | Ala | Leu | Ala | Gly | His | Asp | Arg | Gly |
|---|---|---|---|---|---|---|---|---|---|---|---|---|---|---|---|
| | | | 100 | | | | | 105 | | | | | 110 | | |

| Ala | Arg | Val | Ser | Tyr | Arg | Leu | Ala | Leu | Asp | Ser | Pro | Gly | Arg | Leu | Ser |
|---|---|---|---|---|---|---|---|---|---|---|---|---|---|---|---|
| | | | 115 | | | | | 120 | | | | | 125 | | |

| Lys | Leu | Ala | Val | Leu | Asp | Ile | Leu | Pro | Thr | Tyr | Glu | Tyr | Trp | Gln | Arg |
|---|---|---|---|---|---|---|---|---|---|---|---|---|---|---|---|
| | 130 | | | | | 135 | | | | | 140 | | | | |

| Met | Asn | Arg | Ala | Tyr | Ala | Leu | Lys | Ile | Tyr | Glu | Thr | Ser | Phe | Leu | Ala |
|---|---|---|---|---|---|---|---|---|---|---|---|---|---|---|---|
| 145 | | | | | 150 | | | | | 155 | | | | | 160 |

| Gln | Pro | Ala | Pro | Leu | Pro | Glu | Asn | Leu | Leu | Gly | Gly | Asp | Pro | Asp | Phe |
|---|---|---|---|---|---|---|---|---|---|---|---|---|---|---|---|
| | | | | 165 | | | | | 170 | | | | | 175 | |

| Tyr | Val | Lys | Ala | Lys | Leu | Ala | Ser | Trp | Thr | Arg | Ala | Gly | Asp | Leu | Ser |
|---|---|---|---|---|---|---|---|---|---|---|---|---|---|---|---|
| | | | 180 | | | | | 185 | | | | | 190 | | |

| Ala | Phe | Asp | Pro | Arg | Ala | Val | Glu | His | Tyr | Arg | Ile | Ala | Phe | Ala | Asp |
|---|---|---|---|---|---|---|---|---|---|---|---|---|---|---|---|
| | | | 195 | | | | | 200 | | | | | 205 | | |

| Pro | Met | Arg | Arg | His | Val | Met | Cys | Glu | Asp | Tyr | Arg | Ala | Gly | Ala | Tyr |
|---|---|---|---|---|---|---|---|---|---|---|---|---|---|---|---|
| | 210 | | | | | 215 | | | | | 220 | | | | |

| Ala | Asp | Phe | Glu | His | Asp | Lys | Ile | Asp | Val | Glu | Ala | Gly | Asn | Lys | Ile |
|---|---|---|---|---|---|---|---|---|---|---|---|---|---|---|---|
| 225 | | | | | 230 | | | | | 235 | | | | | 240 |

| Pro | Val | Pro | Met | Leu | Ala | Leu | Trp | Gly | Ala | Ser | Gly | Ile | Ala | Gln | Ser |
|---|---|---|---|---|---|---|---|---|---|---|---|---|---|---|---|
| | | | | 245 | | | | | 250 | | | | | 255 | |

| Ala | Ala | Thr | Pro | Leu | Asp | Val | Trp | Arg | Lys | Trp | Ala | Ser | Asp | Val | Gln |
|---|---|---|---|---|---|---|---|---|---|---|---|---|---|---|---|
| | | | | 260 | | | | | 265 | | | | | 270 | |

| Gly | Ala | Pro | Ile | Glu | Ser | Gly | His | Phe | Leu | Pro | Glu | Glu | Ala | Pro | Asp |
|---|---|---|---|---|---|---|---|---|---|---|---|---|---|---|---|
| | | | 275 | | | | | 280 | | | | | 285 | | |

| Gln | Thr | Ala | Glu | Ala | Leu | Val | Arg | Phe | Phe | Ser | Ala | Ala | Pro | Gly | Ser |
|---|---|---|---|---|---|---|---|---|---|---|---|---|---|---|---|
| | 290 | | | | | 295 | | | | | 300 | | | | |

```
<210> SEQ ID NO 114
<211> LENGTH: 912
<212> TYPE: DNA
<213> ORGANISM: Artificial Sequence
<220> FEATURE:
<223> OTHER INFORMATION: fluoroacetate dehalogenase mutant54(H155E,
      W156T)

<400> SEQUENCE: 114
atgccggacc tggctgacct gttcccgggt ttcggttctg aatggatcaa cacctcttct     60
```

-continued

```
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acgaaacctc tttcctggct    480
cagccggctc cgctgccgga aaacctgctg ggtggtgacc cggacttcta cgttaaagct    540
aaactggctt cttggacccg tgctggtgac ctgtctgctt cgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

<210> SEQ ID NO 115
<211> LENGTH: 304
<212> TYPE: PRT
<213> ORGANISM: Artificial Sequence
<220> FEATURE:
<223> OTHER INFORMATION: fluoroacetate dehalogenase mutant55(W156A)

<400> SEQUENCE: 115

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
                20                  25                  30

Pro Leu Leu Leu Leu His Gly Phe Pro Gln Thr His Val Met Trp His
            35                  40                  45

Arg Val Ala Pro Lys Leu Ala Glu Arg Phe Lys Val Ile Val Ala Asp
        50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr His Ala Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205
```

```
Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
        260                 265                 270

Gly Ala Pro Ile Glu Ser Gly His Phe Leu Pro Glu Glu Ala Pro Asp
    275                 280                 285

Gln Thr Ala Glu Ala Leu Val Arg Phe Phe Ser Ala Ala Pro Gly Ser
    290                 295                 300
```

<210> SEQ ID NO 116
<211> LENGTH: 912
<212> TYPE: DNA
<213> ORGANISM: Artificial Sequence
<220> FEATURE:
<223> OTHER INFORMATION: fluoroacetate dehalogenase mutant55(W156A)

<400> SEQUENCE: 116

```
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct accacgcttc tttcctggct     480
cagccggctc gctgccgga aaacctgctg gtggtgacc cggacttcta cgttaaagct     540
aaactggctt cttggacccg tgctggtgac ctgtctgctt cgacccgcg tgctgttgaa     600
cactaccgta tcgctttcgc tgaccccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtgggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 117
<211> LENGTH: 304
<212> TYPE: PRT
<213> ORGANISM: Artificial Sequence
<220> FEATURE:
<223> OTHER INFORMATION: fluoroacetate dehalogenase mutant56(H155E, W156M)

<400> SEQUENCE: 117

```
Met Pro Asp Leu Ala Asp Leu Phe Pro Gly Phe Gly Ser Glu Trp Ile
1               5                  10                  15

Asn Thr Ser Ser Gly Arg Ile Phe Ala Arg Val Gly Gly Asp Gly Pro
                20                  25                  30

Pro Leu Leu Leu Leu His Gly Phe Pro Gln Thr His Val Met Trp His
            35                  40                  45
```

Arg Val Ala Pro Lys Leu Ala Glu Arg Phe Lys Val Ile Val Ala Asp
 50                  55                  60

Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
130                 135                 140

Met Asn Arg Ala Tyr Ala Leu Lys Ile Tyr Glu Met Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
290                 295                 300

<210> SEQ ID NO 118
<211> LENGTH: 912
<212> TYPE: DNA
<213> ORGANISM: Artificial Sequence
<220> FEATURE:
<223> OTHER INFORMATION: fluoroacetate dehalogenase mutant56(H155E,
      W156M)

<400> SEQUENCE: 118
atgccggacc tggctgacct gttcccgggt tcggttctg aatggatcaa cacctcttct      60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact tcgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acgaaatgtc tttcctggct    480
cagccggctc cgctgccgga aaacctgctg ggtggtgacc cggacttcta cgttaaagct    540
aaactggctt cttggacccg tgctggtgac ctgtctgctt cgacccgcg tgctgttgaa    600

```
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                          912
```

<210> SEQ ID NO 119
<211> LENGTH: 304
<212> TYPE: PRT
<213> ORGANISM: Artificial Sequence
<220> FEATURE:
<223> OTHER INFORMATION: fluoroacetate dehalogenase mutant57(H155L, W156G)

<400> SEQUENCE: 119

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Leu Gly Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
```

```
<210> SEQ ID NO 120
<211> LENGTH: 912
<212> TYPE: DNA
<213> ORGANISM: Artificial Sequence
<220> FEATURE:
<223> OTHER INFORMATION: fluoroacetate dehalogenase mutant57(H155L,
      W156G)

<400> SEQUENCE: 120
atgccggacc tggctgacct gttcccgggt tcggttctg  aatggatcaa cacctcttct    60
ggtcgtatct tcgctcgtgt tggtggtgac ggtccgccgc tgctgctgct gcacggtttc   120
ccgcagaccc acgttatgtg gcaccgtgtt gctccgaaac tggctgaacg tttcaaagtt   180
atcgttgctg acctgccggg ttacggttgg tctgacatgc cggaatctga cgaacagcac   240
acccgtaca  ccaaacgtgc tatggctaaa cagctgatcg aagctatgga acagctgggt   300
cacgttcact cgctctggc  tggtcacgac cgtggtgctc gtgtttctta ccgtctggct   360
ctggactctc cgggtcgtct gtctaaactg gctgttctgg acatcctgcc gacctacgaa   420
tactggcagc gtatgaaccg tgcttacgct ctgaaaatct acctgggttc tttcctggct   480
cagccggctc cgctgccgga aaacctgctg gtggtgacc  cggacttcta cgttaaagct   540
aaactggctt cttggacccg tgctggtgac ctgtctgctt cgacccgcg  tgctgttgaa   600
cactaccgta tcgctttcgc tgacccgatg cgtcgtcacg ttatgtgcga agactaccgt   660
gctggtgctt acgctgactt cgaacacgac aaaatcgacg ttgaagctgg taacaaaatc   720
ccggttccga tgctggctct gtggggtgct tctggtatcg ctcagtctgc tgctaccccg   780
ctggacgttt ggcgtaaatg ggcttctgac gttcagggtg ctccgatcga atctggtcac   840
ttcctgccgg aagaagctcc ggaccagacc gctgaagctc tggttcgttt cttctctgct   900
gctccgggtt ct                                                       912

<210> SEQ ID NO 121
<211> LENGTH: 304
<212> TYPE: PRT
<213> ORGANISM: Artificial Sequence
<220> FEATURE:
<223> OTHER INFORMATION: fluoroacetate dehalogenase mutant58(H155L,
      W156F)

<400> SEQUENCE: 121

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125
```

Lys Leu Ala Val Leu Asp Ile Leu Pro Thr Tyr Glu Tyr Trp Gln Arg
            130                 135                 140

Met Asn Arg Ala Tyr Ala Leu Lys Ile Tyr Leu Phe Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 122
<211> LENGTH: 912
<212> TYPE: DNA
<213> ORGANISM: Artificial Sequence
<220> FEATURE:
<223> OTHER INFORMATION: fluoroacetate dehalogenase mutant58(H155L,
      W156F)

<400> SEQUENCE: 122
atgccggacc tggctgacct gttcccgggt ttcggttctg aatggatcaa cacctcttct      60
ggtcgtatct cgctcgtgt tggtggtgac ggtccgccgc tgctgctgct gcacggtttc     120
ccgcagaccc acgttatgtg caccgtgtt gctccgaaac tggctgaacg tttcaaagtt     180
atcgttgctg acctgccggg ttacggttgg tctgacatgc ggaatctga cgaacagcac     240 accccgtaca ccaaacgtgc tatggctaaa cagctgatcg aagctatgga acagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acctgttctc tttcctggct     480
cagccggctc cgctgccgga aaacctgctg ggtggtgacc cggacttcta cgttaaagct     540
aaactggctt cttggacccg tgctggtgac ctgtctgctt tcgacccgcg tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                         912

<210> SEQ ID NO 123

```
<211> LENGTH: 304
<212> TYPE: PRT
<213> ORGANISM: Artificial Sequence
<220> FEATURE:
<223> OTHER INFORMATION: fluoroacetate dehalogenase mutant59(H155E,
      W156P)

<400> SEQUENCE: 123
```

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Glu Pro Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

```
<210> SEQ ID NO 124
<211> LENGTH: 912
<212> TYPE: DNA
<213> ORGANISM: Artificial Sequence
<220> FEATURE:
<223> OTHER INFORMATION: fluoroacetate dehalogenase mutant59(H155E,
      W156P)

<400> SEQUENCE: 124
atgccggacc tggctgacct gttcccgggt ttcggttctg aatggatcaa cacctcttct    60
```

-continued

```
ggtcgtatct tcgctcgtgt tggtggtgac ggtccgccgc tgctgctgct gcacggtttc        120
ccgcagaccc acgttatgtg gcaccgtgtt gctccgaaac tggctgaacg tttcaaagtt        180
atcgttgctg acctgccggg ttacggttgg tctgacatgc cggaatctga cgaacagcac        240
accccgtaca ccaaacgtgc tatggctaaa cagctgatcg aagctatgga acagctgggt        300
cacgttcact cgctctggc tggtcacgac cgtggtgctc gtgtttctta ccgtctggct         360
ctggactctc cgggtcgtct gtctaaactg gctgttctgg acatcctgcc gacctacgaa        420
tactggcagc gtatgaaccg tgcttacgct ctgaaaatct acgaaccgtc tttcctggct        480
cagccggctc cgctgccgga aaacctgctg ggtggtgacc cggacttcta cgttaaagct        540
aaactggctt cttggacccg tgctggtgac ctgtctgctt cgacccgcg tgctgttgaa         600 cactaccgta tcgctttcgc tgacccgatg cgtcgtcacg ttatgtgcga agactaccgt        660
gctggtgctt acgctgactt cgaacacgac aaaatcgacg ttgaagctgg taacaaaatc        720
ccggttccga tgctggctct gtggggtgct tctggtatcg ctcagtctgc tgctaccccg        780
ctggacgttt ggcgtaaatg gcttctgac gttcagggtg ctccgatcga atctggtcac         840
ttcctgccgg aagaagctcc ggaccagacc gctgaagctc tggttcgttt cttctctgct        900
gctccgggtt ct                                                            912
```

<210> SEQ ID NO 125
<211> LENGTH: 304
<212> TYPE: PRT
<213> ORGANISM: Artificial Sequence
<220> FEATURE:
<223> OTHER INFORMATION: fluoroacetate dehalogenase mutant60(H155L, W156P)

<400> SEQUENCE: 125

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Leu Pro Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205
```

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
            245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 126
<211> LENGTH: 912
<212> TYPE: DNA
<213> ORGANISM: Artificial Sequence
<220> FEATURE:
<223> OTHER INFORMATION: fluoroacetate dehalogenase mutant60(H155L,
      W156P)

<400> SEQUENCE: 126

```
atgccggacc tggctgacct gttcccgggt ttcggttctg aatggatcaa cacctcttct      60
ggtcgtatct tcgctcgtgt tggtggtgac ggtccgccgc tgctgctgct gcacggtttc     120
ccgcagaccc acgttatgtg gcaccgtgtt gctccgaaac tggctgaacg tttcaaagtt     180
atcgttgctg acctgccggg ttacggttgg tctgacatgc cggaatctga cgaacagcac     240
accccgtaca ccaaacgtgc tatggctaaa cagctgatcg aagctatgga cagctgggt     300
cacgttcact cgctctggc tggtcacgac cgtggtgctc gtgtttctta ccgtctggct     360
ctggactctc cgggtcgtct gtctaaactg gctgttctgg acatcctgcc gacctacgaa     420
tactggcagc gtatgaaccg tgcttacgct ctgaaaatct acctgccgtc tttcctggct     480
cagccggctc gctgccgga aaacctgctg ggtggtgacc cggacttcta cgttaaagct     540
aaactggctt cttggacccg tgctggtgac ctgtctgctt cgacccgcg tgctgttgaa     600
cactaccgta tcgctttcgc tgacccgatg cgtcgtcacg ttatgtgcga agactaccgt     660
gctggtgctt acgctgactt cgaacacgac aaaatcgacg ttgaagctgg taacaaaatc     720
ccggttccga tgctggctct gtggggtgct tctggtatcg ctcagtctgc tgctaccccg     780
ctggacgttt ggcgtaaatg gcttctgac gttcagggtg ctccgatcga atctggtcac     840
ttcctgccgg aagaagctcc ggaccagacc gctgaagctc tggttcgttt cttctctgct     900
gctccgggtt ct                                                         912
```

<210> SEQ ID NO 127
<211> LENGTH: 304
<212> TYPE: PRT
<213> ORGANISM: Artificial Sequence
<220> FEATURE:
<223> OTHER INFORMATION: fluoroacetate dehalogenase mutant61(H155G,
      W156F)

<400> SEQUENCE: 127

Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Gly Asp Gly Pro
            20                  25                  30

```
Pro Leu Leu Leu Leu His Gly Phe Pro Gln Thr His Val Met Trp His
                35                  40                  45

Arg Val Ala Pro Lys Leu Ala Glu Arg Phe Lys Val Ile Val Ala Asp
     50                  55                  60

Leu Pro Gly Tyr Gly Trp Ser Asp Met Pro Glu Ser Asp Glu Gln His
 65                  70                  75                  80

Thr Pro Tyr Thr Lys Arg Ala Met Ala Lys Gln Leu Ile Glu Ala Met
                 85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Gly Pro Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285

Gln Thr Ala Glu Ala Leu Val Arg Phe Phe Ser Ala Ala Pro Gly Ser
    290                 295                 300

<210> SEQ ID NO 128
<211> LENGTH: 912
<212> TYPE: DNA
<213> ORGANISM: Artificial Sequence
<220> FEATURE:
<223> OTHER INFORMATION: fluoroacetate dehalogenase mutant61(H155G,
      W156F)

<400> SEQUENCE: 128
atgccggacc tggctgacct gttcccgggt tcggttctg aatggatcaa cacctcttct      60
ggtcgtatct tcgctcgtgt tggtggtgac ggtccgccgc tgctgctgct gcacggtttc     120
ccgcagaccc acgttatgtg caccgtgtt gctccgaaac tggctgaacg tttcaaagtt     180
atcgttgctg acctgccggg ttacggttgg tctgacatgc cggaatctga cgaacagcac    240
accccgtaca ccaaacgtgc tatggctaaa cagctgatcg aagctatgga acagctgggt    300
cacgttcact cgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acggtccgtc tttcctggct    480
cagccggctc cgctgccgga aaacctgctg ggtggtgacc cggacttcta cgttaaagct    540
```

-continued

```
aaactggctt cttggacccg tgctggtgac ctgtctgctt tcgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                         912
```

<210> SEQ ID NO 129  
<211> LENGTH: 304  
<212> TYPE: PRT  
<213> ORGANISM: Artificial Sequence  
<220> FEATURE:  
<223> OTHER INFORMATION: fluoroacetate dehalogenase mutant62(H155D, W156R)

<400> SEQUENCE: 129

```
Met Pro Asp Leu Ala Asp Leu Phe Pro Gly Phe Gly Ser Glu Trp Ile
1               5                   10                  15

Asn Thr Ser Ser Gly Arg Ile Phe Ala Arg Val Gly Asp Gly Pro
            20                  25                  30

Pro Leu Leu Leu Leu His Gly Phe Pro Gln Thr His Val Met Trp His
        35                  40                  45

Arg Val Ala Pro Lys Leu Ala Glu Arg Phe Lys Val Ile Val Ala Asp
    50                  55                  60

Leu Pro Gly Tyr Gly Trp Ser Asp Met Pro Glu Ser Asp Glu Gln His
65                  70                  75                  80

Thr Pro Tyr Thr Lys Arg Ala Met Ala Lys Gln Leu Ile Glu Ala Met
                85                  90                  95

Glu Gln Leu Gly His Val His Phe Ala Leu Ala Gly His Asp Arg Gly
            100                 105                 110

Ala Arg Val Ser Tyr Arg Leu Ala Leu Asp Ser Pro Gly Arg Leu Ser
        115                 120                 125

Lys Leu Ala Val Leu Asp Ile Leu Pro Thr Tyr Glu Tyr Trp Gln Arg
    130                 135                 140

Met Asn Arg Ala Tyr Ala Leu Lys Ile Tyr Asp Arg Ser Phe Leu Ala
145                 150                 155                 160

Gln Pro Ala Pro Leu Pro Glu Asn Leu Leu Gly Gly Asp Pro Asp Phe
                165                 170                 175

Tyr Val Lys Ala Lys Leu Ala Ser Trp Thr Arg Ala Gly Asp Leu Ser
            180                 185                 190

Ala Phe Asp Pro Arg Ala Val Glu His Tyr Arg Ile Ala Phe Ala Asp
        195                 200                 205

Pro Met Arg Arg His Val Met Cys Glu Asp Tyr Arg Ala Gly Ala Tyr
    210                 215                 220

Ala Asp Phe Glu His Asp Lys Ile Asp Val Glu Ala Gly Asn Lys Ile
225                 230                 235                 240

Pro Val Pro Met Leu Ala Leu Trp Gly Ala Ser Gly Ile Ala Gln Ser
                245                 250                 255

Ala Ala Thr Pro Leu Asp Val Trp Arg Lys Trp Ala Ser Asp Val Gln
            260                 265                 270

Gly Ala Pro Ile Glu Ser Gly His Phe Leu Pro Glu Glu Ala Pro Asp
        275                 280                 285
```

```
Gln Thr Ala Glu Ala Leu Val Arg Phe Phe Ser Ala Ala Pro Gly Ser
    290                 295                 300
```

```
<210> SEQ ID NO 130
<211> LENGTH: 912
<212> TYPE: DNA
<213> ORGANISM: Artificial Sequence
<220> FEATURE:
<223> OTHER INFORMATION: fluoroacetate dehalogenase mutant62(H155D,
      W156R)

<400> SEQUENCE: 130
atgccggacc tggctgacct gttcccgggt ttcggttctg aatggatcaa cacctcttct      60
ggtcgtatct tcgctcgtgt tggtggtgac ggtccgccgc tgctgctgct gcacggtttc    120
ccgcagaccc acgttatgtg gcaccgtgtt gctccgaaac tggctgaacg tttcaaagtt    180
atcgttgctg acctgccggg ttacggttgg tctgacatgc cggaatctga cgaacagcac    240 acccgtaca ccaaacgtgc tatggctaaa cagctgatcg aagctatgga acagctgggt     300
cacgttcact tcgctctggc tggtcacgac cgtggtgctc gtgtttctta ccgtctggct    360
ctggactctc cgggtcgtct gtctaaactg gctgttctgg acatcctgcc gacctacgaa    420
tactggcagc gtatgaaccg tgcttacgct ctgaaaatct acgaccgttc tttcctggct    480
cagccggctc cgctgccgga aaacctgctg ggtggtgacc cggacttcta cgttaaagct    540
aaactggctt cttggacccg tgctggtgac ctgtctgctt tcgacccgcg tgctgttgaa    600
cactaccgta tcgctttcgc tgacccgatg cgtcgtcacg ttatgtgcga agactaccgt    660
gctggtgctt acgctgactt cgaacacgac aaaatcgacg ttgaagctgg taacaaaatc    720
ccggttccga tgctggctct gtggggtgct tctggtatcg ctcagtctgc tgctaccccg    780
ctggacgttt ggcgtaaatg ggcttctgac gttcagggtg ctccgatcga atctggtcac    840
ttcctgccgg aagaagctcc ggaccagacc gctgaagctc tggttcgttt cttctctgct    900
gctccgggtt ct                                                        912
```

FLUOROACETATE DEHALOGENASE MUTANT AND APPLICATION THEREOF

REFERENCE TO SEQUENCE LISTING

The Sequence Listing is submitted concurrently with the specification as an ASCII formatted text file via EFS-Web, with a file name of "P22412556USSEQ.TXT", a creation date of Jun. 9, 2022, and a size of 261,208 bytes. The Sequence Listing filed via EFS-Web is part of the specification and is incorporated in its entirety by reference herein.

TECHNICAL FIELD

The present invention belongs to the field of biotechnology, in particular, the present invention relates to a fluoroacetate dehalogenase mutant and application thereof.

BACKGROUND

2-Oxo-1-pyrrolidine derivatives such as Levetiracetam, Brivaracetam and Seletracetam, belong to a novel antiepileptic drug developed by UCB, Belgium. EP1806339 discloses a preparation method thereof, which uses (R)-2-bromobutyric acid and corresponding 2-oxo-1-pyrrolidine compound for a substitution reaction, followed by action with triethylamine to obtain corresponding products. Among them, (R)-2-bromobutyric acid is an important raw material, which has a decisive effect on the production of antiepileptic drugs, i.e., 2-oxo-1-pyrrolidine derivatives. Thus, it is very important to find a method for the preparation of (R)-2-bromobutyric acid with low cost and high optical purity.

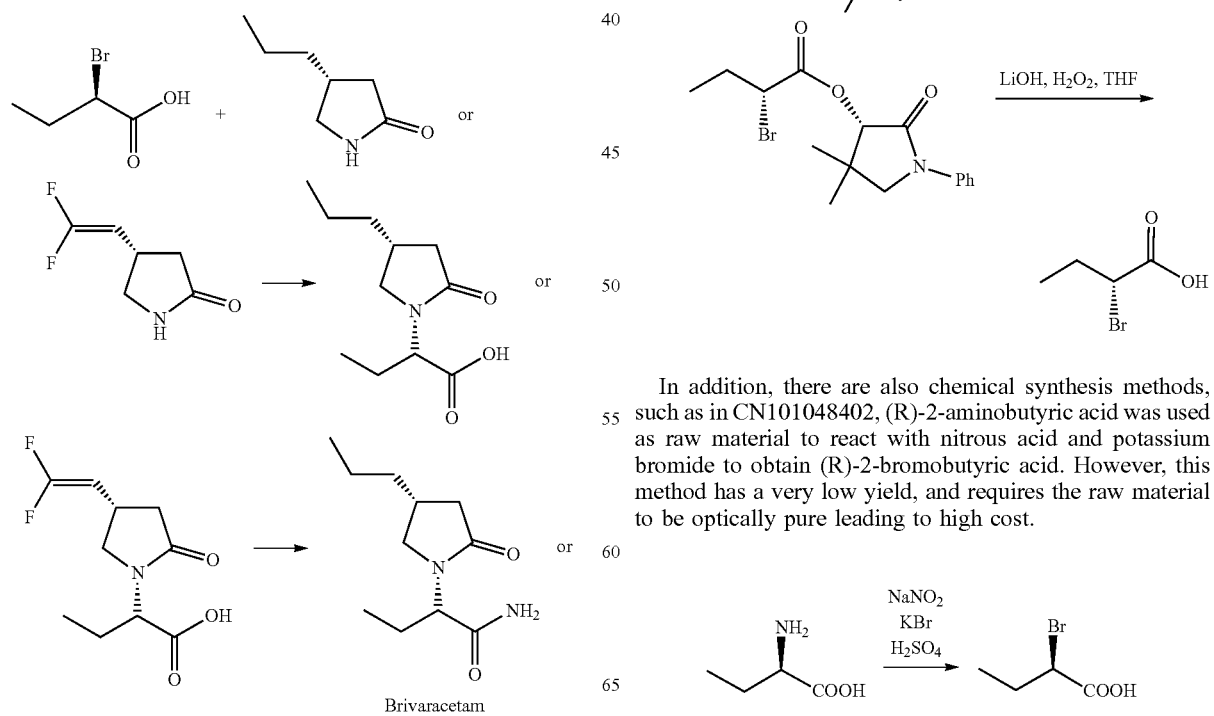

Brivaracetam

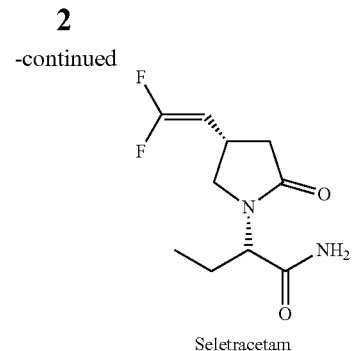

Seletracetam

Currently, the method of preparation of (R)-2-bromobutyric acid includes a method of resolving the racemic 2-bromobutyric acid, for example, in Journal of Biological Chemistry, 1927(75), 337-365, strychnine was used as the chiral resolving agent. The method requires multiple steps of recrystallization and expensive chiral resolving agent, thereby the method is not beneficial to large-scale industrial production. Alternatively, a chiral auxiliary is used to resolve the racemic 2-bromobutyric acid, such as (S)-N-phenylpantolactone was used as the chiral auxiliary in Tetrhedron Asymmetry, 16(2005), 3739-3745. (S)-N-phenylpantolactone was esterified firstly with 2-bromobutyric acid to form an ester compound, followed by hydrolyzation to be (R)-2-bromobutyric acid. In this method, the esterification yield was only 67%, and the ee value was not desirable. Besides, the method uses a silica gel column chromatography to separate, which could not be conducted in the industrial production.

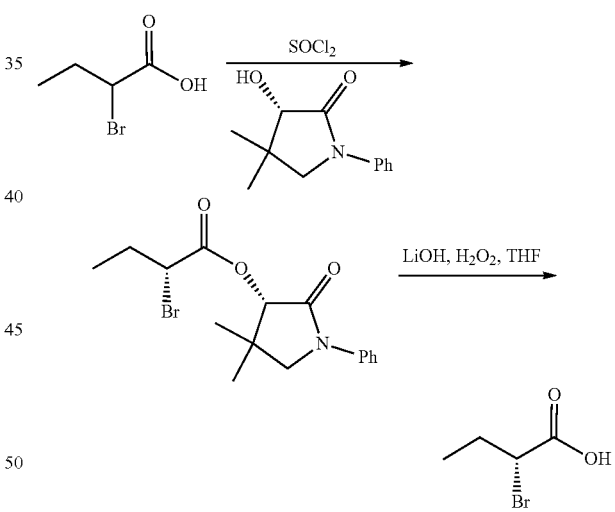

In addition, there are also chemical synthesis methods, such as in CN101048402, (R)-2-aminobutyric acid was used as raw material to react with nitrous acid and potassium bromide to obtain (R)-2-bromobutyric acid. However, this method has a very low yield, and requires the raw material to be optically pure leading to high cost.

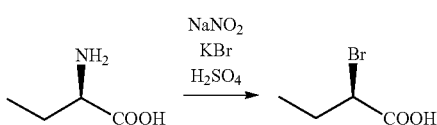

Dehalogenase is a kind of hydrolase with catalytic activity, which is capable of catalyzing the cleavage of carbon-halogen bonds in organohalogen compounds to release halogen atoms from the compounds. Dehalogenases have been reported for the resolution of halogenated compounds, e.g. J.Am.Chem.Soc., 2017, Shuguang Yuan and Manfred T. Reetz reported that fluoroacetate dehalogenase (FACD) RPA1163 could be used to obtain (R)-2-hydroxy-2-phenylacetic acid or (R)-2-hydroxy-3-phenylpropionic acid by defluorination of S-form in a racemic substrate 2-fluoro-2-phenylacetic acid or 2-fluoro-3-phenylpropionic acid, retaining unreacted (R)-2-fluoro-2-phenylacetic acid or (R)-2-fluoro-3-phenylpropionic acid to achieve the kinetic resolution. Although the enzyme is dehalogenase, the related reports only proved that the enzyme can be worked on fluorinated substrates currently, without any report that fluoroacetate dehalogenase could be used to catalyze other halogenated substrates, such as chlorinated or brominated substrates.

Content of the Present Invention

The technical problem to be solved in the present disclosure is the defect that existing wild-type fluoroacetate dehalogenases cannot be used to catalyze brominated substrates, especially 2-bromobutyric acid substrate. Therefore, the present disclosure provides a fluoroacetate dehalogenase mutant and its application in the preparation of (R)-2-bromobutyric acid. When the fluoroacetate dehalogenase mutant of the present disclosure is used to prepare (R)-2-bromobutyric acid, the preparation has a low production cost and a high stereoselectivity, facilitating industrialized production.

The source of the wild-type fluoroacetate dehalogenase used in the present disclosure is *Rhodopseudomonas palustris*, the specific sequence of which is shown in the sequence listing as SEQ ID NO: 1. The wild-type fluoroacetate dehalogenase consists of 304 amino acid residues, and the applicant found that the wild-type fluoroacetate dehalogenase cannot be used to catalyze 2-bromobutyric acid by experiments. The present inventors conducted extensive screening for saturation mutations in different amino acid sites of the above wild-type enzyme for the substrate and found that some mutants with mutations at the sites H155, W156 or Y219 could be used to catalyze 2-bromobutyric acid substrate. Further, these sites were mutated combinatorially and a mutant library was constructed, from which the wild-type fluoroacetate dehalogenase described in the present disclosure was screened out.

The first technical solution of the present disclosure to solve the above technical problems is: a fluoroacetate dehalogenase mutant, wherein the fluoroacetate dehalogenase mutant comprises a sequence obtained by mutating amino acid residue H at position 155, and/or amino acid residue W at position 156 of SEQ ID NO. 1; the fluoroacetate dehalogenase mutant has activity catalyzing a brominaed substrate, particularly a 2-bromobutyric acid substrate.

Preferably, the fluoroacetate dehalogenase mutant comprises a sequence obtained by mutating amino acid residue H at position 155, and/or amino acid residue W at position 156 of SEQ ID NO. 1 to a natural amino acid residue.

More preferably, the fluoroacetate dehalogenase mutant further comprises a sequence obtained by mutating amino acid residue Y at position 219 of SEQ ID NO. 1 to a natural amino acid residue.

Further more preferably, the amino acid residue H at position 155 is mutated to A, C, D, E, F, G, I, L, M, N, P, Q, S, T, V or W; preferably mutated to I, N, V, F, L, Q, A, C, M, P, T or W; more preferably mutated to I, N or V; and/or, the amino acid residue W at position 156 is mutated to A, C, D, F, G, I, L, M, P, R, S, T, V or Y; preferably mutated to F, M, R, S, T, G, L, A, C, D, I or Y; more preferably mutated to F, M, R, S or T; and/or, the amino acid residue Y at position 219 is mutated to a hydrophobic amino acid residue; preferably mutated to F, L or M.

Preferably, the amino acid residue H at position 155 is mutated to V, or the amino acid residue W at position 156 is mutated to M, T, C, F, S, V, A or L.

The above capitalized English single letters represent amino acids well known to those skilled in the art. According to the present disclosure, the letters herein represent corresponding amino acid residues.

Preferably, an amino acid sequence of the fluoroacetate dehalogenase mutant is shown in SEQ ID NO: 7, SEQ ID NO: 9, SEQ ID NO: 11, SEQ ID NO: 13, SEQ ID NO: 15, SEQ ID NO: 17, SEQ ID NO: 19, SEQ ID NO: 21, SEQ ID NO: 23, SEQ ID NO: 25, SEQ ID NO: 27, SEQ ID NO: 29, SEQ ID NO: 31, SEQ ID NO: 33, SEQ ID NO: 35, SEQ ID NO: 37, SEQ ID NO: 39, SEQ ID NO: 41, SEQ ID NO: 43, SEQ ID NO: 45, SEQ ID NO: 47, SEQ ID NO: 49, SEQ ID NO: 51, SEQ ID NO: 53, SEQ ID NO: 55, SEQ ID NO: 57, SEQ ID NO: 59, SEQ ID NO: 61, SEQ ID NO: 63, SEQ ID NO: 65, SEQ ID NO: 67, SEQ ID NO: 69, SEQ ID NO: 71, SEQ ID NO: 73, SEQ ID NO: 75, SEQ ID NO: 77, SEQ ID NO: 79, SEQ ID NO: 81, SEQ ID NO: 83, SEQ ID NO: 85, SEQ ID NO: 87, SEQ ID NO: 89, SEQ ID NO: 91, SEQ ID NO: 93, SEQ ID NO: 95, SEQ ID NO: 97, SEQ ID NO: 99, SEQ ID NO: 101, SEQ ID NO: 103, SEQ ID NO: 105, SEQ ID NO: 107, SEQ ID NO: 109, SEQ ID NO: 111, SEQ ID NO: 113, SEQ ID NO: 115, SEQ ID NO: 117, SEQ ID NO: 119, SEQ ID NO: 121, SEQ ID NO: 123, SEQ ID NO: 125, SEQ ID NO: 127, SEQ ID NO: 129; more preferably, a nucleotide sequence encoding the fluoroacetate dehalogenase mutant is shown in SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, SEQ ID NO: 30, SEQ ID NO: 32, SEQ ID NO: 34, SEQ ID NO: 36, SEQ ID NO: 38, SEQ ID NO: 40, SEQ ID NO: 42, SEQ ID NO: 44, SEQ ID NO: 46, SEQ ID NO: 48, SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, SEQ ID NO: 68, SEQ ID NO: 70, SEQ ID NO: 72, SEQ ID NO: 74, SEQ ID NO: 76, SEQ ID NO: 78, SEQ ID NO: 80, SEQ ID NO: 82, SEQ ID NO: 84, SEQ ID NO: 86, SEQ ID NO: 88, SEQ ID NO: 90, SEQ ID NO: 92, SEQ ID NO: 94, SEQ ID NO: 96, SEQ ID NO: 98, SEQ ID NO: 100, SEQ ID NO: 102, SEQ ID NO: 104, SEQ ID NO: 106, SEQ ID NO: 108, SEQ ID NO: 110, SEQ ID NO: 112, SEQ ID NO: 114, SEQ ID NO: 116, SEQ ID NO: 118, SEQ ID NO: 120, SEQ ID NO: 122, SEQ ID NO: 124, SEQ ID NO: 126, SEQ ID NO: 128, SEQ ID NO: 130.

The second technical solution of the present disclosure to solve the above technical problems is: an isolated nucleic acid, wherein the nucleic acid encodes the fluoroacetate dehalogenase mutant; preferably, the nucleotide sequence of the nucleic acid is shown in SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, SEQ ID NO: 30, SEQ ID NO: 32, SEQ ID NO: 34, SEQ ID NO: 36, SEQ ID NO: 38, SEQ ID NO: 40, SEQ ID NO: 42, SEQ ID NO: 44, SEQ ID NO: 46, SEQ ID NO: 48, SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, SEQ ID NO: 68, SEQ ID NO: 70, SEQ ID NO: 72, SEQ ID NO: 74, SEQ ID NO: 76, SEQ ID NO: 78, SEQ ID NO: 80, SEQ ID NO: 82, SEQ ID NO: 84, SEQ ID NO: 86, SEQ ID NO: 88, SEQ ID NO: 90, SEQ ID NO: 92, SEQ ID NO: 94, SEQ ID NO: 96, SEQ ID NO: 98, SEQ ID NO: 100, SEQ ID NO: 102, SEQ ID NO: 104, SEQ ID NO: 106, SEQ ID NO: 108, SEQ ID NO: 110, SEQ ID NO: 112, SEQ ID NO: 114, SEQ ID NO: 116, SEQ ID NO: 118, SEQ ID NO: 120, SEQ ID NO: 122, SEQ ID NO: 124, SEQ ID NO: 126, SEQ ID NO: 128, SEQ ID NO: 130.

The third technical solution of the present disclosure to solve the above technical problems is: a recombinant expression vector comprising the nucleic acid mentioned above.

The fourth technical solution of the present disclosure to solve the above technical problems is: a transformant comprising the nucleic acid or the recombinant expression vector mentioned above.

The fifth technical solution of the present disclosure to solve the above technical problems is: a dehalogenase combination catalyzing a halogenated substrate, wherein the dehalogenase combination catalyzing a halogenated substrate comprises two or more of fluoroacetate dehalogenases or mutants thereof, wherein the fluoroacetate dehalogenase mutants are the fluoroacetate dehalogenase mutant of the present disclosure. Preferably, the halogenated substrate is a brominated substrate; more preferably a 2-bromobutyric acid, methyl 2-bromobutyrate or ethyl 2-bromobutyrate substrate.

The sixth technical solution of the present disclosure to solve the above technical problems is: a catalyst combination, wherein the catalyst combination comprises (a) the fluoroacetate dehalogenase mutant or the dehalogenase combination catalyzing a halogenated substrate of the present disclosure, and (b) a lipase, wherein the lipase is preferably lipase B from Candida antartica.

The seventh technical solution of the present disclosure to solve the above technical problems is: a reaction system for a catalyst, wherein the reaction system comprises a substrate and a catalyst, wherein the substrate is 2-bromobutyric acid, methyl 2-bromobutyrate or ethyl 2-bromobutyrate, wherein,
  (a) when the substrate is 2-bromobutyric acid, the catalyst comprises the fluoroacetate dehalogenase mutant or the dehalogenase combination catalyzing a halogenated substrate of the present disclosure; wherein,
  the 2-bromobutyric acid has a concentration of 0.02 g/ml-0.2 g/ml, preferably 0.1-0.15 g/ml, more preferably 0.1 g/ml;
  the fluoroacetate dehalogenase or mutant thereof has a concentration of 2-20 U/ml, preferably 10 U/ml;
  (b) when the substrate is methyl 2-bromobutyrate or ethyl 2-bromobutyrate, the catalyst comprises the catalyst combination of the present disclosure; wherein, the methyl 2-bromobutyrate or ethyl 2-bromobutyrate has concentration of 0.02 g/ml-0.2 g/ml, preferably 0.1-0.15 g/ml, more preferably 0.15 g/ml;
  the fluoroacetate dehalogenase or mutant thereof has a concentration of 2-20 U/ml, preferably 10 U/ml;
  the lipase has a concentration of 1-20 g/L, preferably 10 g/L;
  when the reaction system comprises a lipase, the reaction system further comprises methanol, wherein a volume ratio of the methanol to the reaction system is 1-10%, preferably 10%.

In a preferred embodiment of the present disclosure, the reaction system further comprises a reaction solvent, wherein the reaction solvent is preferably water.

In another preferred embodiment of the present disclosure, pH is 6-8, preferably 7. When the pH is too high, the feedstock will decompose spontaneously, which will affect the yield.

According to the present disclosure, the substrate can be one or more of racemate, R-form or S-form enriched enantiomer, wherein the R-form-enriched means that the R-form coexists with the S-form and the molar ratio of R-form to S-form is more than 1:1, and the S-form-enriched means that the R-form coexists with the S-form and the molar ratio of S-form to R-form is more than 1:1.

The eighth technical solution of the present disclosure to solve the above technical problems is: a use of the fluoroacetate dehalogenase mutant, the dehalogenase combination catalyzing a halogenated substrate, the catalyst combination, the reaction system in preparation of (R)-2-bromobutyric acid and/or (R)-2-hydroxybutyric acid.

The ninth technical solution of the present disclosure to solve the above technical problems is: a preparation method of (R)-2-bromobutyric acid, wherein the preparation method comprises following steps: a catalytic reaction is performed in the presence of the reaction system mentioned above to obtain (R)-2-bromobutyric acid. Herein the catalytic reaction comprises a dehalogenation reaction, or a dehalogenation reaction and an ester hydrolysis reaction.

Herein, preferably, the catalytic reaction has a reaction system with a temperature of 20-30° C., preferably 30° C.;
  and/or, the catalytic reaction has a reaction time of 5-10 hours, preferably 8 hours.

When the substrate is 2-bromobutyric acid, the reaction formula is as follows:

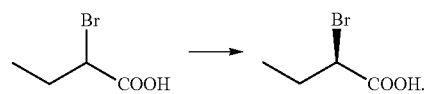

The tenth technical solution of the present disclosure to solve the above technical problems is: a preparation method of (R)-2-hydroxybutyric acid, wherein the preparation method comprises following steps: a catalytic reaction is performed in the presence of the reaction system mentioned above to obtain (R)-2-hydroxybutyric acid. Herein the catalytic reaction comprises a dehalogenation reaction, or a dehalogenation reaction and an ester hydrolysis reaction.

When the substrate is 2-bromobutyric acid, the dehalogenase reaction is highly selective for (S)-2-bromobutyric acid in 2-bromobutyric acid (i.e., the dehalogenase preferentially reacts with (S)-2-bromobutyric acid to generate (R)-2-hydroxybutyric acid, and after the (S)-2-bromobutyric acid reacts completely, the (R)-2-bromobutyric acid participates in the reaction), resulting in dehalogenation and configuration inversion to obtain (R)-2-hydroxybutyric acid, while the unreacted or incomplete reacted (R)-2-bromobutyric acid in 2-bromobutyric acid is retained. The physicochemical properties of (R)-2-bromobutyric acid and (R)-2-hydroxybutyric acid in the product are quite different, so they are easily to be separated.

Preferably, the catalytic reaction has a reaction system with a temperature of 20-30° C., preferably 30° C.; when the temperature is too high, the feedstock will decompose spontaneously, which will affect the yield;
  and/or, the catalytic reaction has a reaction time of 5-10 hours, preferably 8 hours.

When the substrate is 2-bromobutyric acid, the reaction formula is as follows:

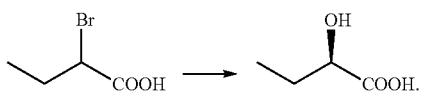

Unless otherwise specified, the concentration of the above compounds shall be the concentration of the above compounds in the whole reaction system before the reaction.

On the basis of common knowledge in the art, each of the above preferred conditions can be combined in any way to obtain each preferred example of the present invention.

The reagents and raw materials used in the present invention are commercially available.

The positive progressive effect of the present invention is that:

The fluoroacetate dehalogenase mutant of the present disclosure can be used to catalyze brominated substrates, in particular 2-bromobutyric acid. In a preferred example of the present disclosure, the fluoroacetate dehalogenase mutant is capable of catalyzing a substrate with a concentration of up to 0.1 g/ml. When the fluoroacetate dehalogenase mutant of the present disclosure is used to prepare (R)-2-bromobutyric acid, the preparation has a low cost and a high stereoselectivity, facilitating industrialized production.

DETAILED DESCRIPTION OF THE PREFERRED EMBODIMENT

Figure 1:
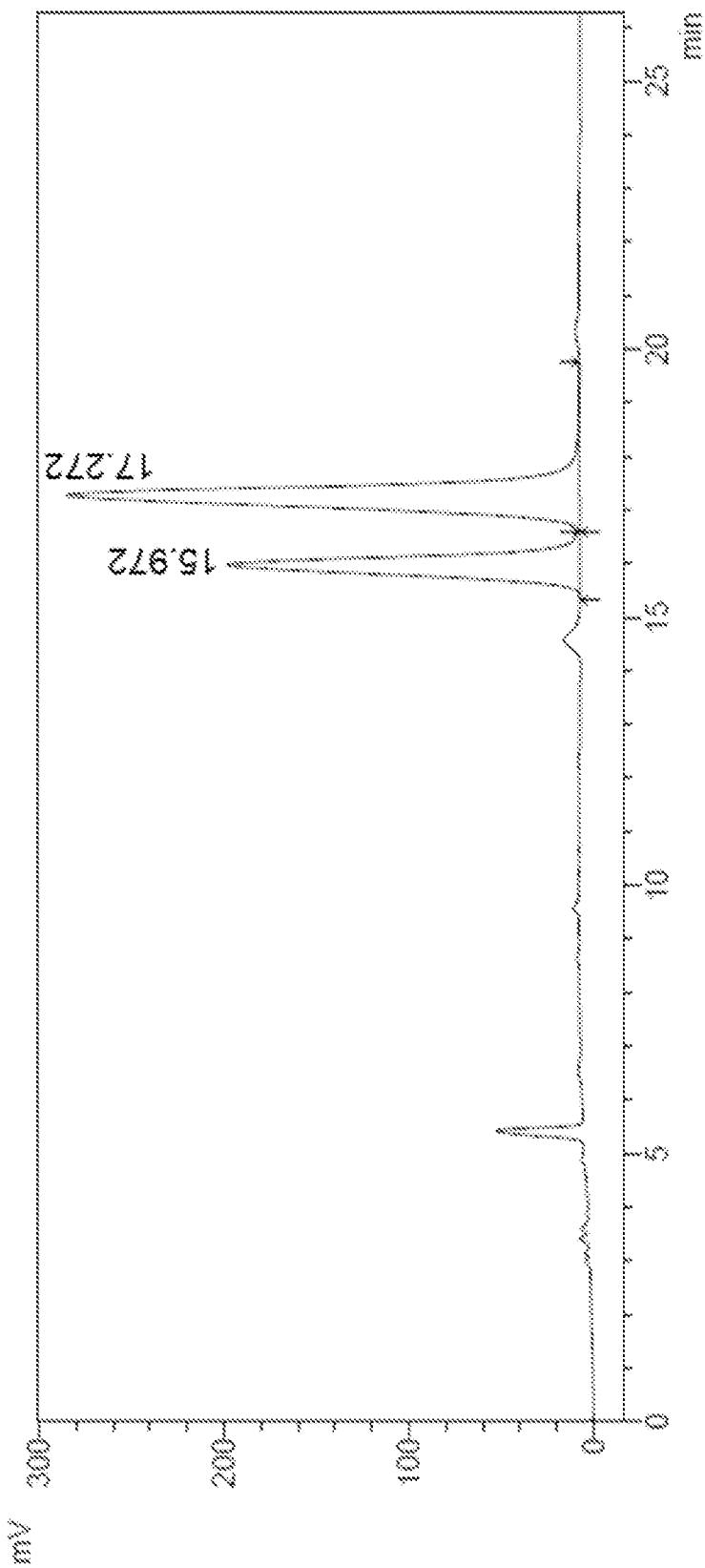
FIG. 1 is the results of chiral HPLC analysis of the reaction feedstock 2-bromobutyric acid in Example 3.

The following examples further illustrate the present disclosure, but the present disclosure is not limited thereto. Experimental methods for which specific conditions are not indicated in the following examples are selected according to conventional methods and conditions, or according to the trade description.

The experimental methods in the present invention are conventional unless otherwise specified, and the gene cloning operations can be specified in *Molecular Cloning: A Laboratory Manual*, edited by J Sambrook et al.

The 2-bromobutyric acid in the present disclosure can be one or more of 2-bromobutyric acid racemate, R-form-enriched 2-bromobutyric acid and S-form-enriched 2-bromobutyric acid unless otherwise specified, wherein the R-form-enriched means that the R-form coexists with the S-form and the molar ratio of R-form to S-form is more than 1:1, and the S-form-enriched means that the R-form coexists with the S-form and the molar ratio of S-form to R-form is more than 1:1.

The amino acid abbreviation symbols in the present disclosure are conventional in the art unless otherwise specified, and the amino acids corresponding to the specific abbreviation symbols are shown in Table 1.

TABLE 1

| Amino acid name | Three letters symbol | Single letter symbol | Amino acid name | Three letters symbol | Single letter symbol |
|---|---|---|---|---|---|
| Alanine | Ala | A | Leucine | Leu | L |
| Arginine | Arg | R | Lysine | Lys | K |
| Asparagine | Asn | N | Methionine | Met | M |
| Aspartic acid | Asp | D | Phenylalanine | Phe | F |
| Cysteine | Cys | C | Proline | Pro | P |
| Glutanine | Gln | Q | Serine | Ser | S |
| Glutamic acid | Glu | E | Threonine | Thr | T |
| Glycine | Gly | G | Tryptophan | Trp | W |
| Histidine | His | H | Tyrosine | Tyr | Y |
| Isoleucine | Ile | I | Valine | Val | V |

The codons corresponding to the amino acids are also conventional in the art, and the corresponding relationships of specific amino acids with the codons are shown in Table 2.

TABLE 2

| The first nucleotide | The second nucleotide | | | | The third nucleotide |
|---|---|---|---|---|---|
| | T | C | A | G | |
| T | Phenylalanine (F) | Serine (S) | Tyrosine (Y) | Cysteine (C) | T |
| | Phenylalanine (F) | Serine (S) | Tyrosine (Y) | Cysteine (C) | C |
| | Leucine (L) | Serine (S) | Stop codon | Stop codon | A |
| | Leucine (L) | Serine (S) | Stop codon | Tryptophan (W) | G |
| C | Leucine (L) | Proline (P) | Histidine (H) | Arginine (R) | T |
| | Leucine (L) | Proline (P) | Histidine (H) | Arginine (R) | C |
| | Leucine (L) | Proline (P) | Glutamine (Q) | Arginine (R) | A |
| | Leucine (L) | Proline (P) | Glutamine (Q) | Arginine (R) | G |
| A | Isoleucine (I) | Threonine (T) | Asparagine (N) | Serine (S) | T |
| | Isoleucine (I) | Threonine (T) | Asparagine (N) | Serine (S) | C |
| | Isoleucine (I) | Threonine (T) | Lysine (K) | Arginine (R) | A |
| | Methionine (M) | Threonine (T) | Lysine (K) | Arginine (R) | G |
| G | Valine (V) | Alanine (A) | Aspartic acid (D) | Glycine (G) | T |
| | Valine (V) | Alanine (A) | Aspartic acid (D) | Glycine (G) | C |
| | Valine (V) | Alanine (A) | Glutamic acid (E) | Glycine (G) | A |
| | Valine (V) | Alanine (A) | Glutamic acid (E) | Glycine (G) | G | pET28a and bugbuster protein extraction reagent were purchased from Novagen; enzyme DpnI was purchased from Invitrogen Shanghai Trading Co., Ltd; *E. coli* BL21(DE3) competent cell was purchased from Beijing Dingguo Changsheng Biotech Co., Ltd; 2-bromobutyric acid was purchased from Yancheng City Shengda Chemical Co., Ltd.

The method of chiral HPLC (High Performance Liquid Chromatography) analysis for the substrate 2-bromobutyric acid and the product 2-bromobutyric acid is as follows:

Chromatographic condition: Daicel Chiralpak IG, 4.6 mm*250 mm, 5 μm; mobile phase: n-hexane/isopropanol/TFA=99:1:0.1; wavelength of detection: 230 nm; flow rate: 0.7 mL/min; temperature of column: 25° C.

The method of HPLC analysis for the substrate 2-bromobutyric acid and the product is as follows:

Chromatographic condition: Inertsil ODS-3, 4.6 mm*150 mm, 5 μm; mobile phase A: 10 mmol sodium dihydrogen phosphate aqueous solution (pH=3.0), mobile phase B: acetonitrile; gradient elution; wavelength of detection: 205 nm; flow rate: 0.7 mL/min; temperature of column: 35° C.

Conversion rate=(Reagent−Remaining Reagent)/Reagent×100% (Reagent: 2-bromobutyric acid).

Example 1 Construction of the Fluoroacetate Dehalogenase Mutant Library

The primer sequences designed for the construction of the mutant library with mutations at positions 155, 156, and 219 in the sequence of the fluoroacetate dehalogenase FACD-RPA1163 (the source is *Rhodopseudomonas palustris*) (i.e., SEQ ID NO: 1 in the sequence listing) are shown in Table 3:

TABLE 3

| No. | Mutation positions and primer names | primer sequence | SEQ ID NO: |
|---|---|---|---|
| 1 | H155W156-Forward primer | GCACTGAAAATCTATNNKNNKAGCTTTCTGGCACAGC | 3 |
| 2 | H155W156-Reverse primer | GCTGTGCCAGAAAGCTMNNMNNATAGATTTTCAGTGC | 4 |
| 3 | Y219-Forward primer | GTGATGTGTGAAGATNNKCGTGCGGGTGCGTATG | 5 |
| 4 | Y219-Reverse primer | CATACGCACCCGCACGMNNATCTTCACACATCAC | 6 |

Wherein N represents any one of nucleotides A, G, C and T, M represents A or C, and K represents G or T; which are selected according to the coding nucleotide of the amino acid to be mutated at the position. For example, NNK in A166-Forward primer can represent AAG (Lysine), AAT (Aspartic acid), AGG (Arginine) or AGT (Serine), etc. The nucleotides corresponding to the specific amino acids can refer to Table 2.

The plasmid template pET28a-FACD-RPA1163 was constructed according to the method disclosed in J. Am. Chem. Soc., 2017,139(32), 11241-11247, and the target bands were amplified by PCR with pET28a-FACD-RPA1163 as the template. The amplification reaction system was:

50 μL PCR amplification system:

| Reagents | Dosage (μL) |
|---|---|
| 2 × PCR buffer ( with high fidelity enzyme) | 25 |
| Primer F | 1 |
| Primer R | 1 |

| Reagents | Dosage (μL) |
|---|---|
| Template | 1 |
| Deionized water | 22 |

The amplification procedure was as follows:

| | | |
|---|---|---|
| 95° C. | 5 min | |
| 95° C. | 30 s | |
| 50° C. | 30 s | 30 cycles |
| 72° C. | 5 min | |
| 72° C. | 10 min | |
| 12° C. | Hold | |

The PCR products were digested by DpnI at 37° C. for 2 hr, followed by being transformed into *E. coli* BL21 (DE3) competent cells after the reaction. The cells were coated on LB medium containing 100 μg/mL Ampicillin, and incubated overnight at 37° C. to obtain transformants containing the mutant library.

Example 2 Screening the Mutant Library in High-Throughput

The screening was performed according to the following experimental steps:

The transformants obtained in Example 1 were inoculated in the 96-well plate and induced by IPTG overnight at 30° C. After that, the bacteria were collected, lysed by adding bugbuster protein extraction reagent and centrifuged to obtain the total enzyme solution.

250 mg of substrate racemic 2-bromobutyric acid was taken to be dissolved in 45 mL of 1 mM Tris solution, and the pH was adjusted to 8.0-8.5 with dilute NaOH on ice, and the volume was set to 50 ml to prepare the substrate solution with the substrate 2-bromobutyric acid in a concentration of 30 mM. 100 μl of the substrate solution (final concentration of 25 mM) and 20 μL of the above total enzyme solution were added in each reaction. After the solution was reacted for a period of time, 20 μl of the reaction solution was added into the 96-well ELISA plate, 30 μl of saturated $Hg(SCN)_2$ ethanol solution and 150 μL of 60 g/L $FeNH_4(SO_4)_2 \cdot 12H_2O$ (containing 1% nitric acid, w/v) aqueous solution were added sequentially. After 10 min at room temperature, the absorbance was detected at 500 nm by a Microplate Reader.

The wild type enzyme was used as the reference system (the activity of the wild type enzyme could not be detected, which shows that the wild type fluoroacetate dehalogenase FAcD-RPA1163 has no catalytic effect on 2-bromobutyric acid), and positive clones were selected, sequenced and the enzyme activity of which was detected. The sequences of the positive clones were determined by sequencing at Sangon Biotech (Shanghai) Co., Ltd, 698 Xiangmin Road, Songjiang District, Shanghai.

The positive clones were selected and cultured as follows:
10% of the above positive clones were inoculated in 150 mL TB medium and incubated at 37° C. until the $OD_{600}$ value reached about 0.8. Then IPTG was added until the final concentration thereof is 0.1 mM and cooled to 30° C. for induction overnight. After incubation, the culture medium was centrifuged at 4000 rpm for 30 min, the supernatant was discarded, and the bacteria were collected and stored in an ultra-low temperature refrigerator at −80° C. for later use.

The bacteria collected at the end of the culture were washed twice with 20 mM pH 8.0 phosphate buffer, after which the bacteria were resuspended in phosphate buffer with pH 8.0, homogenized and crushed under low temperature and high pressure, and the crushed solution was centrifuged to remove the precipitate, and the obtained supernatant was the mutant crude enzyme solution containing the recombinant dehalogenase.

The above methods were used for the preparation of the crude enzyme solution of the dehalogenase mutant in the following examples.

The method of the enzyme activity assay is: 2.5 g of bacteria were resuspended with 40 mL of 20 mM pH 8.0 phosphate buffer, homogenized and crushed under low temperature and high pressure, the precipitate was discarded by centrifugation, and the supernatant was left to obtain the crude enzyme solution. 900 μL of the substrate solution (30 mM) was added at 30° C., and 100 μL of the crude enzyme solution to be tested was added to obtain 1 mL of the reaction solution. 150 μl of saturated $Hg(SCN)_2$ ethanol solution and 750 μL of 60 g/L $FeNH_4(SO_4)_2·12H_2O$ (containing 1% nitric acid, w/v) aqueous solution were added into 100 μL of the reaction solution sequentially. After 10 min at room temperature, the absorbance value was detected at 500 nm with an UV spectrophotometer. The enzyme activity was calculated based on the production rate of bromine ion. The results are shown in Table 4.

The unit enzyme activity is defined as: the amount of enzyme required to produce 1 μmol of bromine ion per minute under specific reaction conditions (30° C.)

TABLE 4

| fluoroacetate dehalogenase mutant No. | Mutation position | Enzyme activity | Amino acid SEQ ID NO: | Nucleotide SEQ ID NO: |
|---|---|---|---|---|
| 1 | H155I, W156S, Y219F | ***** | 7 | 8 |
| 2 | H155V, W156M, Y219L | ***** | 9 | 10 |
| 3 | H155V, W156R, Y219M | ***** | 11 | 12 |
| 4 | H155I, W156S | ***** | 13 | 14 |
| 5 | H155N, W156F | ***** | 15 | 16 |
| 6 | H155V, W156T | ***** | 17 | 18 |
| 7 | W156M | ***** | 19 | 20 |
| 8 | H155V, W156M | ***** | 21 | 22 |
| 9 | H155V, W156R | ***** | 23 | 24 |
| 10 | H155Q, W156F | **** | 25 | 26 |
| 11 | H155L, W156S | **** | 27 | 28 |
| 12 | H155F, W156G | **** | 29 | 30 |
| 13 | H155F, W156L | **** | 31 | 32 |
| 14 | H155Q, W156L | *** | 33 | 34 |
| 15 | H155V, W156D | *** | 35 | 36 |
| 16 | H155M, W156A | *** | 37 | 38 |
| 17 | H155L, W156I | *** | 39 | 40 |
| 18 | H155F, W156M | *** | 41 | 42 |

TABLE 4-continued

| fluoroacetate dehalogenase mutant No. | Mutation position | Enzyme activity | Amino acid SEQ ID NO: | Nucleotide SEQ ID NO: |
|---|---|---|---|---|
| 19 | H155F, W156R | *** | 43 | 44 |
| 20 | H155A, W156F | *** | 45 | 46 |
| 21 | H155P, W156Y | *** | 47 | 48 |
| 22 | W156T | *** | 49 | 50 |
| 23 | H155V | *** | 51 | 52 |
| 24 | W156C | *** | 53 | 54 |
| 25 | H155T, W156F | *** | 55 | 56 |
| 26 | H155W, W156I | *** | 57 | 58 |
| 27 | H155L, W156L | *** | 59 | 60 |
| 28 | H155P, W156T | *** | 61 | 62 |
| 29 | H155C, W156M | *** | 63 | 64 |
| 30 | H155I, W156A | ** | 65 | 66 |
| 31 | H155L, W156A | ** | 67 | 68 |
| 32 | W156F | ** | 69 | 70 |
| 33 | H155T, W156L | ** | 71 | 72 |
| 34 | H155V, W156Y | ** | 73 | 74 |
| 35 | H155I, W156P | ** | 75 | 76 |
| 36 | H155L, W156F | ** | 77 | 78 |
| 37 | H155V, W156G | ** | 79 | 80 |
| 38 | H155F, W156T | ** | 81 | 82 |
| 39 | H155A, W156M | ** | 83 | 84 |
| 40 | H155V, W156A | ** | 85 | 86 |
| 41 | H155L, W156P | ** | 87 | 88 |
| 42 | H155D, W156L | ** | 89 | 90 |
| 43 | H155N, W156I | ** | 91 | 92 |
| 44 | W156L | ** | 93 | 94 |
| 45 | H155V, W156I | ** | 95 | 96 |
| 46 | H155L, W156T | ** | 97 | 98 |
| 47 | H155Q, W156I | ** | 99 | 100 |
| 48 | H155I, W156C | ** | 101 | 102 |
| 49 | H155S, W156M | * | 103 | 104 |
| 50 | W156S | * | 105 | 106 |
| 51 | W156V | * | 107 | 108 |
| 52 | H155A, W156S | * | 109 | 110 |
| 53 | H155M, W156F | * | 111 | 112 |
| 54 | H155E, W156T | * | 113 | 114 |
| 55 | W156A | * | 115 | 116 |
| 56 | H155E, W156M | * | 117 | 118 |
| 57 | H155L, W156G | * | 119 | 120 |
| 58 | H155L, W156F | * | 121 | 122 |
| 59 | H155E, W156P | * | 123 | 124 |
| 60 | H155L, W156P | * | 125 | 126 |
| 61 | H155G, W156F | * | 127 | 128 |
| 62 | H155D, W156R | * | 129 | 130 |
| 63 | WT | — | 1 | 2 |

Wherein no enzyme activity could be detected in wild-type WT, * represents enzyme activity is below 0.1 U/ml;  represents enzyme activity is between 0.1-1 U/ml: * represents enzyme activity is between 1-5 U/ml; ** represents enzyme activity is between 5-10 U/ml; *** represents enzyme activity is between 10 U/mL-20 U/mL.

Example 3 Preparation of (R)-2-Bromobutyric Acid Catalyzed by the Fluoroacetate Dehalogenase Mutant 50 mL of tap water and 10 g of the substrate 2-bromobutyric acid were added into the reaction flask, and stirred to dissolve. The pH was adjusted to 7.0 with 30% NaOH solution. 20 mL of the mutant crude enzyme solution prepared according to the method in Example 2 (i.e., 20 mL of 100 mM pH 7.0 disodium hydrogen phosphate-sodium dihydrogen phosphate buffer was added into 4 g of the bacteria described in Example 2, stirred well, then homogenized and crushed under high pressure to obtain the mutant crude enzyme solution. Take fluoroacetate dehalogenase mutant 3 as an example, the concentration of which was 10 U/ml) was added, and the volume was set to 100 mL by tap water. The pH was controlled at about 7.0 with 2 mol/L sodium carbonate solution during the reaction. After reacted in water bath at 30° C. for 8 hours, the conversion rate of the substrate 2-bromobutyric acid was detected by sampling. The reaction solution has a pH of 1-2 adjusted with 40% aqueous sulfuric acid, filtered with diatomaceous earth, and the filtrate was extracted three times with an equal volume of toluene. The toluene was combined, and concentrated at 50° C. to obtain (R)-2-bromobutyric acid. The ee value of (R)-2-bromobutyric acid was detected by HPLC. The results of the conversion rate and the ee value are shown in Table 5. The aqueous phase has a pH of 0-1 adjusted with 40% aqueous sulfuric acid, then extracted three times with an equal volume of methyl tert-butyl ether. The methyl tert-butyl ether was combined, and concentrated at 50° C. to obtain 2-hydroxybutyric acid. The optical rotation of 2-hydroxybutyric acid was [a]25D=+4.2° (C=3.0, $H_2O$). The product could be known as (R)-2-hydroxybutyric acid by referring to the content of Advanced Synthesis and Catalysis, 2016, vol. 358, #18, p. 2923-2928.

Figure 2:
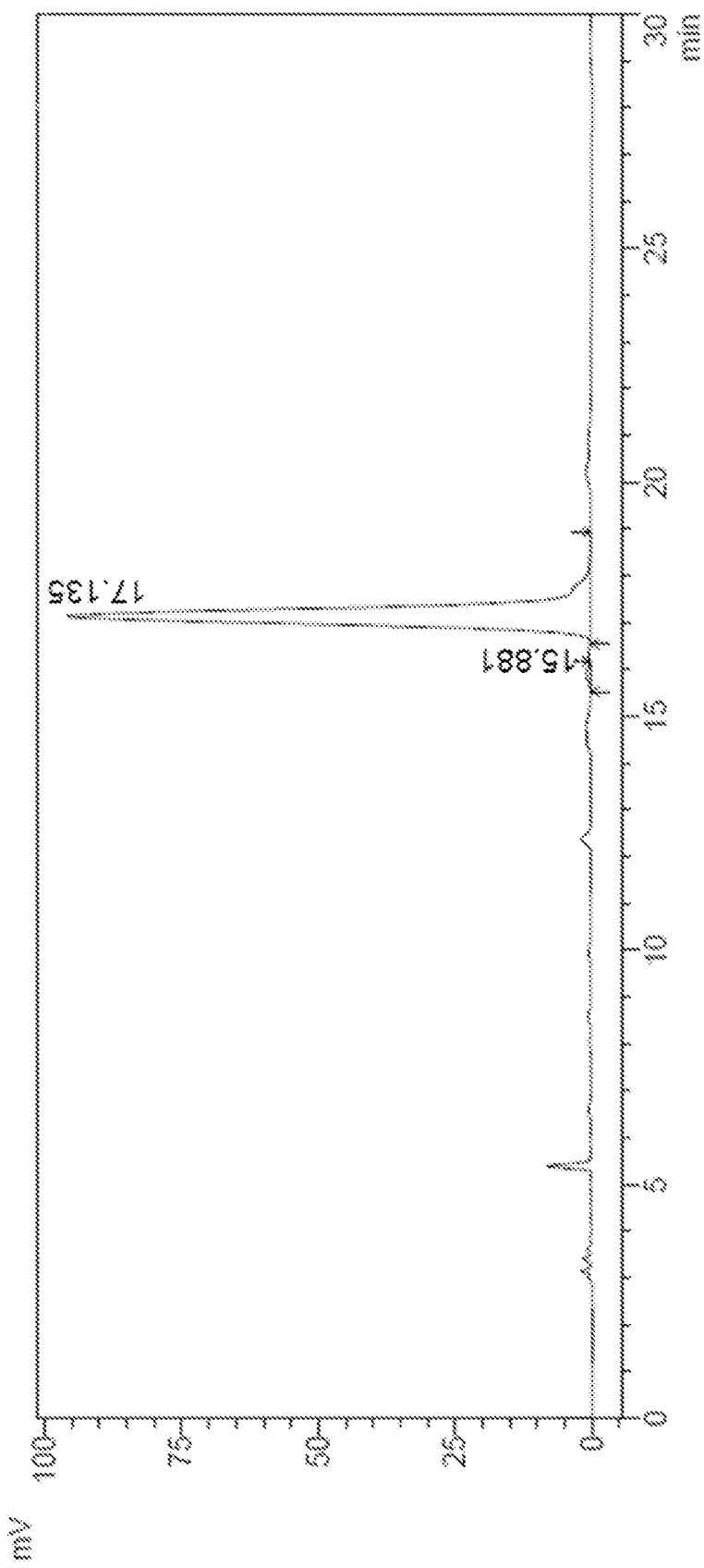
FIG. 2 is the results of chiral HPLC analysis of (R)-2-bromobutyric acid after the reaction involving fluoroacetate dehydrogenase mutant 3 in Example 3.
Figure 3:
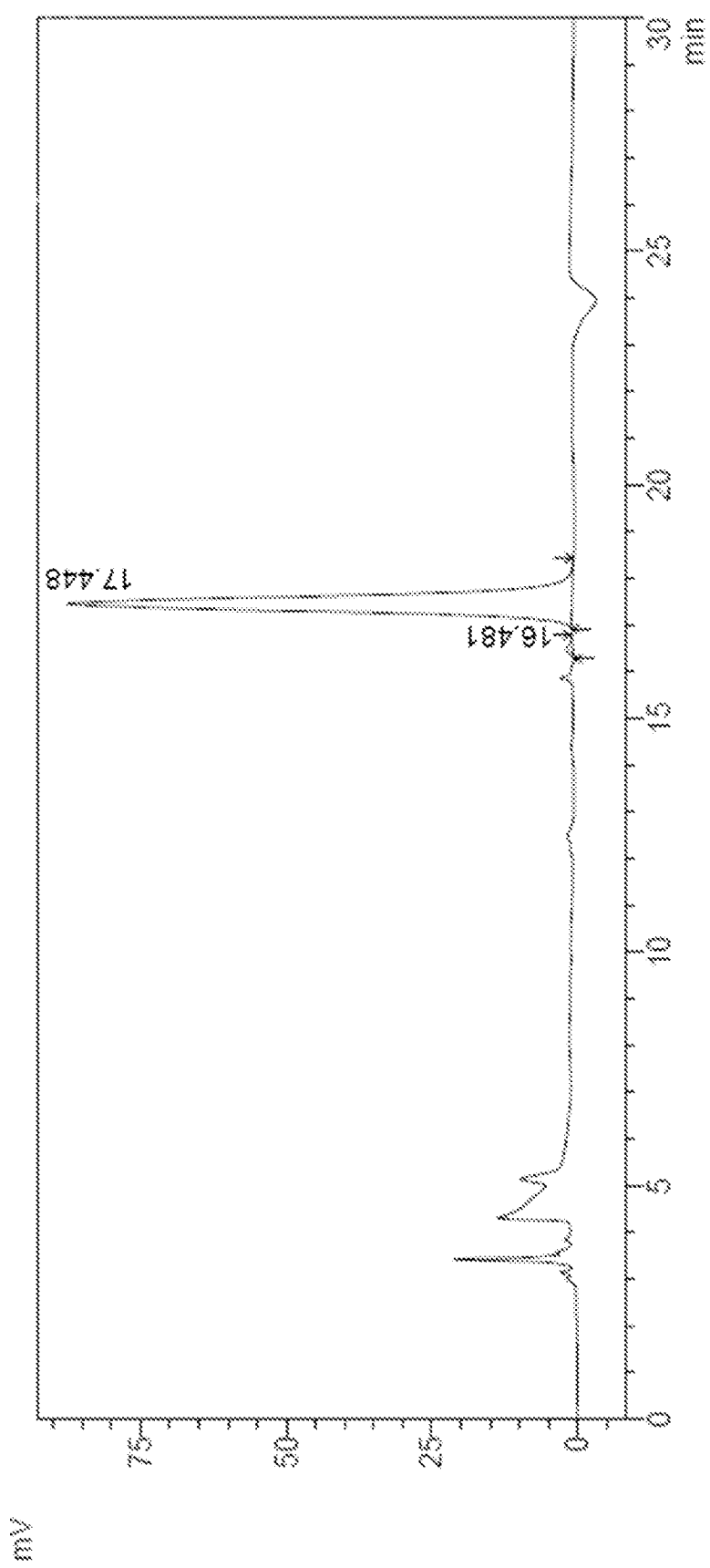
FIG. 3 is the results of chiral HPLC analysis of (R)-2-bromobutyric acid standard.

The results of the chiral HPLC analysis of 2-bromobutyric acid used as the reaction feedstock are shown in FIG. 1, wherein (R)-2-bromobutyric acid has a retention time of 17.272 min, and (S)-2-bromobutyric acid has a retention time of 15.972 min. The results of the chiral HPLC analysis of (R)-2-bromobutyric acid and (S)-2-bromobutyric acid in the post-reaction products are shown in FIG. 2 (the figures are all illustrated with fluoroacetate dehalogenase mutant 3 as an example), wherein (R)-2-bromobutyric acid has a retention time of 17.135 min and (S)-2-bromobutyric acid was almost undetectable. FIG. 3 is the chiral HPLC spectrum of (R)-2-bromobutyric acid standard, which was prepared in our laboratory according to CN101048402, and its HNMR identification data is $^1$HNMR (400 MHZ, $CDCl_3$) δ 4.209-4.173; (t, 1H), δ2.130-2.004; (m, 2H), δ1.081-1.044; (t, 3H). The component of the product prepared in this example has basically the same as the peak time of (R)-2-bromobutyric acid standard, indicating that almost all of the (S)-2-bromobutyric acid was reacted in this example, i.e., all of the (S)-2-bromobutyric acid was converted into (R)-2-hydroxybutyric acid.

Figure 4:
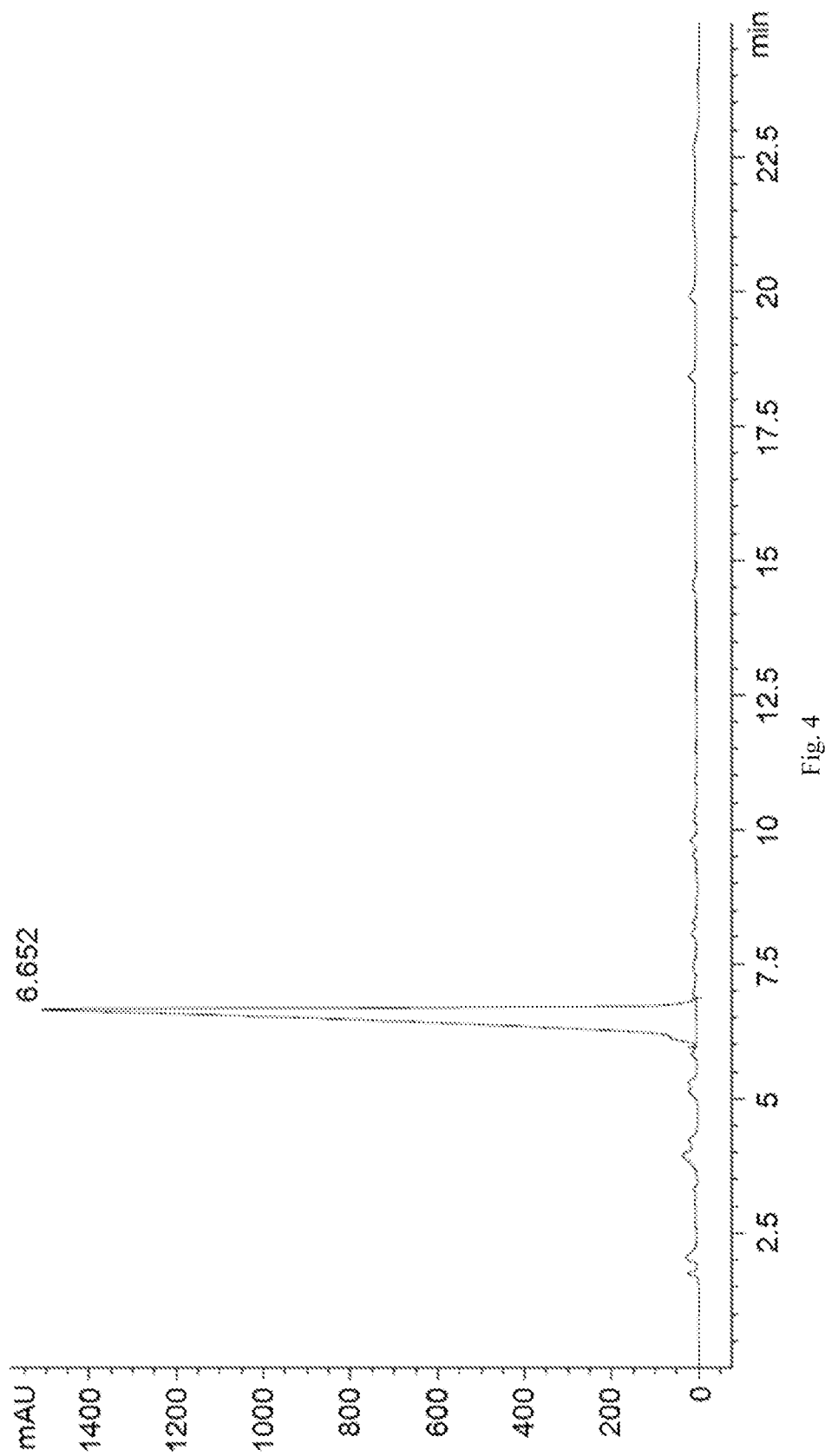
FIG. 4 is the HPLC analysis spectrum of the reaction feedstock 2-bromobutyric acid in Example 3.
Figure 5:
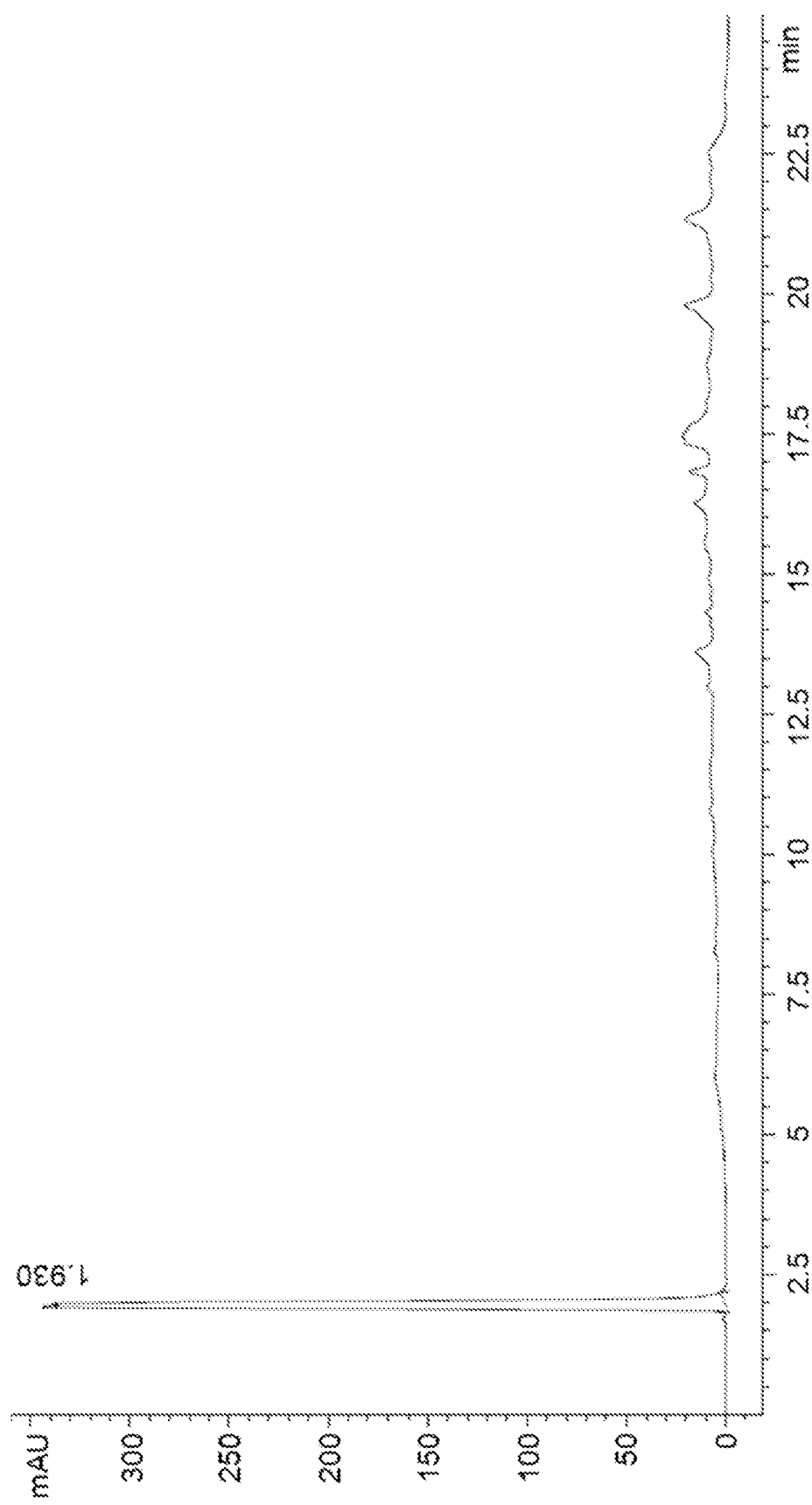
FIG. 5 is the HPLC analysis spectrum of the racemic 2-hydroxybutyric acid standard.
Figure 6:
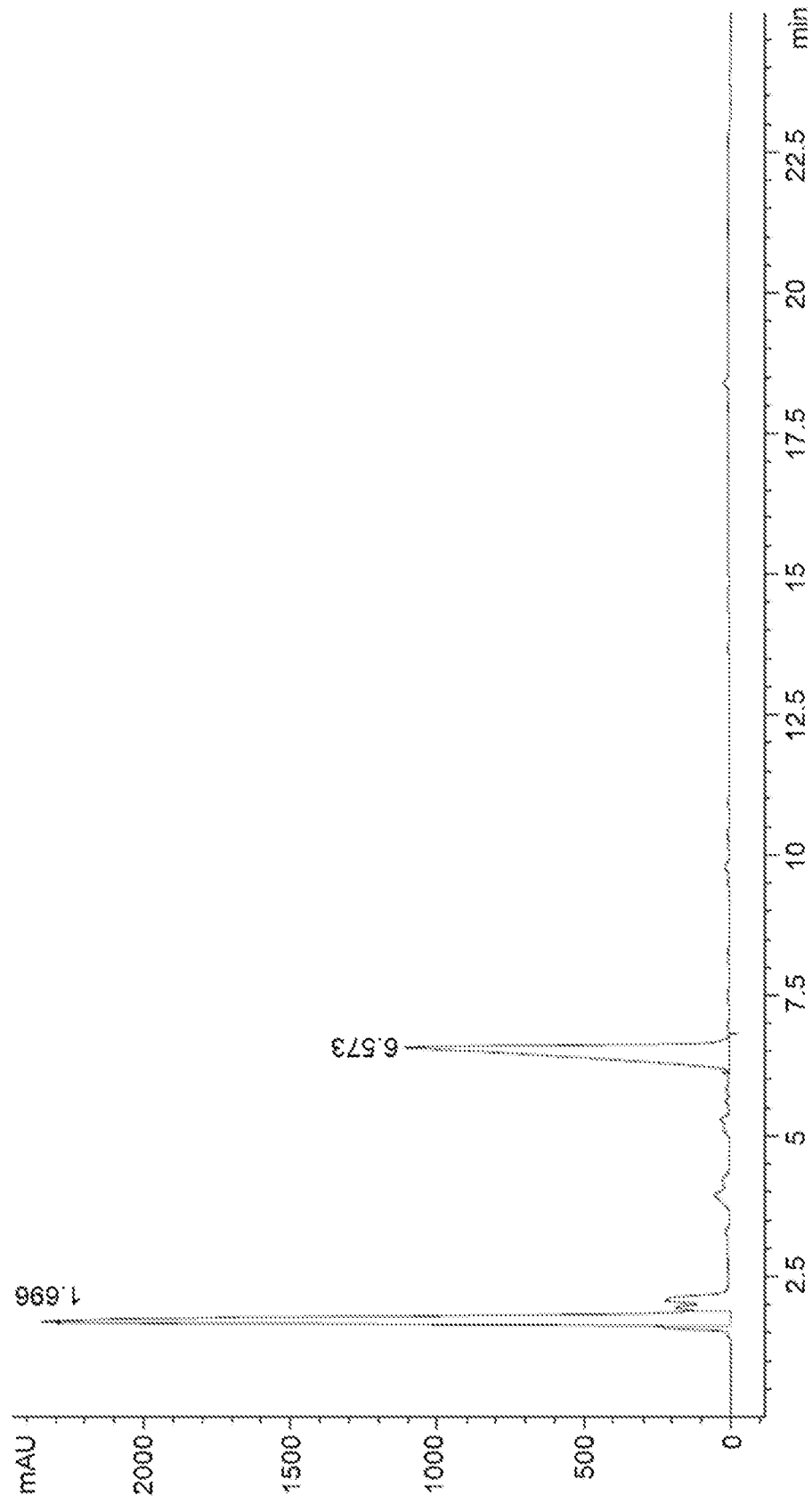
FIG. 6 is the HPLC analysis spectrum of the reaction solution after the reaction involving fluoroacetate dehydrogenase mutant 3 in Example 3.

The results of HPLC chromatogram analysis of 2-bromobutyric acid used in the reaction feedstock are shown in FIG. 4, wherein 6.652 min was the peak position of 2-bromobutyric acid. The HPLC chromatogram analysis results of the racemic 2-hydroxybutyric acid standard (purchased from Shanghai Titan Chemical Co., Ltd) are shown in FIG. 5, wherein the retention time of 2-hydroxybutyric acid standard was 1.930 min. The results of HPLC chromatogram analysis of the reaction solution after the reaction are shown in FIG. 6. It can be seen that the peak times of 2-bromobutyric acid and (R)-2-hydroxybutyric acid in the products after the reaction were basically the same as those of the respective standards.

TABLE 5

| Fluoroacetate dehalogenase mutant No. | Conversion rate | ee value ((R)-2-bromobutyric acid) |
|---|---|---|
| 1 | 52% | 99% |
| 2 | 54% | 60% |
| 3 | 60% | 100% |
| 4 | 56% | 100% |
| 5 | 58% | 100% |
| 6 | 56% | 99.12% |
| 7 | 56% | 98.32% |
| 8 | 56% | 99.72% |
| 9 | 55% | 97.1% |
| 10 | 49% | 93.67% |
| 11 | 48% | 93.56 |
| 12 | 48% | 90.84 |
| 13 | 48% | 90.63 |
| 14 | 47% | 89.92 |
| 15 | 46% | 88.87 |
| 16 | 46% | 88.26 |
| 17 | 46% | 88.22 |
| 18 | 46% | 86.17 |
| 19 | 46% | 85.18 |
| 20 | 46% | 84.75 |
| 21 | 46% | 84 |
| 22 | 46% | 83.66 |
| 23 | 45% | 81.91 |
| 24 | 45% | 81.76 |
| 25 | 45% | 81.64 |
| 26 | 45% | 81.35 |
| 27 | 45% | 80.93 |
| 28 | 45% | 80.81 |
| 29 | 45% | 80.53 |
| 30 | 44% | 79.58 |
| 31 | 44% | 78.61 |
| 32 | 44% | 78.5 |
| 33 | 44% | 78.44 |
| 34 | 44% | 77.41 |
| 35 | 43% | 76.89 |
| 36 | 43% | 76.82 |
| 37 | 43% | 76.77 |
| 38 | 43% | 76.73 |
| 39 | 43% | 76.69 |
| 40 | 43% | 76.36 |
| 41 | 43% | 75.39 |
| 42 | 43% | 75.13 |
| 43 | 43% | 74.98 |
| 44 | 42% | 73.86 |
| 45 | 42% | 73.79 |
| 46 | 42% | 73.38 |
| 47 | 42% | 72.32 |
| 48 | 42% | 71.27 |
| 49 | 41% | 69.72 |
| 50 | 41% | 68.78 |
| 51 | 40% | 67.39 |
| 52 | 40% | 67.19 |
| 53 | 40% | 66.94 |
| 54 | 40% | 66.26 |
| 55 | 40% | 66.23 |
| 56 | 40% | 65.44 |
| 57 | 39% | 65.12 |
| 58 | 39% | 64.68 |
| 59 | 39% | 63.54 |
| 60 | 39% | 63.53 |
| 61 | 38% | 62.25 |
| 62 | 37% | 59.22 |

Example 4 Preparation of (R)-2-bromobutyric Acid Catalyzed by the Fluoroacetate Dehalogenase Mutant and Lipase by One-Pot Process 40 mL of tap water, 10 mL of methanol and 15 g of the substrate methyl 2-bromobutyrate were added into the reaction flask, stirred to dissolve, and the pH of which was controlled at 7.0. 20 mL of the mutant crude enzyme solution prepared according to the method in Example 2 (i.e., 20 mL of 100 mM pH 7.0 disodium hydrogen phosphate-sodium dihydrogen phosphate buffer was added into 4 g of the bacteria described in Example 2, stirred well, then homogenized and crushed under high pressure to obtain the mutant crude enzyme solution, take fluoroacetate dehalogenase mutant 3 as an example, the concentration of which was 10 U/ml) next 1 g of lipase Novozyme® 435 (the lipase B from *Candida antartica* (CALB), which was immobilized in macroporous polymethylmethacrylate resin (Lewatit), and its concentration in this reaction could be 1-20 g/L) were added, and finally the volume of the reaction system was set as 100 mL by tap water. The pH was controlled at about 7.0 with 2 mol/L sodium carbonate solution during the reaction. After reacted in water bath at 30° C. for 8 hours, the conversion rate of the reaction was detected by sampling.

The reaction solution has a pH of 1-2 adjusted with 40% aqueous sulfuric acid, filtered with diatomaceous earth, and the filtrate was extracted three times with an equal volume of toluene. The toluene was combined, and concentrated at 50° C. to obtain 3.5 g of (R)-2-bromobutyric acid. The ee value of (R)-2-bromobutyric acid was detected by HPLC and the ee value was 98%. The aqueous phase has a pH of 0-1 adjusted with 40% aqueous sulfuric acid, then extracted three times with an equal volume of methyl tert-butyl ether. The methyl tert-butyl ether was combined and concentrated at 50° C. to obtain 2-hydroxybutyric acid. The optical rotation of 2-hydroxybutyric acid was determined as $[a]25D=+4.1°$ (C=3.0, $H_2O$). The product could be known as (R)-2-hydroxybutyric acid by referring to the content of Advanced Synthesis and Catalysis, 2016, vol. 358, #18, p. 2923-2928.

Although the above describes specific embodiments of the present disclosure, it should be understood by a person skilled in the art that these are merely illustrative examples and that a variety of changes or modifications can be made to these embodiments without departing from the principles and substance of the present invention. Therefore, the scope of protection of the present disclosure is limited by the appended claims.

What is claimed is:

1. A fluoroacetate dehalogenase mutant, wherein the fluoroacetate dehalogenase mutant comprises the amino acid sequence of SEQ ID NO: 9, SEQ ID NO: 17, SEQ ID NO: 21, SEQ ID NO: 35, or SEQ ID NO: 51.

2. A fluoroacetate dehalogenase mutant, wherein the fluoroacetate dehalogenase mutant is encoded by the nucleotide sequence of SEQ ID NO: 10, SEQ ID NO: 12, SEQ ID NO: 18, SEQ ID NO: 22, SEQ ID NO: 24, SEQ ID NO: 36, or SEQ ID NO: 52.

3. An isolated nucleic acid, wherein the nucleic acid encodes the fluoroacetate dehalogenase mutant of claim 1.

4. A recombinant expression vector comprising the nucleic acid of claim 3.

5. A transformant comprising the nucleic acid of claim 3.

6. A dehalogenase combination for catalyzing a halogenated substrate, wherein the dehalogenase combination comprises two or more of the fluoroacetate dehalogenase mutant of claim 1.

7. A catalyst combination, wherein the catalyst combination comprises (a) the fluoroacetate dehalogenase mutant of claim 1, and (b) a lipase.

8. A reaction system for a catalyst, wherein the reaction system comprises a substrate and a catalyst, wherein the substrate is 2-bromobutyric acid, the catalyst comprises the fluoroacetate dehalogenase mutant of claim 1.

9. A method for preparing (R)-2-bromobutyric acid and/or (R)-2-hydroxybutyric acid by use of the fluoroacetate dehalogenase mutant of claim 1.

10. A preparation method of (R)-2-bromobutyric acid or (R)-2-hydroxybutyric acid, wherein the preparation method comprises following steps: a catalytic reaction is performed in the presence of the reaction system of claim 8 to obtain (R)-2-bromobutyric acid or (R)-2-hydroxybutyric acid, respectively; wherein the catalytic reaction has a reaction system with a temperature of 20-30; and/or, the catalytic reaction has a reaction time of 5-10 hours; wherein the catalytic reaction comprises a dehalogenation reaction, or a dehalogenation reaction and an ester hydrolysis reaction.

11. A catalyst combination, wherein the catalyst combination comprises (a) the dehalogenase combination of claim 6, and (b) a lipase.

12. A reaction system for a catalyst, wherein the reaction system comprises a substrate and a catalyst, wherein the substrate is 2-bromobutyric acid, the catalyst comprises the dehalogenase combination of claim 6.

13. A reaction system for a catalyst, wherein the reaction system comprises a substrate and a catalyst, wherein the substrate is methyl 2-bromobutyrate or ethyl 2-bromobutyrate, the catalyst comprises the catalyst combination of claim 7.

14. A reaction system for a catalyst, wherein the reaction system comprises a substrate and a catalyst, wherein the substrate is methyl 2-bromobutyrate or ethyl 2-bromobutyrate, the catalyst comprises the catalyst combination of claim 11.

15. A preparation method of (R)-2-bromobutyric acid or (R)-2-hydroxybutyric acid, wherein the preparation method comprises following steps: a catalytic reaction is performed in the presence of the reaction system of claim 12 to obtain (R)-2-bromobutyric acid or (R)-2-hydroxybutyric acid, respectively; wherein the catalytic reaction has a reaction system with a temperature of 20-30° C.; and/or, the catalytic reaction has a reaction time of 5-10 hours; wherein the catalytic reaction comprises a dehalogenation reaction, or a dehalogenation reaction and an ester hydrolysis reaction.

16. A preparation method of (R)-2-bromobutyric acid or (R)-2-hydroxybutyric acid, wherein the preparation method comprises following steps: a catalytic reaction is performed in the presence of the reaction system of claim 13 to obtain (R)-2-bromobutyric acid or (R)-2-hydroxybutyric acid, respectively; wherein the catalytic reaction has a reaction system with a temperature of 20-30° C.; and/or, the catalytic reaction has a reaction time of 5-10 hours; wherein the catalytic reaction comprises a dehalogenation reaction, or a dehalogenation reaction and an ester hydrolysis reaction.

17. A preparation method of (R)-2-bromobutyric acid or (R)-2-hydroxybutyric acid, wherein the preparation method comprises following steps: a catalytic reaction is performed in the presence of the reaction system of claim 14 to obtain (R)-2-bromobutyric acid or (R)-2-hydroxybutyric acid, respectively; wherein the catalytic reaction has a reaction system with a temperature of 20-30° C.; and/or, the catalytic reaction has a reaction time of 5-10 hours; wherein the catalytic reaction comprises a dehalogenation reaction, or a dehalogenation reaction and an ester hydrolysis reaction.

18. A fluoroacetate dehalogenase mutant, wherein the fluoroacetate dehalogenase mutant comprises the amino acid sequence of SEQ ID NO: 11 or SEQ ID NO: 23.

19. The reaction system of claim 8, wherein the 2-bromobutyric acid has a concentration of 0.02 g/ml-0.2 g/ml; and/or, the fluoroacetate dehalogenase mutant has a concentration of 2-20 U/ml.

20. The reaction system of claim 13, wherein the methyl 2-bromobutyrate or ethyl 2-bromobutyrate has concentration of 0.02 g/ml-0.2 g/ml; and/or, the fluoroacetate dehalogenase mutant has a concentration of 2-20 U/ml; and/or, the lipase has a concentration of 1-20 g/L.

* * * * *